United States Patent
Kohn et al.

(10) Patent No.: US 10,601,316 B2
(45) Date of Patent: Mar. 24, 2020

(54) USING BATTERY DC CHARACTERISTICS TO CONTROL POWER OUTPUT

(71) Applicant: Veritone Alpha Inc., Costa Mesa, CA (US)

(72) Inventors: Wolf Kohn, Seattle, WA (US); Vishnu Vettrivel, Bothell, WA (US); Jonathan Cross, Bellevue, WA (US); Pengbo Zhang, Seattle, WA (US); Michael Luis Sandoval, Bellevue, WA (US); Brian Schaper, Renton, WA (US); Neel Master, Santa Monica, CA (US); Brandon Weiss, Woodbridge, VA (US); David Kettler, Seattle, WA (US)

(73) Assignee: Veritone Alpha, Inc., Costa Mesa, CA (US)

(*) Notice: Subject to any disclaimer, the term of this patent is extended or adjusted under 35 U.S.C. 154(b) by 0 days.

(21) Appl. No.: 16/121,356

(22) Filed: Sep. 4, 2018

(65) Prior Publication Data
US 2019/0044440 A1    Feb. 7, 2019

Related U.S. Application Data

(63) Continuation of application No. PCT/US2017/020960, filed on Mar. 6, 2017, which is
(Continued)

(51) Int. Cl.
| | |
|---|---|
| H02M 3/156 | (2006.01) |
| H02J 7/00 | (2006.01) |
| G05B 15/02 | (2006.01) |

(52) U.S. Cl.
CPC ........... *H02M 3/156* (2013.01); *G05B 15/02* (2013.01); *H02J 7/0063* (2013.01); *H02J 7/0068* (2013.01); *H02J 2007/0067* (2013.01)

(58) Field of Classification Search
None
See application file for complete search history.

(56) References Cited

U.S. PATENT DOCUMENTS

| | | |
|---|---|---|
| 5,724,239 A | 3/1998 | Kaneko |
| 5,727,128 A | 3/1998 | Morrison |

(Continued)

FOREIGN PATENT DOCUMENTS

| | | |
|---|---|---|
| CN | 1615574 A | 5/2005 |
| CN | 101622766 A | 1/2010 |

(Continued)

OTHER PUBLICATIONS

Leng et al., "Effect of Temperature on the Aging rate of Li Ion Battery Operating above Room Temperature," *Scientific Reports* 5:12967, 2015, 12 pages.
(Continued)

*Primary Examiner* — Mohammad Ali
*Assistant Examiner* — Saad M Kabir
(74) *Attorney, Agent, or Firm* — VLP Law Group LLP; James A. D. White

(57) ABSTRACT

Techniques are described for implementing automated control systems to control operations of specified physical target systems, such as with one or more batteries used to store and provide electrical power. Characteristics of each battery's state may be used to perform automated control of DC power from the battery, such as in a real-time manner and to optimize long-term operation of the battery. In some situations, multiple batteries are controlled by using multiple control systems each associated with one of the batteries, and with overall control being coordinated in a distributed manner using interactions between the multiple control systems. A system that includes one or more batteries to be controlled may further include additional components in
(Continued)

some situations, such as one or more electrical sources and/or one or more electrical loads, with one non-exclusive example of a type of such system being one or more home electrical power systems.

29 Claims, 33 Drawing Sheets

Related U.S. Application Data a continuation of application No. 15/096,091, filed on Apr. 11, 2016, now abandoned.

(60) Provisional application No. 62/304,034, filed on Mar. 4, 2016.

(56) References Cited

U.S. PATENT DOCUMENTS

| | | | |
|---|---|---|---|
| 5,755,378 A | 5/1998 | Dage | |
| 5,963,447 A | 10/1999 | Kohn et al. | |
| 6,088,689 A | 7/2000 | Kohn et al. | |
| 6,694,044 B1 | 2/2004 | Pavlovic et al. | |
| 7,072,723 B2 | 7/2006 | Kohn et al. | |
| 7,216,004 B2 | 5/2007 | Kohn et al. | |
| 7,574,383 B1 | 8/2009 | Parasnis et al. | |
| 8,217,624 B2 | 7/2012 | Nishida et al. | |
| 8,261,283 B2 | 9/2012 | Tsafrir et al. | |
| 8,429,106 B2 | 4/2013 | Downs et al. | |
| 8,606,788 B2 | 12/2013 | Chen et al. | |
| 8,829,857 B2 | 9/2014 | Minamiura | |
| 8,949,772 B1 | 2/2015 | Talby et al. | |
| 9,946,517 B2 | 4/2018 | Talby et al. | |
| 2002/0049899 A1 | 4/2002 | Kenworthy | |
| 2003/0069868 A1 | 4/2003 | Vos | |
| 2003/0234812 A1 | 12/2003 | Drucker et al. | |
| 2004/0260666 A1 | 12/2004 | Pestotnik et al. | |
| 2005/0067999 A1 | 3/2005 | Okamura et al. | |
| 2005/0102044 A1 | 5/2005 | Kohn et al. | |
| 2005/0273413 A1 | 12/2005 | Vaudrie | |
| 2006/0218074 A1 | 9/2006 | Kohn | |
| 2006/0229769 A1 | 10/2006 | Grichnik et al. | |
| 2008/0167756 A1 | 7/2008 | Golden et al. | |
| 2009/0113049 A1 | 4/2009 | Nasle | |
| 2011/0035071 A1 | 2/2011 | Sun | |
| 2011/0178622 A1 | 7/2011 | Tuszynski | |
| 2011/0298626 A1 | 12/2011 | Fechalos et al. | |
| 2012/0072181 A1 | 3/2012 | Imani | |
| 2012/0099618 A1 | 4/2012 | Nishi et al. | |
| 2012/0143356 A1 | 6/2012 | Berg-Sonne | |
| 2012/0274281 A1 | 11/2012 | Kim | |
| 2012/0283887 A1 | 11/2012 | Goldsmith et al. | |
| 2013/0080530 A1 | 3/2013 | Frees et al. | |
| 2013/0099576 A1 | 4/2013 | Chuah et al. | |
| 2013/0119916 A1 | 5/2013 | Wang et al. | |
| 2013/0119939 A1 | 5/2013 | Yonezawa et al. | |
| 2013/0253942 A1 | 9/2013 | Liu et al. | |
| 2013/0274936 A1 | 10/2013 | Donahue et al. | |
| 2014/0042981 A1 | 2/2014 | Kaizo et al. | |
| 2014/0114517 A1 | 4/2014 | Tani et al. | |
| 2014/0217976 A1 | 8/2014 | McGrath | |
| 2014/0250377 A1 | 9/2014 | Bisca et al. | |
| 2014/0277600 A1 | 9/2014 | Kolinsky et al. | |
| 2015/0032394 A1 | 1/2015 | Kimura et al. | |
| 2015/0058078 A1 | 2/2015 | Ehrenberg et al. | |
| 2015/0184550 A1 | 7/2015 | Wichmann | |
| 2015/0253749 A1 | 9/2015 | Kniazev et al. | |
| 2015/0279182 A1 | 10/2015 | Kanaujia et al. | |
| 2015/0291044 A1 | 10/2015 | Adachi et al. | |
| 2015/0370228 A1 | 12/2015 | Kohn et al. | |
| 2015/0370232 A1 | 12/2015 | Kohn et al. | |
| 2016/0004228 A1 | 1/2016 | Kohn | |
| 2016/0018806 A1 | 1/2016 | Kohn et al. | |
| 2016/0125435 A1 | 5/2016 | Kohn et al. | |
| 2016/0216708 A1 | 7/2016 | Krivoshein et al. | |
| 2017/0271984 A1 | 9/2017 | Kohn et al. | |
| 2017/0315517 A1 | 11/2017 | da Silva et al. | |
| 2017/0315523 A1 | 11/2017 | Cross et al. | |

FOREIGN PATENT DOCUMENTS

| | | |
|---|---|---|
| CN | 102204003 A | 9/2011 |
| CN | 102472796 A | 5/2012 |
| CN | 103580110 A | 2/2014 |
| JP | 2008-546370 A | 12/2008 |
| JP | 2015-025685 A | 2/2015 |
| JP | 2016-105672 A | 6/2016 |
| WO | 2014030349 A1 | 2/2014 |
| WO | 2014089959 A1 | 6/2014 |
| WO | 2016025080 A1 | 2/2016 |

OTHER PUBLICATIONS

Ge et al., "Hybrid Systems: Chattering Approximation to Relaxed Controls," *Lecture Notes in Computer Science* vol. 1066: Hybrid Systems III, 1996, 25 pages.

Kohn et al., "Multiple Agent Hybrid Control: Carrier Manifolds and Chattering Approximations to Optimal Control," $33^{rd}$ Conference on Decision and Control Lake Buena Vista, FL, Dec. 1994, 7 pages.

Kohn et al., "A Hybrid Systems Approach to Computer-Aided Control Engineering," *IEEE Control Systems* 15(2), 1995, 30 pages.

Kohn et al., "Hybrid Systems as Finsler Manifolds: Finite State Control as Approximation to Connections," *Lecture Notes in Computer Science* vol. 999: Hybrid Systems II, 1995, 28 pages.

Kohn et al., "Viability in Hybrid Systems," *Theoretical Computer Science* 138, 1995, 28 pages.

Kohn et al., "Digital to Hybrid Program Transformations," IEEE International Symposium on Intelligent Control, Dearborn, MI, Sep. 15-18, 1996, 6 pages.

Kohn et al., "Hybrid Dynamic Programming," *Lecture Notes in Computer Science* vol. 1201: Hybrid and Real-Time Systems, 1997, 7 pages.

Kohn et al., "Implementing Sensor Fusion Using a Cost-Based Approach," American Control Conference, Albuquerque, NM, Jun. 1997, 5 pages.

Kohn et al., "Control Synthesis in Hybrid Systems with Finsler Dynamics," *Houston Journal of Mathematics* 28(2), 2002, 23 pages.

Kohn et al., "A Micro-Grid Distributed Intelligent Control and Management System," *IEEE Transactions on Smart Grid* 6(6), Nov. 2015, 11 pages.

Hyndman, "Forecasting: Principles & Practice", Workshop at University of Western Australia (robjhyndman.com/uwa), 138 pages, Sep. 23-25, 2014.

Leng et al., "Effect of Temperature on the Aging Rate of Li Ion Battery Operating Above Room Temperature," Scientific Reports 5:12967, Aug. 2015, 12 pages.

Shim et al., "Past, present, and future of decision support technology", Decision Support Systems 33 (2002), 16 pages (pp. 111-126).

Liserre et al., "Future Energy Systems", IEEE Industrial Electronics Magazine, Mar. 2010, 20 pages (pp. 18-37).

Sarkis, "A strategic decision framework for green supply chain management", Journal of Cleaner Production 11 (2003) 13 pages (pp. 397-409).

Chong et al., "Sensor Networks: Evolution, Opportunities, and Challenges", Proceedings of the IEEE, vol. 91, No. 8, Aug. 2003, 10 pages (pp. 1247-1256).

Schutter, B. De "Minimal state-space realization in linear system theory: an overview", Journal of Computational and Applied Mathematics, 121 (2000), 24 pp. (331-354).

Uddin, K., "The effects of high frequency current ripple on electric vehicle battery performance," Applied Energy 178 (2016), 13 pages (pp. 142-154).

- Battery parameters are updated dynamically to capture changes in the battery

Previous Estimate $\Psi_i$
Initial Parameters $A, B, f, x_0$
Incremental control $\delta u$
New Estimate $\Psi_{i+1}$ 1955 Extended Kalman Filter $\Psi = vec(A)$
$\Psi_{i+1} = \Psi_i + \Lambda_i$
$Z_i = G_i \Psi_i + \Xi_i$

USING BATTERY DC CHARACTERISTICS TO CONTROL POWER OUTPUT

CROSS-REFERENCE TO RELATED APPLICATIONS

This application is a continuation of co-pending International PCT Application No. PCT/US2017/020960, filed Mar. 6, 2017 and entitled "Using Battery DC Characteristics To Control Power Output," and claims the priority benefit of International PCT Application No. PCT/US2017/020960 and of U.S. patent application Ser. No. 15/096,091 and of U.S. Provisional Patent Application No. 62/304,034. International PCT Application No. PCT/US2017/020960 claims the priority benefit of U.S. patent application Ser. No. 15/096,091, filed Apr. 11, 2016 and entitled "Using Battery DC Characteristics To Control Power Output," now abandoned; and the priority benefit of U.S. Provisional Patent Application No. 62/304,034. U.S. patent application Ser. No. 15/096,091 claims the benefit of U.S. Provisional Patent Application No. 62/304,034, filed Mar. 4, 2016 and entitled "Using Battery DC Characteristics To Control Power Quality," which is hereby incorporated by reference in its entirety.

BACKGROUND

Various attempts have been made to implement automated control systems for various types of physical systems having inputs or other control elements that the control system can manipulate to attempt to provide desired output or other behavior of the physical systems being controlled. Such automated control systems have used various types of architectures and underlying computing technologies to attempt to implement such functionality, including to attempt to deal with issues related to uncertainty in the state of the physical system being controlled, the need to make control decisions in very short amounts of time and with only partial information, etc. One example of such an automated control system includes a system for controlling operations of a battery that is discharging electrical power to support a load and/or is charging using electrical power from a source, with uncertainty about an internal temperature and/or chemical state of the battery, and potentially with ongoing changes in load, source and/or battery internal state.

However, various difficulties exist with existing automated control systems and their underlying architectures and computing technologies, including with respect to managing large numbers of constraints (sometimes conflicting), operating in a coordinated manner with other systems, etc. Particular difficulties can arise when attempting to control one or more batteries in situations in which multiple conflicting constraints and/or goals exist.

DETAILED DESCRIPTION

Figure 1:
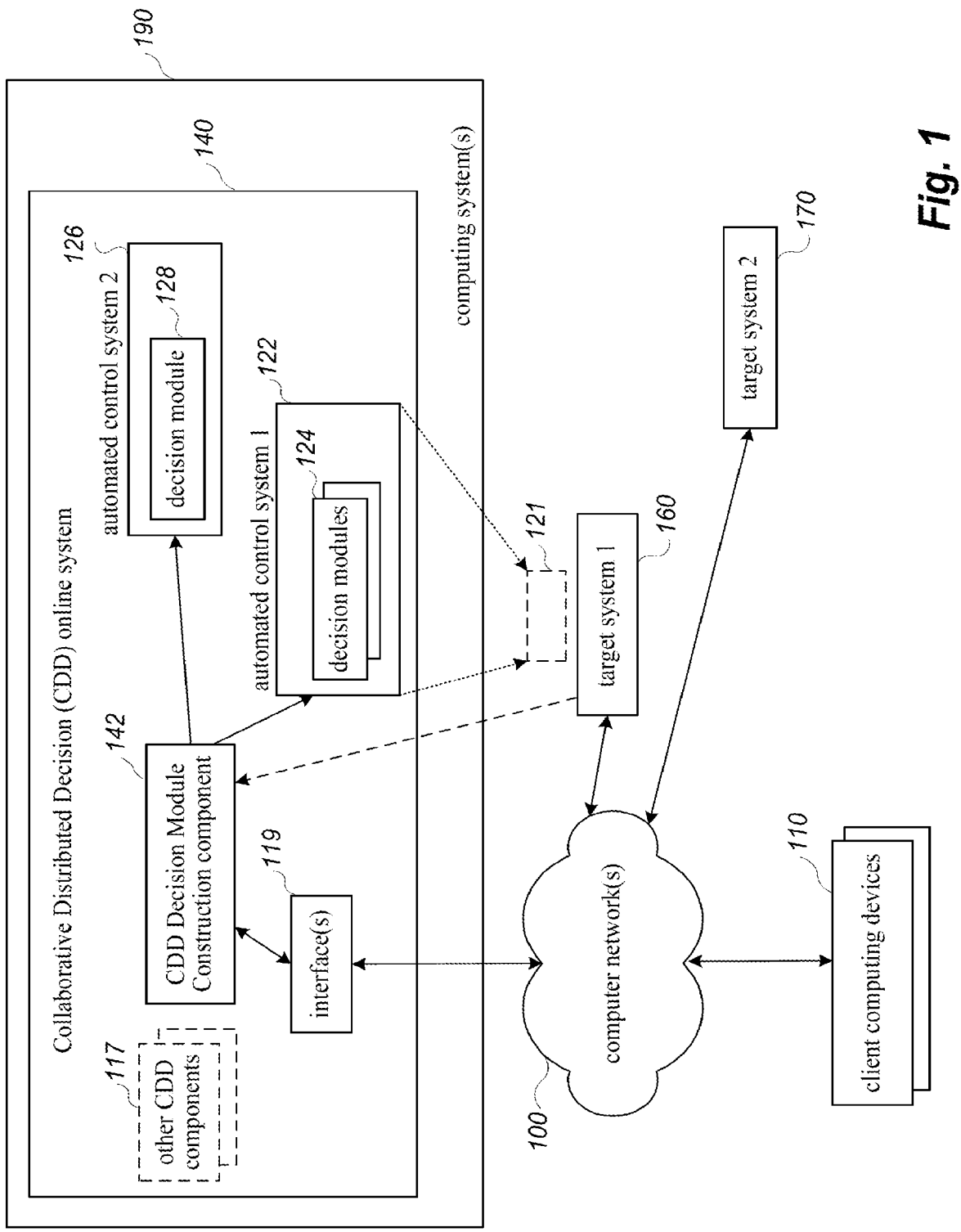
FIG. 1 is a network diagram illustrating an example environment in which a system for performing cooperative distributed control of target systems may be configured and initiated.

Techniques are described for implementing automated control systems to control or otherwise manipulate at least some operations of specified physical systems or other target systems. In at least some embodiments, the physical target systems include one or more batteries used to store and provide electrical power, and the automated operations to control the target systems include using characteristics of each battery's state to perform automated control of DC (direct current) power that is provided from the battery, such as by using a DC-to-DC amplifier (e.g., a FET, or field-effect transistor, amplifier) connected to the battery to control an amount of electrical current and/or voltage being output from the battery, in a real-time manner and to optimize long-term operation of the battery. The DC-to-DC amplifier may, for example, be part of a buck converter (or step-down converter) that steps down voltage while stepping up current from its input (supply) to its output (load) and/or be part of a boost converter (or step-up converter) that steps up voltage while stepping down current from its input (supply) to its output (load), referred to generally at times herein as a "boost/buck controller" or "buck/boost controller". In addition, in some embodiments and situations, multiple batteries may be controlled in such a manner by using multiple control systems that are each associated with one of the batteries, and with the overall control of the multiple batteries being coordinated in a distributed manner, such as based on interactions between the multiple associated control systems for the multiple batteries. A system that includes one or more batteries to be controlled may further include additional components in some embodiments and situations, such as one or more electrical sources and/or one or more electrical loads, with one non-exclusive example of such a type of system being one or more home or business electrical power systems that may optionally include electrical generation sources (e.g., solar panels, wind turbines, etc.) as well as electrical load from the house or business. Additional details are included below related to such techniques for implementing and using automated control systems to control target systems with one or more batteries.

The described techniques may provide a variety of benefits and advantages. Non-exclusive examples of such benefits and advantages include controlling power output of a battery on the DC side (e.g., by varying DC current and voltage of the battery), allowing the battery to operate in its optimal or near-optimal physical state with respect to internal temperature and/or other battery parameters (e.g., by maintaining an internal chemistry of the battery within one or more chemical stoichiometric limits, such as a stoichiometric range), rather than fixing AC (alternating current) voltage and/or current being provided by an inverter connected to the battery at a single specified level, and forcing the battery to operate at a saturation level that provides maximum power but at the cost of possible non-reversible battery damage—in this manner, battery longevity and other operational performance may be optimized or otherwise enhanced by the described techniques, by allowing the battery to operate in a preferred range in which battery chemistry changes are reversible and in which short-circuits and other non-reversible damage is reduced or eliminated. In addition, in at least some embodiments, the automated control of the battery may further include active control of the battery to enhance and maintain power output amount resonance with the other components (e.g., a load and/or an external power grid), such that the amount of power provided does not exceed what is needed, while also satisfying at least a defined percentage or other amount of power output requests or load amounts (e.g., 50%, 65%, 100% or any other defined percentage or other amount). In this manner, such embodiments may be conceptualized as an automated control system to manage the internal state and operational performance (including longevity) of a battery being controlled, while satisfying power output requests if possible, rather than existing systems that fix the output voltage or current of a battery and fulfill all power requests even if it causes battery damage or other problems (e.g., excessive heating). While the benefits and operations discussed above and in some other locations herein relate to controlling power being output from a battery, it will be appreciated that the same techniques may be used to control power being stored into a battery from one or more sources, so as to cause the battery to operate in its optimal or near-optimal physical state with respect to heat and other battery parameters while storing power, and to optimize or otherwise enhance battery longevity and other operational performance by allowing the battery to operate in a preferred range in which battery chemistry changes are reversible, while satisfying at least a defined percentage or other amount of power input requests (e.g., 50%, 65%, 100% or any other defined percentage or other amount) for power being supplied by one or more sources. Additional benefits and advantages include the following, with the term 'optimizing' a feature or result as used herein meaning generally improving that feature or result (e.g., via partial or full optimization), and with the term 'real-time' as used herein meaning with respect to a time frame (e.g., fractions of a second, seconds, minutes, etc.) specific to a resulting component or system being controlled, unless otherwise indicated:

- can improve battery lifetime by optimizing DC control variables, such as I (current), V (voltage) and R (amount of power being output)
- can improve battery lifetime by optimizing DC control variables (I, V, R) in conjunction with a prior characterization of battery chemistry, and can optimize at DC level to improve performance and longevity
- can optimize variables in real-time in DC domain to solve for objectives in AC phase
- can optimize AC output in real-time to match grid frequency resulting in resonant operation, such as via control of only battery output and no other grid components
- can improve charge/discharge cycles to improve long-term battery availability
- can improve AC load response
- can improve AC load response in combination with improving long-term battery availability
- battery controller can run as embedded software on a processor in a self-sufficient manner
- battery controller can be monitored and updated continuously from external location (e.g., the cloud or other network-accessible location)
- battery controller can transmit battery characteristics to improve performance
- can avoid expenses of static bar compensator hardware Various other benefits and advantages may be further realized in at least some embodiments, as discussed in part in greater detail below.

Figure 10:
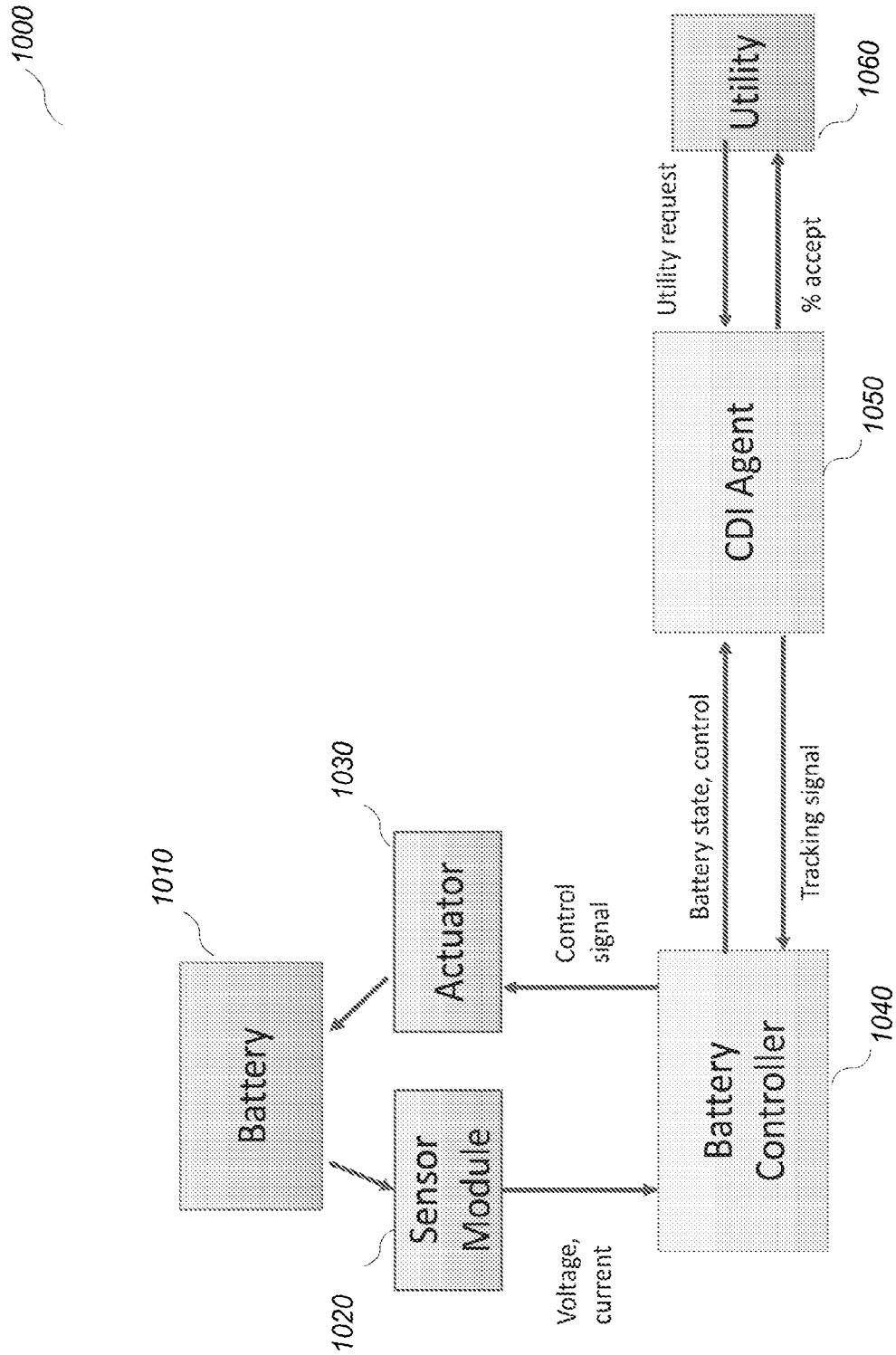
FIG. 10 is a block diagram illustrating example components of an embodiment of a system for using characteristics of a battery's state to perform automated control of DC power from the battery.

FIG. 10 includes a block diagram 1000 illustrating example components of an embodiment of a system for using characteristics of a battery's state along with other related information to perform automated control of DC power from the battery—in particular, various components of example system 1000 interact to control operations of the battery according to one or more defined goals in light of defined constraints, rules and other criteria, as discussed further below. In some embodiments, the automated activities to control the battery may be performed in a real-time manner and/or to optimize long-term operation of the battery (e.g., the life of the battery), while satisfying as many external requests for power (e.g., from a utility to which the battery can supply power) as is possible (e.g., at least a defined percentage or quantity of such requests).

A battery 1010 is shown that is being controlled via an actuator 1030 receiving a corresponding control signal from a battery controller component 1040 (also referred to as a "tracking controller" and/or "battery tracking controller" at times herein), such as by the battery controller specifying an amount of power to be generated as DC output of the battery. The specified power amount to be generated may include information indicating, for example, to increase or decrease the power being output by a specified amount, or to not change the power output. While not illustrated here, the output of the battery may serve to provide power to one or more loads (not shown), and in at least some embodiments may be connected to an inverter/rectifier component to convert the power output of the battery to AC power to support corresponding loads—such an inverter may, for example, control power being provided from the battery by regulating voltage and/or frequency of the AC power. Similarly, while also not illustrated here, input of the battery may serve to receive power from one or more sources (not shown), and in at least some embodiments may be connected to an inverter/rectifier component to convert AC power input from the sources to DC power for the battery—such a rectifier may, for example, control power being provided to the battery by regulating voltage and/or frequency of the AC power.

As part of determining how to control the battery, the battery controller component receives input from a sensor module 1020 regarding an internal state (not shown) of the battery, such as current values for voltage, electrical current, temperature, etc., and supplies corresponding information to a CDI agent 1050. The CDI agent, which is also referred to at times herein as a CDD (Collaborative Distributed Decision) decision module or system, receives the information from the battery controller related to the state of the battery, and also receives power supply requests from a utility component 1060, such as in a situation in which the battery supplies power at some or all times to an electrical grid (not shown) controlled by the utility. In particular, the CDI agent receives a particular request from the utility, receives and analyzes information about the state of the battery, and determines corresponding operations to take at the current time for the battery (e.g., an amount of output power to be supplied from the battery, and/or an amount of input power to be received and stored by the battery), which in at least some situations involve attempting to fully or partially satisfy the request from the utility for power in a real-time manner if the request can be satisfied in a way that also satisfies other constraints on the battery performance given the current state of the battery and the defined goal(s), such as to enable the battery to operate in a desired non-saturation range or level (e.g., with respect to an estimated internal temperature of the battery and/or estimated internal chemistry of the battery). After determining the corresponding operations to take at the current time for the battery, the CDI agent provides a corresponding tracking control signal to the battery controller, which determines how to currently modify or manipulate the actuator to effectuate the corresponding operations for the tracking control signal (e.g., an amount of positive or negative change to make in an amount of current being output from the battery), and sends a corresponding control signal to the actuator as discussed above.

While not illustrated in FIG. 10, the CDI Agent and/or battery controller may in some embodiments include a stored model of the battery that is used to estimate internal state of the battery and to select particular operations to perform based in part on that internal state. For example, in some embodiments a generic battery model may be used that is applicable to any type of battery, while in other embodiments a battery model may be used that is specific to a type of the battery (e.g., a type of chemical reaction used to store and/or generate electricity, such as lithium ion or nickel cadmium), while in yet other embodiments a battery model may be used that is designed and/or configured specifically for the particular battery in use. In addition, in at least some embodiments, a battery model that is initially employed in a particular system with a particular battery may be updated over time, such as to reflect improvements to the underlying structure of the model and/or to train the model to reflect operational characteristics specific to the particular battery and/or system in use (e.g., by monitoring how changes in observable battery state correlate to corresponding external battery electrical load and/or electrical source)—when training or otherwise adapting a model to a particular battery and/or system, the training/adaption operations may in some embodiments be performed initially in a training phase before using the automated control system to control the battery, and/or in some embodiments may be performed continuously or periodically while the automated control system is controlling the battery (e.g., to reflect changes over time in an impedance profile of the battery). Additional details are included elsewhere herein regarding such models, including their construction and use. In addition, while in some embodiments the battery controller and CDI agent may be implemented as separate components (e.g., with the battery controller implemented in whole or in part in hardware and/or firmware that is attached to the battery or otherwise at a location of the battery, and with the CDI agent implemented in part by software instructions executing on one or more computing systems remote from the battery location and optionally communicating with the battery controller over one or more intervening computer networks), in other embodiments the CDI agent and battery controller may be implemented as a single component (whether at the location of the battery or remote from it). Further details regarding operation of the CDI agent to determine operations to take for the battery are discussed in greater detail below.

In addition, while not illustrated with respect to FIG. 10, in some embodiments multiple batteries (e.g., tens, hundreds, thousands, millions, etc.) may each have an associated CDI agent that controls actions of that battery in a similar manner, and with the various batteries acting together in a coordinated manner to supply aggregate power to the utility or to other entities. In such embodiments, the utility or other external entity may send synchronization and monitoring signals for use by the various systems including the batteries, and the multiple CDI agents associated with the various batteries may interact to exchange information and maintain at least partial coordination between the operations of the batteries.

Figure 11:
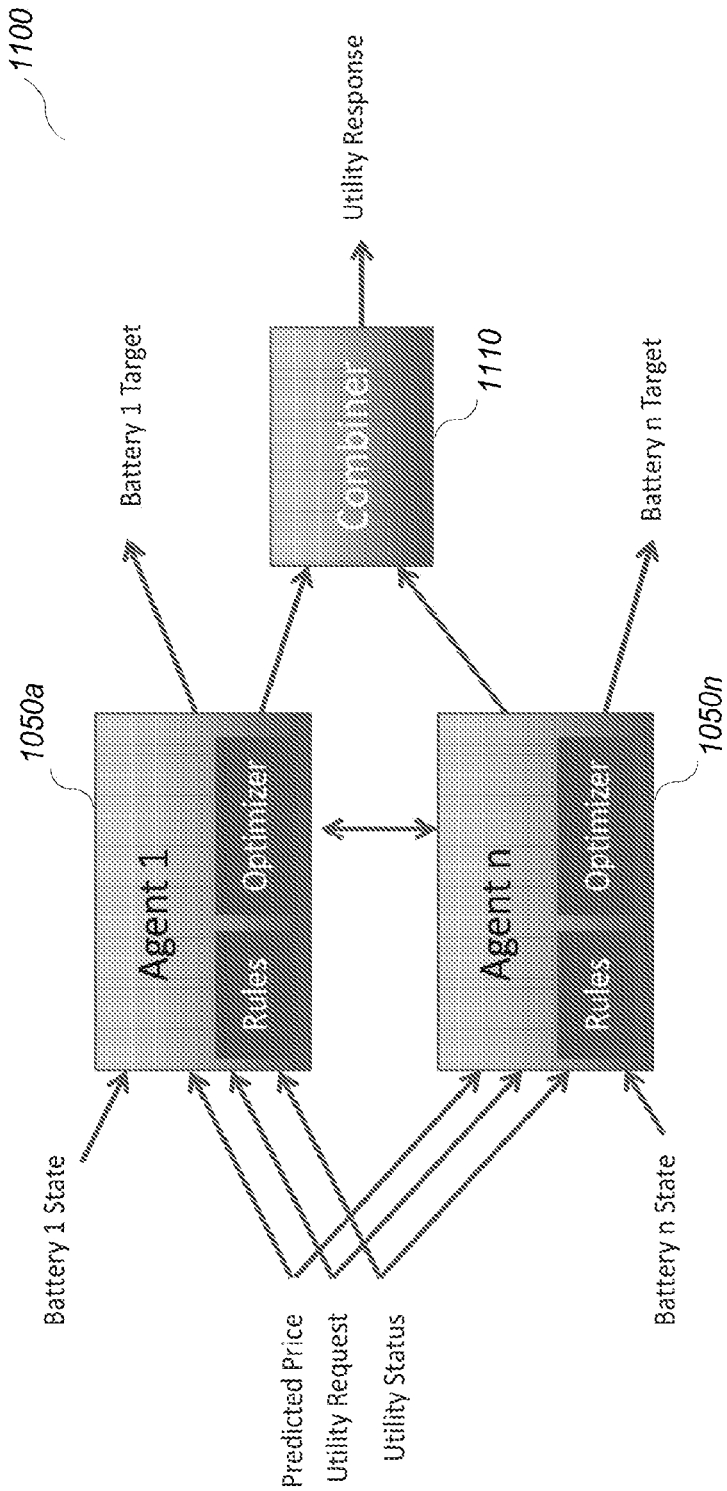
FIG. 11 is a block diagram illustrating example components of an embodiment of a system that performs automated control of DC power from multiple batteries in a coordinated manner.

FIG. 11 is a block diagram illustrating one example of components of an embodiment of a system 1100 that performs automated control of DC power from multiple batteries in a coordinated manner, such as in a real-time manner and to optimize long-term operation of the batteries. In particular, multiple CDI agents 1050*a-n* are illustrated, which are each controlling operation of one of n associated batteries (not shown). In the example of FIG. 11, each CDI agent receives not only battery state information for its associated battery, but also may optionally receive additional information that includes requests for power from the utility, status information related to the utility, and/or predicted price information for power that is supplied to an electrical grid (not shown) of the utility from the batteries. Each CDI agent further includes rules and an optimizer component in this example, with the rules specifying the goals and constraints to satisfy for the associated battery, and the optimizer component using those rules and other input information to make corresponding automated control decisions for the associated battery, which are output by the CDI agent as target information for the associated battery. Additional details are included herein related to specification and use of such rules and operations of such an optimizer component. FIG. 11 further illustrates a combiner component 1110 that combines information from the various CDI agents to determine an aggregate response to the utility's requests, corresponding to the aggregate power being provided by the batteries being controlled.

It will also be appreciated that the described techniques may be used with a wide variety of other types of target systems, some of which are further discussed below, and that the invention is not limited to the techniques discussed for particular target systems and corresponding automated control systems. For illustrative purposes, some embodiments are described below in which specific types of operations are performed, including with respect to using the described techniques with particular types of target systems and to perform particular types of control activities that are determined in particular manners. These examples are provided for illustrative purposes and are simplified for the sake of brevity, and the inventive techniques may be used in a wide variety of other situations, including in other environments and with other types of automated control action determination techniques, some of which are discussed below.

More generally, a target system to be controlled or otherwise manipulated may have numerous elements that are inter-connected in various manners, with a subset of those elements being inputs or other control elements that a corresponding automated control system may modify or otherwise manipulate in order to affect the operation of the target system. In at least some embodiments and situations, a target system may further have one or more outputs that the manipulations of the control elements affect, such as if the target system is producing or modifying physical goods or otherwise producing physical effects. For example, output of a target system involving automated control of one or more batteries may include electrical power being provided by the batteries, and inputs or other control elements may include the actuator(s) and/or battery tracking controller(s) used to manipulate the power being provided from the one or more batteries.

As part of implementing such an automated control system for a particular target system, an embodiment of a Collaborative Distributed Decision (CDD) system may use the described techniques to perform various automated activities involved in constructing and implementing the automated control system, including one or more CDI agents (also referred to as a CDD decision module or system, or a portion of such module or system) for use in controlling particular target systems. Some aspects of such activities of an example CDD system is provided below, with additional details included in U.S. patent application Ser. No. 14/746,738, filed Jun. 22, 2015 and entitled "Cooperative Distributed Control Of Target Systems;" in U.S. Patent Application No. 62/182,968, filed Jun. 22, 2015 and entitled "Applications Of Cooperative Distributed Control Of Target Systems;" in U.S. Patent Application No. 62/182, 796, filed Jun. 22, 2015 and entitled "Gauge Systems;" and in international PCT Patent Application No. PCT/US2015/ 037022, filed Jun. 22, 2015 and entitled "Cooperative Distributed Control Of Target Systems," each of which is hereby incorporated by reference in its entirety.

In particular, the CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules (also referred to at times as "decision elements" and/or "agents") to use in performing the control of the target system. When the one or more executable decision modules are deployed and executed, the CDD system may further provide various components within or external to the decision modules being executed to manage their control of the target system, such as a Control Action Determination component of each decision module to optimize or otherwise enhance the control actions that the decision module generates, and/or one or more Coordinated Control Management components to coordinate the control actions of multiple decision modules that are collectively performing the control of the target system.

As noted above, a Collaborative Distributed Decision (CDD) system may in some embodiments use at least some of the described techniques to perform various automated activities involved in constructing and implementing an automated control system for a specified target system, such as to modify or otherwise manipulate inputs or other control elements of the target system that affect its operation (e.g., affect one or more outputs of the target system). An automated control system for such a target system may in some situations have a distributed architecture that provides cooperative distributed control of the target system, such as with multiple decision modules that each control a portion of the target system and that operate in a partially decoupled manner with respect to each other. If so, the various decision modules' operations for the automated control system may be at least partially synchronized, such as by each reaching a consensus with one or more other decision modules at one or more times, even if a fully synchronized convergence of all decision modules at all times is not guaranteed or achieved.

The CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules to use in performing the control of the target system. The Decision Module Construction component may thus operate as part of a configuration or setup phase that occurs before a later run-time phase in which the generated decision modules are executed to perform control of the target system, although in some embodiments and situations the Decision Module Construction component may be further used after an initial deployment to improve or extend or otherwise modify an automated control system that has one or more decision modules (e.g., while the automated control system continues to be used to control the target system), such as to add, remove or modify decision modules for the automated control system.

In some embodiments, some or all automated control systems that are generated and deployed may further provide various components within them for execution during the runtime operation of the automated control system, such as by including such components within decision modules in some embodiments and situations. Such components may include, for example, a Control Action Determination component of each decision module (or of some decision modules) to optimize or otherwise determine and improve the control actions that the decision module generates. For example, such a Control Action Determination component in a decision module may in some embodiments attempt to automatically determine the decision module's control actions for a particular time to reflect a near-optimal solution with respect to or one more goals and in light of a model of the decision module for the target system that has multiple inter-related constraints—if so, such a near-optimal solution may be based at least in part on a partially optimized solution that is within a threshold amount of a fully optimized solution. Such determination of one or more control actions to perform may occur for a particular time and for each of one or more decision modules, as well as be repeated over multiple times for ongoing control by at least some decision modules in some situations. In some embodiments, the model for a decision module is implemented as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function.

In some embodiments, the components included within a generated and deployed automated control system for execution during the automated control system's runtime operation may further include one or more Coordinated Control Management components to coordinate the control actions of multiple decision modules that are collectively performing the control of a target system for the automated control system. For example, some or all decision modules may each include such a Control Action Determination component in some embodiments to attempt to synchronize that decision module's local solutions and proposed control actions with those of one or more other decision modules in the automated control system, such as by determining a consensus shared model with those other decision modules that simultaneously provides solutions from the decision module's local model and the models of the one or more other decision modules. Such inter-module synchronizations may occur repeatedly to determine one or more control actions for each decision module at a particular time, as well as to be repeated over multiple times for ongoing control. In addition, each decision module's model is implemented in some embodiments as a Hamiltonian function that reflects a set of coupled differential equations based in part on constraints representing at least part of the target system, such as to allow each decision module's model and its Hamiltonian function implementation to be combined with the models of one or more other decision modules by adding additional expressions for those other decision modules' models within the initial Hamiltonian function for the local model of the decision module.

As noted above, the described techniques may be used to provide automated control systems for various types of physical systems or other target systems. In one or more embodiments, an automated control system is generated and provided and used to control a micro-grid electricity facility, such as at a residential location that includes one or more electricity sources (e.g., one or more solar panel grids, one or more wind turbines, etc.) and one or more electricity storage and source mechanisms (e.g., one or more batteries). The automated control system may, for example, operate at the micro-grid electricity facility (e.g., as part of a home automation system), such as to receive requests from the operator of a local electrical grid to provide particular amounts of electricity at particular times, and to control operation of the micro-grid electricity facility by determining whether to accept each such request. If a request is accepted, the control actions may further include selecting which electricity source (e.g., solar panel, battery, etc.) to use to provide the requested electricity, and otherwise the control actions may further include determine to provide electricity being generated to at least one energy storage mechanism (e.g., to charge a battery). Outputs of such a physical system include the electricity being provided to the local electrical grid, and a goal that the automated control system implements may be, for example, is to maximize profits for the micro-grid electricity facility from providing of the electricity.

In one or more embodiments, an automated control system is generated and provided and used to control a vehicle with a battery, a motor and in some cases an engine, such as an electrical bicycle in which power may come from a user who is pedaling and/or from a motor powered by the battery and/or the engine. The automated control system may, for example, operate on the vehicle or on the user, such as to control operation of the vehicle by determining whether at a current time to remove energy from the battery to power the motor (and if so to further determine how much energy to remove from the battery) or to instead add excess energy to the battery (e.g., as generated by the engine, and if so to further determine how much energy to generate from the engine; and/or as captured from braking or downhill coasting). Outputs of such a physical system include the effects of the motor to move the vehicle, and a goal that the automated control system implements may be, for example, to move the vehicle at one or more specified speeds with a minimum of energy produced from the battery, and/or to minimize use of fuel by the engine.

It will be appreciated that batteries may be used in a wide variety of other situations and may similarly be controlled by embodiments of the described techniques, such as with solar panels and other photovoltaic systems, electrical cars and other vehicles, etc.

Use of the described techniques may also provide various types of benefits in particular embodiments, including non-exclusive examples of beneficial attributes or operations as follows:
- infer interests/desired content in a cold start environment where textual (or other unstructured) data is available and with minimal user history;
- improve inference in a continuous way that can incorporate increasingly rich user histories;
- improve inference performance with the addition of feedback, explicit/implicit, positive/negative and preferably in a real-time or near-real-time manner;
- derive information from domain experts that provide business value, and embed them in inference framework;
- dynamically add new unstructured data that may represent new states, and update existing model in a calibrated way;
- renormalize inference system to accommodate conflicts;
- immediately do inferencing in a new environment based on a natural language model;
- add new information as a statistical model, and integrate with a natural language model to significantly improve inference/prediction;
- integrate new data and disintegrate old data in a way that only improves performance;
- perform inferencing in a data secure way;
- integrate distinct inferencing elements in a distributed network and improve overall performance;
- easily program rules and information into the system from a lay-user perspective;
- inexpensively perform computer inferences in a way that is suitable for bandwidth of mobile devices; and
- incorporate constraint information.

It will be appreciated that some embodiments may not include all some illustrative benefits, and that some embodiments may include some benefits that are not listed.

Figure 2:
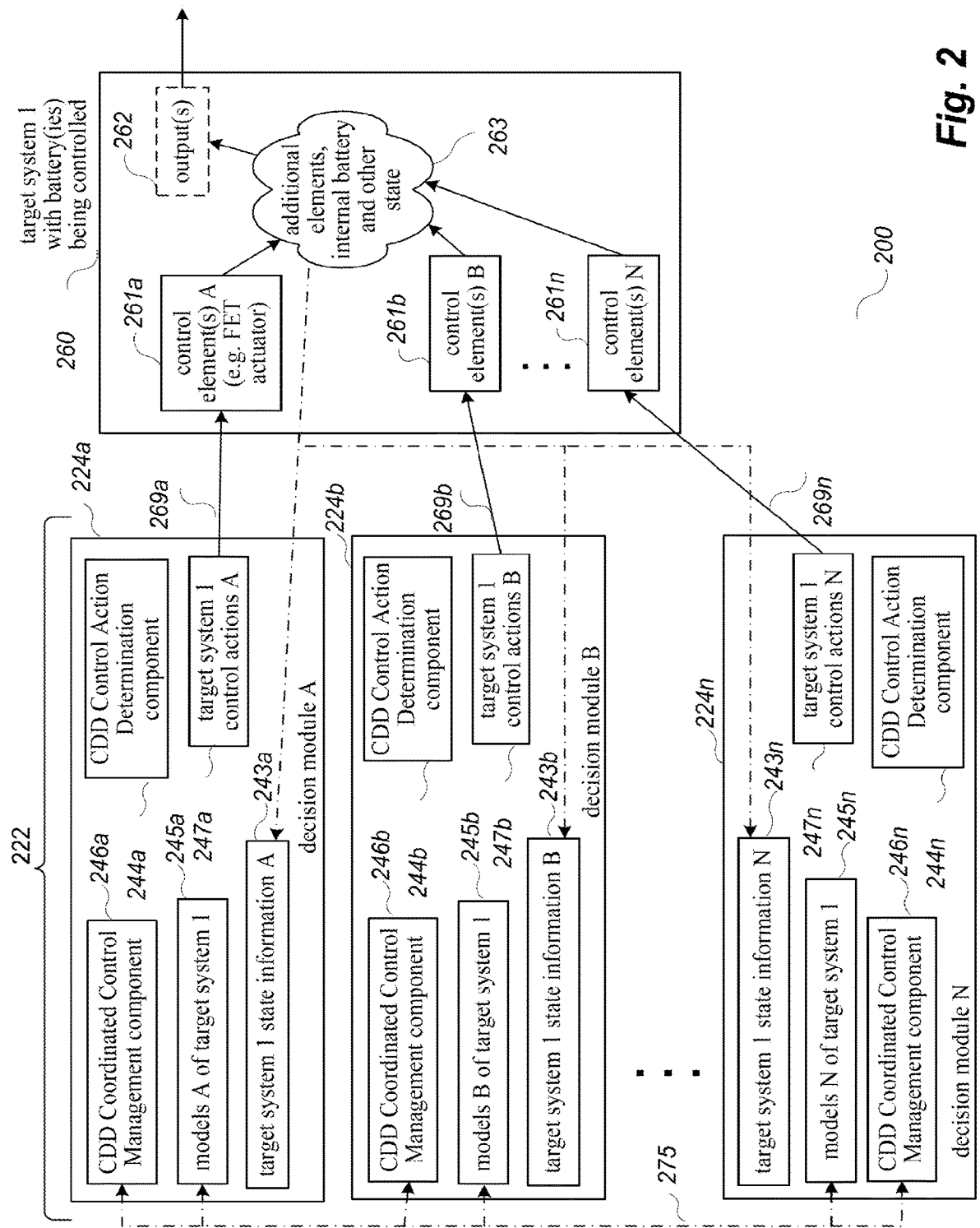
FIG. 2 is a block diagram illustrating an example environment in which a system for performing cooperative distributed control of target systems may be implemented.

FIG. 2 is a block diagram illustrating an example environment in which a system 200 for performing cooperative distributed control of target systems may be implemented, such as to control physical target systems having one or more batteries by using characteristics of each battery's state to perform automated control of DC power that is provided from the battery (e.g., in a real-time manner and to optimize long-term operation of the battery), such as in the matter discussed with respect to FIGS. 10-29 and elsewhere herein. In particular, the system 200 is analogous in some respects to system 1100 of FIG. 11, such as the CDD decision modules 224 of FIG. 2 (or their CDD Control Action Determination components 244 and/or CDD Coordinated Control Management components 246) correspond to the CDI agents 1050 of FIG. 11, and if the target system of FIG. 2 include batteries to be controlled (e.g., with respect to control elements 261), but with additional details in FIG. 2 regarding operation of the CDD decision modules.

In particular, in the example environment of FIG. 2, target system 1 260 is illustrated, with the automated control system 222 being deployed and implemented to use in actively controlling the target system 1 260. It will be appreciated that such target system may include a variety of mechanical, electronic, chemical, biological, and/or other types of components to implement operations of the target system in a manner specific to the target system. In the example of FIG. 2, the decision modules 224 are represented as individual decision modules 224a, 224b, etc., to 224n, and may be executing locally to the target system 1 260 and/or in a remote manner over one or more intervening computer networks (not shown). In the illustrated example, each of the decision modules 224 includes a local copy of a CDD Control Action Determination component 244, such as with component 244a supporting its local decision module 224a, component 244b supporting its local decision module 224b, and component 244n supporting its local decision module 224n. Similarly, the actions of the various decision modules 224 are coordinated and synchronized in a peer-to-peer manner in the illustrated embodiment, with each of the decision modules 224 including a copy of a CDD Coordinated Control Management component 246 to perform such synchronization, with component 246a supporting its local decision module 224a, component 246b supporting its local decision module 224b, and component 246n supporting its local decision module 224n.

As the decision modules 224 and automated control system 222 execute, various interactions 275 between the decision modules 224 are performed, such as to share information about current models and other state of the decision modules to enable cooperation and coordination between various decision modules, such as for a particular decision module to operate in a partially synchronized consensus manner with respect to one or more other decision modules (and in some situations in a fully synchronized manner in which the consensus actions of all of the decision modules 224 converge). During operation of the decision modules 224 and automated control system 222, various state information 243 may be obtained by the automated control system 222 from the target system 260, such as initial state information and changing state information over time (e.g., with respect to batteries, not shown, corresponding to control elements 261 of target system 1), and including outputs or other results in the target system 1 from control actions performed by the decision modules 224.

The target system 1 in this example includes various control elements 261 (e.g., batteries and their power output) that the automated control system 222 may manipulate, and in this example each decision module 224 may have a separate group of one or more control elements 261 that it manipulates (such that decision module A 224a performs interactions 269a to perform control actions A 247a on control elements A 261a, decision module B 224b performs interactions 269b to perform control actions B 247b on control elements B 261b, and decision module N 224n performs interactions 269n to perform control actions N 247n on control elements N 261n). Such control actions affect the internal state 263 of other elements of the target system 1, including optionally to cause or influence one or more outputs 262 (e.g., aggregate electrical power being produced from the multiple batteries). As discussed in greater detail elsewhere herein, control element 261a may, for example, be a FET actuator connected to a particular first battery (not shown) of target system 1 that is being controlled, and other control elements 261b-n may similarly be other FET actuators connected to other batteries (not shown) of target system 1. As operation of the target system 1 is ongoing, at least some of the internal state information 263 is provided to some or all of the decision modules to influence their ongoing control actions, with each of the decision modules 224a-224n possibly having a distinct set of state information 243a-243n, respectively, in this example.

As discussed in greater detail elsewhere, each decision module 224 may use such state information 243 and a local model 245 of the decision module for the target system to determine particular control actions 247 to next perform, such as for each of multiple time periods, although in other embodiments and situations, a particular automated control system may perform interactions with a particular target system for only one time period or only for some time periods. For example, the local CDD Control Action Determination component 244 for a decision module 224 may determine a near-optimal location solution for that decision module's local model 245, and with the local CDD Coordinated Control Management component 246 determining a synchronized consensus solution to reflect other of the decision modules 224, including to update the decision module's local model 245 based on such local and/or synchronized solutions that are determined. Thus, during execution of the automated control system 222, the automated control system performs various interactions with the target system 260, including to request state information, and to provide instructions to modify values of or otherwise manipulate control elements 261 of the target system 260. For example, for each of multiple time periods, decision module 224a may perform one or more interactions 269a with one or more control elements 261a of the target system, while decision module 224b may similarly perform one or more interactions 269b with one or more separate control elements B 261b, and decision module 224n may perform one or more interactions 269n with one or more control elements N 261n of the target system 260. In other embodiments and situations, at least some control elements may not perform control actions during each time period.

In other embodiments and situations (e.g., if only a single battery is being controlled), the deployed copy of the automated control system may include only a single executing decision module, such as to include a local CDD Control Action Determination component but to not include any local CDD Coordinated Control Management component (since there are not other decision modules with which to synchronize and interact).

While not illustrated in FIG. 2, the distributed nature of operations of automated control systems such as those of 222 allow partially decoupled operations of the various decision modules, include to allow modifications to the group of decision modules 224 to be modified over time while the automated control system 222 is in use, such as to add new decision modules 224 and/or to remove existing decision modules 224 (e.g., to reflect changes to underlying batteries in use, such as in different home power systems). In a similar manner, changes may be made to particular decision modules 224 and/or 228, such as to change rules or other restrictions specific to a particular decision module and/or to change goals specific to a particular decision module over time, with a new corresponding model being generated and deployed within such a decision module, including in some embodiments and situations while the corresponding automated control system continues control operations of a corresponding target system. In addition, while each automated control system is described as controlling a single target system in the examples of FIG. 2, other configurations may be used in other embodiments and situations, such as for a single automated control system to control multiple target systems (e.g., multiple inter-related target systems, multiple target systems of the same type, etc.), and/or multiple automated control systems may operate to control a single target system, such as by each operating independently to control different portions of that target control system. It will be appreciated that other configurations may similarly be used in other embodiments and situations.

Figure 12:
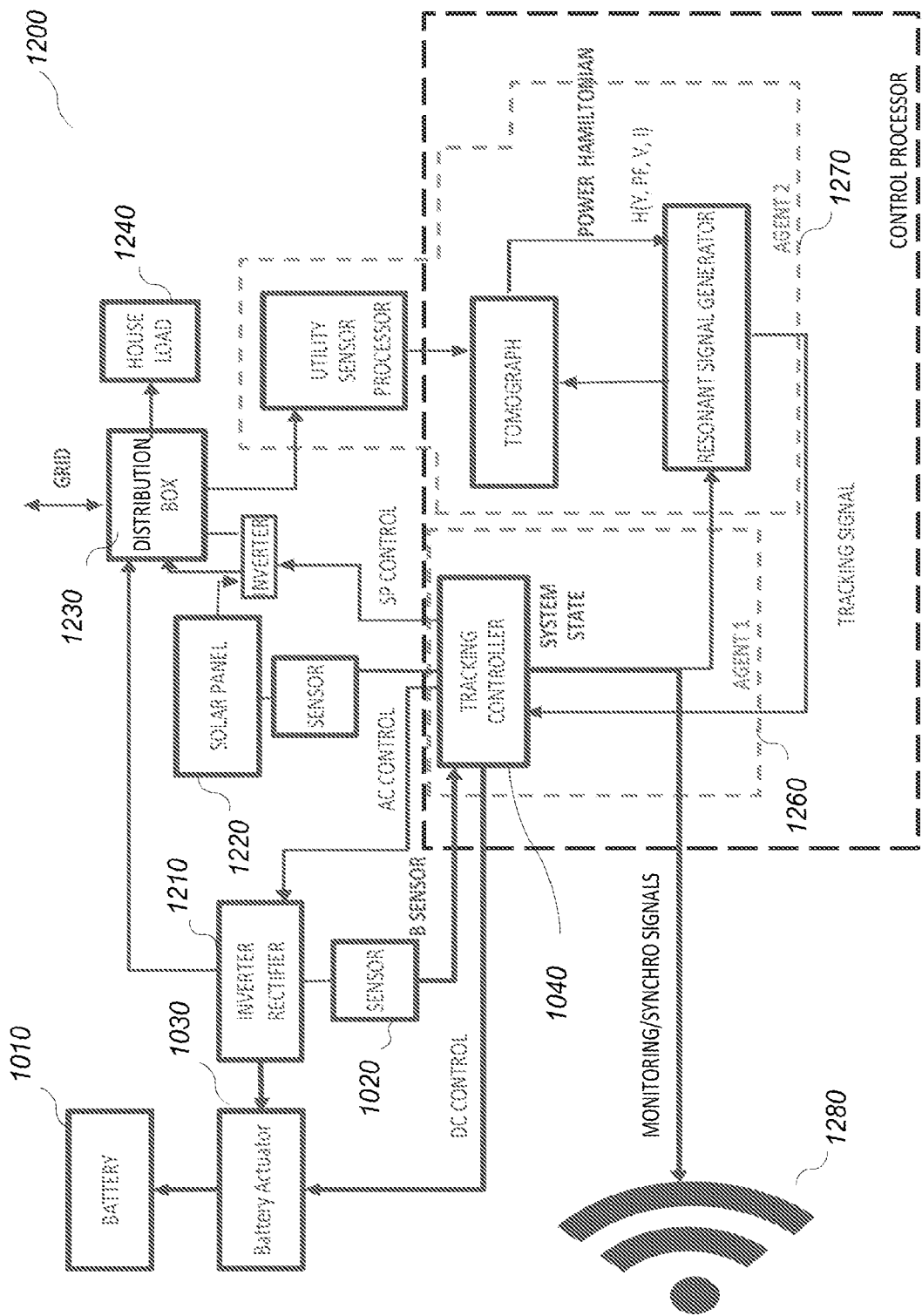
FIG. 12 is a block diagram illustrating example components of an embodiment of a system for performing automated control of DC power from a battery that is part of a home electrical power system with solar power being generated, with the home power generation and use being monitored and synchronized by an external entity.

FIG. 12 illustrates an embodiment of controlling a battery as part of a larger target system, which in this example is a system 1200 involving a home power system that includes a solar panel—thus, the example embodiments discussed previously with respect to FIGS. 10 and/or 11 may in some situations be used as part of a larger system such as the example system 1200. In particular, the block diagram of FIG. 12 illustrates example components of an embodiment of a system 1200 for performing automated control of DC power from a battery that is part of a home electrical power system with solar power being generated, such as in a real-time manner and/or to optimize long-term operation of the battery, and with the home power generation and use being monitored and synchronized by an external entity, such as an entity providing or managing one or more CDI agents to control the battery of the system 1200. In the example of FIG. 12, the example home's power system is also connected to an external electrical grid from which it receives power and provides power at various times, with the battery serving to store electrical power generated by the solar power system and to supply power to the house and/or to the electrical grid as appropriate.

In the illustrated example of FIG. 12, components similar to those of FIG. 10 continue to be illustrated, including a battery 1010, a sensor module 1020, an actuator 1030 for the battery, an on-site battery tracking controller 1040, etc. In the example of FIG. 12, however, the CDI agent 1050 of FIG. 10 is not illustrated as part of the components present at the physical location of the example house, such as if the CDI agent in use with respect to FIG. 12 instead executes in a remote location (e.g., in the cloud or other computer network location) and provides tracking and/or synchronization signals to the battery tracking controller 1040 of FIG. 12 in a manner similar to that illustrated with respect to FIG. 10. Such tracking and/or synchronization signals may, for example, include desired power output of the battery and/or desired battery parameters (e.g., internal temperature, voltage, current, etc.) for a current time or immediately subsequent time. In addition, as discussed in greater detail elsewhere herein, the CDI agent(s) may generate such tracking and/or synchronization signals based on monitored information about the battery 1010 (and any other batteries being controlled), power requests from the utility managing the external electrical grid, defined constraints or other rules to be used, etc.

In addition, a number of additional components are illustrated in FIG. 12, including an inverter/rectifier module 1210 that receives output power from the battery and/or supplies electrical power to the battery for storage, a solar panel 1220 that generates electrical power and that has its own associated sensor and inverter, a distribution box 1230 that receives and/or supplies power to an external electrical grid and that controls power distribution to a load 1240 for the house, etc. In addition, two local control agents 1260 and 1270 are illustrated to assist in controlling operation of the battery tracking controller 1040 of FIG. 12, with Agent1 1260 interacting directly with the battery tracking controller, and Agent2 1270 performing activities to synchronize the AC phase of the power for the battery with that of the house power system and/or grid, such as to provide resonance for the power being received and/or provided. The battery tracking controller 1040 and agents 1260 and 1270 (other than the utility sensor processor) are together referred to as a 'control processor' in this example, with the battery tracking controller providing system status updates, and with communications between the agents being managed to support such a multi-agent architecture. The tomography of Agent2 tracks dynamic changes in the battery state using a non-destructive x-ray. In addition, an external entity 1280 (e.g., the utility providing or managing the external electrical grid) is providing monitoring and synchronization signals in this example to the battery tracking controller 1040, such as coordinate the power being used and/or provided via numerous such home power systems and/or other customers.

While the example of FIG. 12 involves use of the battery 1010 in a solar panel system, it will be appreciated that batteries may be charged and/or discharged in a variety of types of environments and systems, and similar activities of a corresponding CDI agent may be used to control such activities in the manner described herein.

Figure 15:
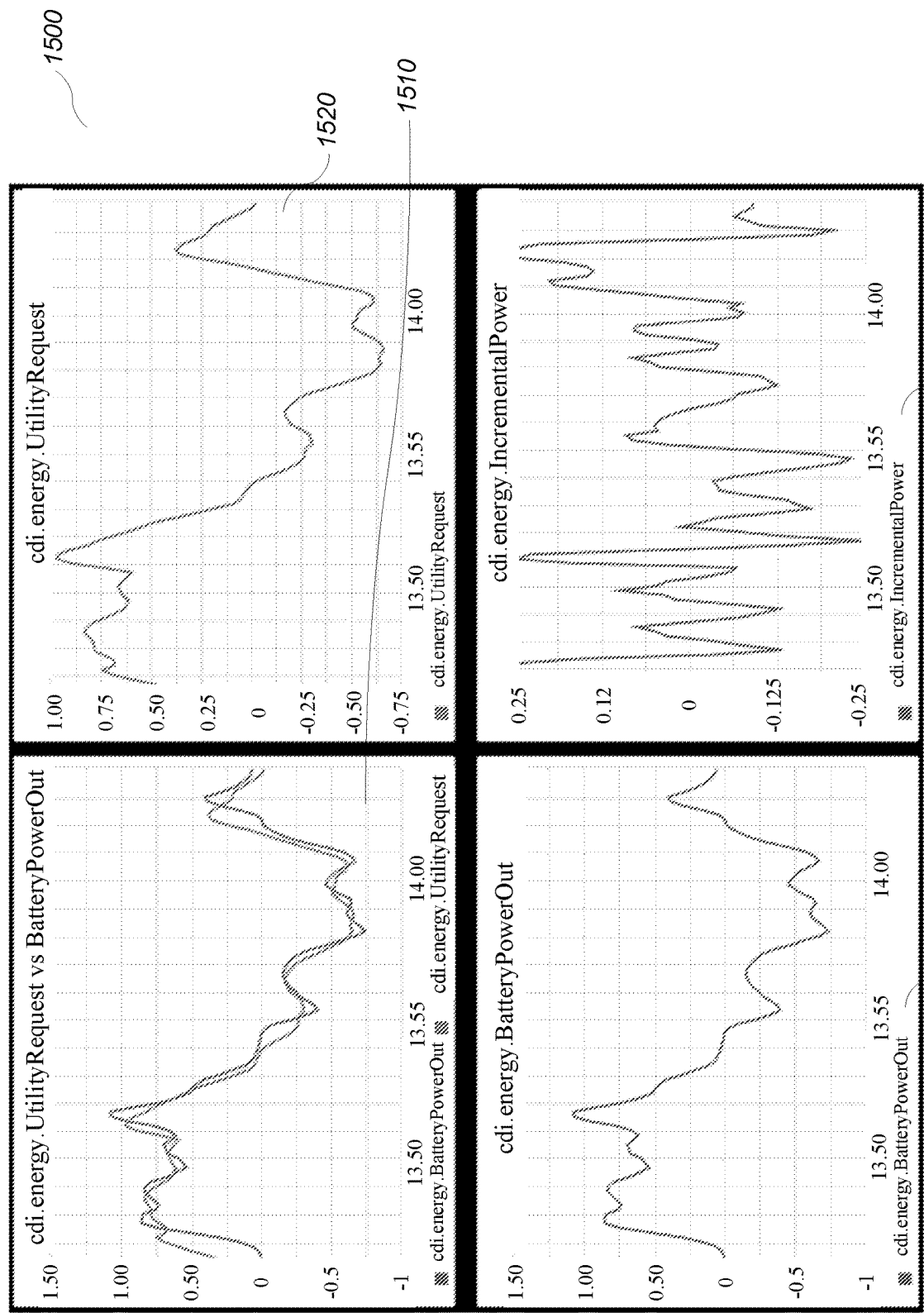
FIG. 15 is a block diagram illustrating example visual displays of performance of an embodiment of a system that is using characteristics of a battery's state to perform automated control of DC power from the battery, with the home power generation and use being monitored and synchronized by an external entity.

FIG. 15 is a block diagram 1500 illustrating example visual displays of performance of an embodiment of a system that is using characteristics of a battery's state to perform automated control of DC power from the battery, with the home power generation and use being monitored and synchronized by an external entity, such as in the example of FIG. 12. In particular, in the example of FIG. 15, chart 1520 illustrates power requests that are received over time from a utility for one or more home power systems under the automated control of CDI agent(s), chart 1530 illustrates power that is supplied by the home power system(s) in response to the requests from the utility based on the automated control of the CDI agent(s), and chart 1510 combines the charts together. As is illustrated, the automated control of the CDI agent(s) provides highly accurate responses to the utility requests over time, while also optimizing performance of the one or more batteries in the home power system(s). In addition, chart 1540 further illustrates the incremental power supplied by the one or more batteries in the home power system(s) based on the automated control of the CDI agent(s).

Figure 13:
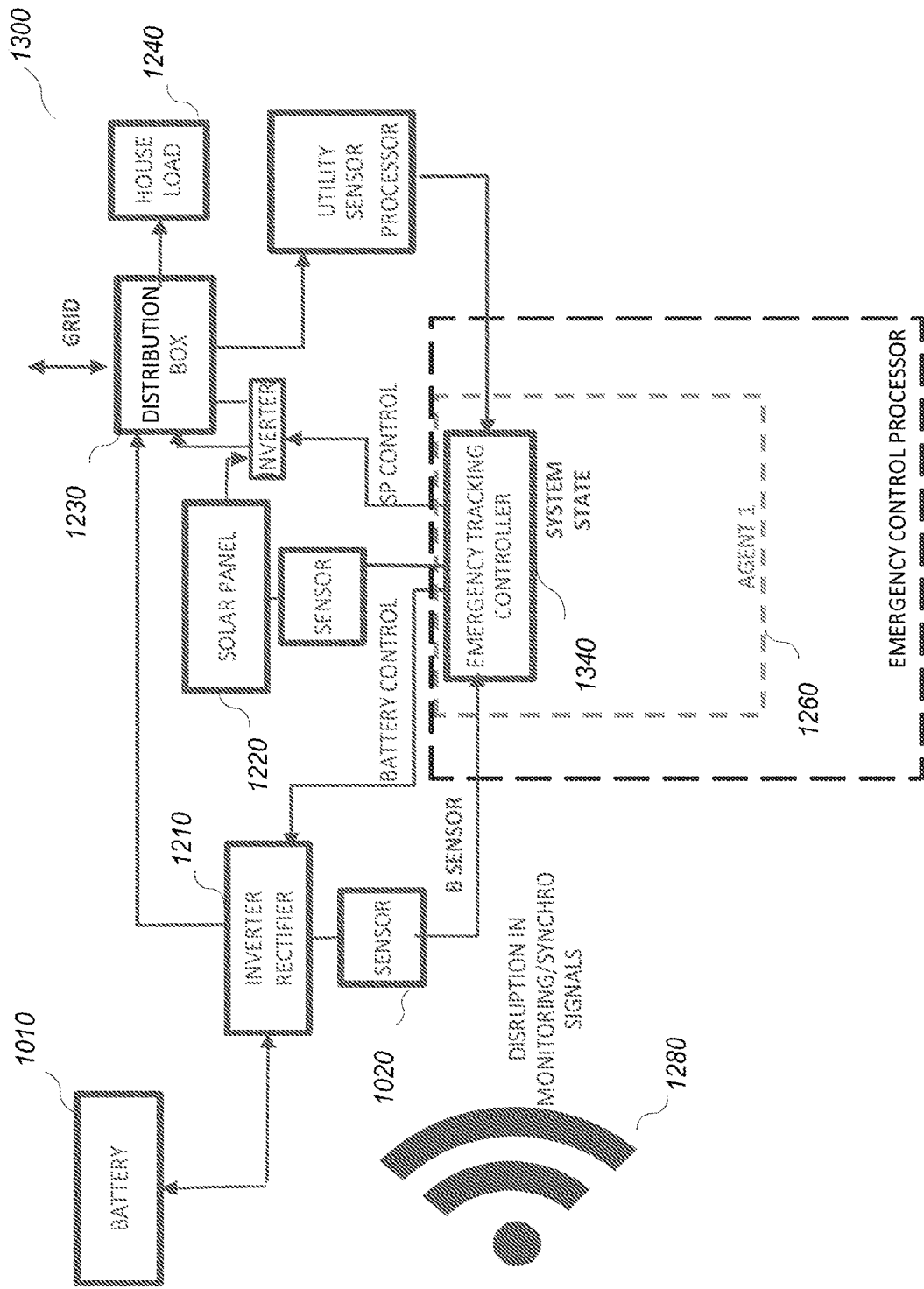
FIG. 13 is a block diagram illustrating example components of an embodiment of a system for performing automated control of DC power from a battery that is part of a home electrical power system with solar power being generated, in which typical monitoring and synchronization of the home power generation and use is temporarily interrupted.

FIG. 13 illustrates a further example of a system 1300 similar to that of system 1200 of FIG. 12, but in which the system 1300 is operating in a restricted emergency mode due to loss of monitoring/synchronization signals from the utility or other external entity that provides power requests. In particular, the block diagram of system 1300 illustrates a number of elements similar to that of system 1200 of FIG. 12, including a battery 1010 that is being controlled, a solar panel 1220, a distribution box 1230 and a house load 1240. However, in the example of FIG. 13, the signals from entity 1280 have been disrupted, and in response the control of the battery 1010 has been switched from the normal battery tracking controller 1040 of FIG. 12 to an alternative emergency battery tracking controller 1340 in FIG. 13. In addition, the components illustrated in FIG. 12 with respect to the Agent2 1270 are not illustrated in FIG. 13, as the system does not provide the phase synchronization and resonance functionality of FIG. 12 without the monitoring/synchronization signals that are missing in the situation of FIG. 13. In this example, the emergency battery tracking controller 1340 operates in a temporary fashion to maintain operation of the battery 1010 in the absence of the monitoring/synchronization signals, such as to receive information about the battery state and to issue corresponding instructions for the battery operation, such as based on battery state but without attempting to respond to power requests from the utility. Additional details are described below with respect to operation of the emergency controller in at least some embodiments.

Figure 16:
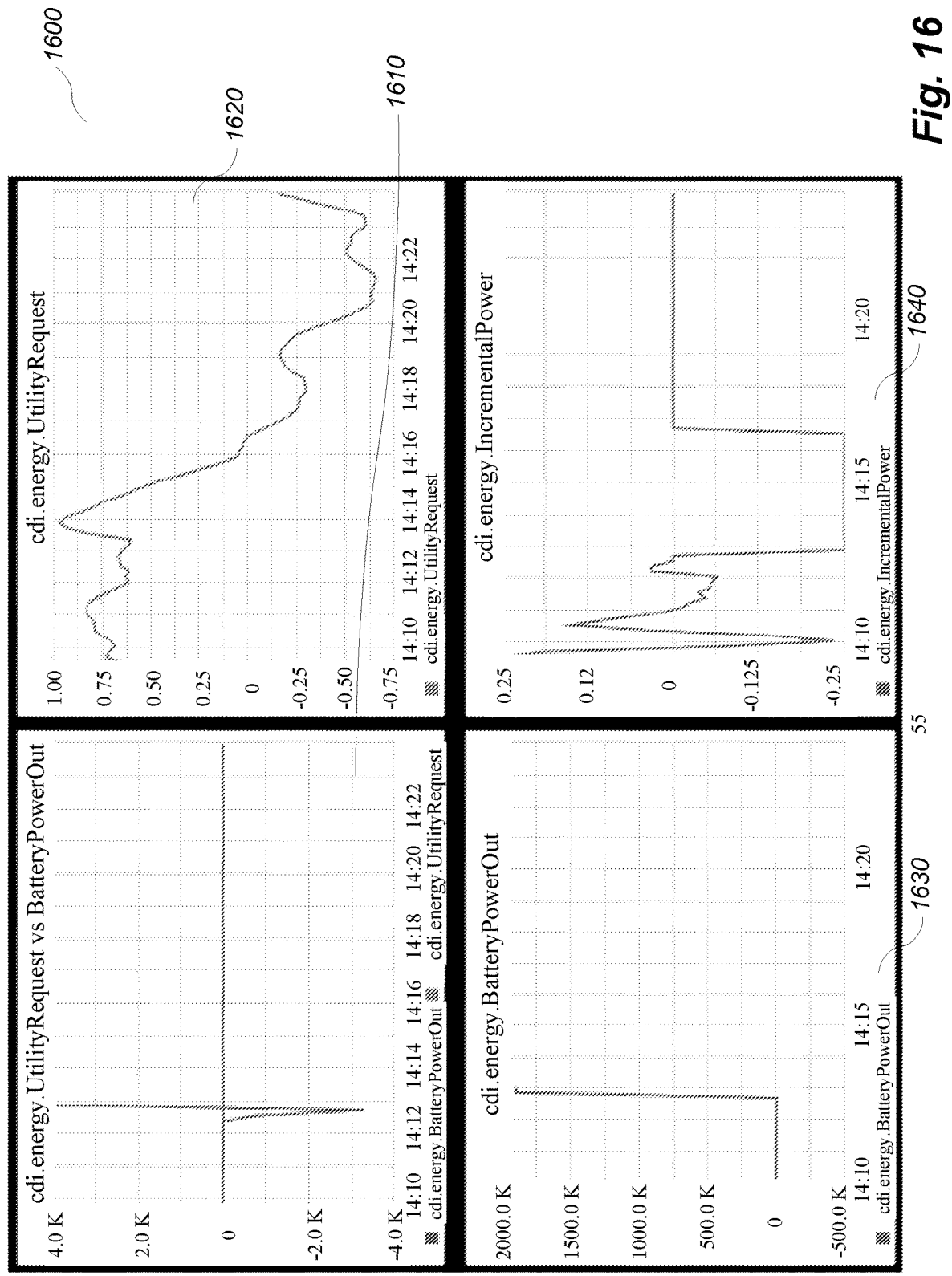
FIG. 16 is a block diagram illustrating example visual displays of performance of an embodiment of a system that is using characteristics of a battery's state to perform automated control of DC power from the battery, in which typical monitoring and synchronization of the home power generation and use is temporarily interrupted.

FIG. 16 is a block diagram 1600 similar to the block diagram 1500 of FIG. 15, with respect to illustrating example visual displays of performance of an embodiment of a system that is using characteristics of a battery's state to perform automated control of DC power from the battery, but in which typical monitoring and synchronization of the home power generation and use is temporarily interrupted, such as in the example of FIG. 13. In particular, in the example of FIG. 16, chart 1620 illustrates power requests that are made over time by a utility for one or more home power systems under the automated control of CDI agent(s) but are not received by the home power systems due to the temporary interruption, and chart 1630 illustrates power that is supplied by the home power system(s) over time. Chart 1610 combines information together about the power supplied and the home power system's information about the utility's power requests, but with those power requests set to 0 during the time of temporary interruption since they are not received. Chart 1640 further illustrates the incremental power supplied by the one or more batteries in the home power system(s) based on the automated control of the CDI agent(s)—as is shown, despite the lack of utility power requests, the CDI agent(s) still control the power output of the one or more batteries based on other factors, such as the internal state of the one or more batteries, in order to continue to optimize performance of the one or more batteries in the home power system(s) to the extent possible based on the partial information that is available.

Figure 14:
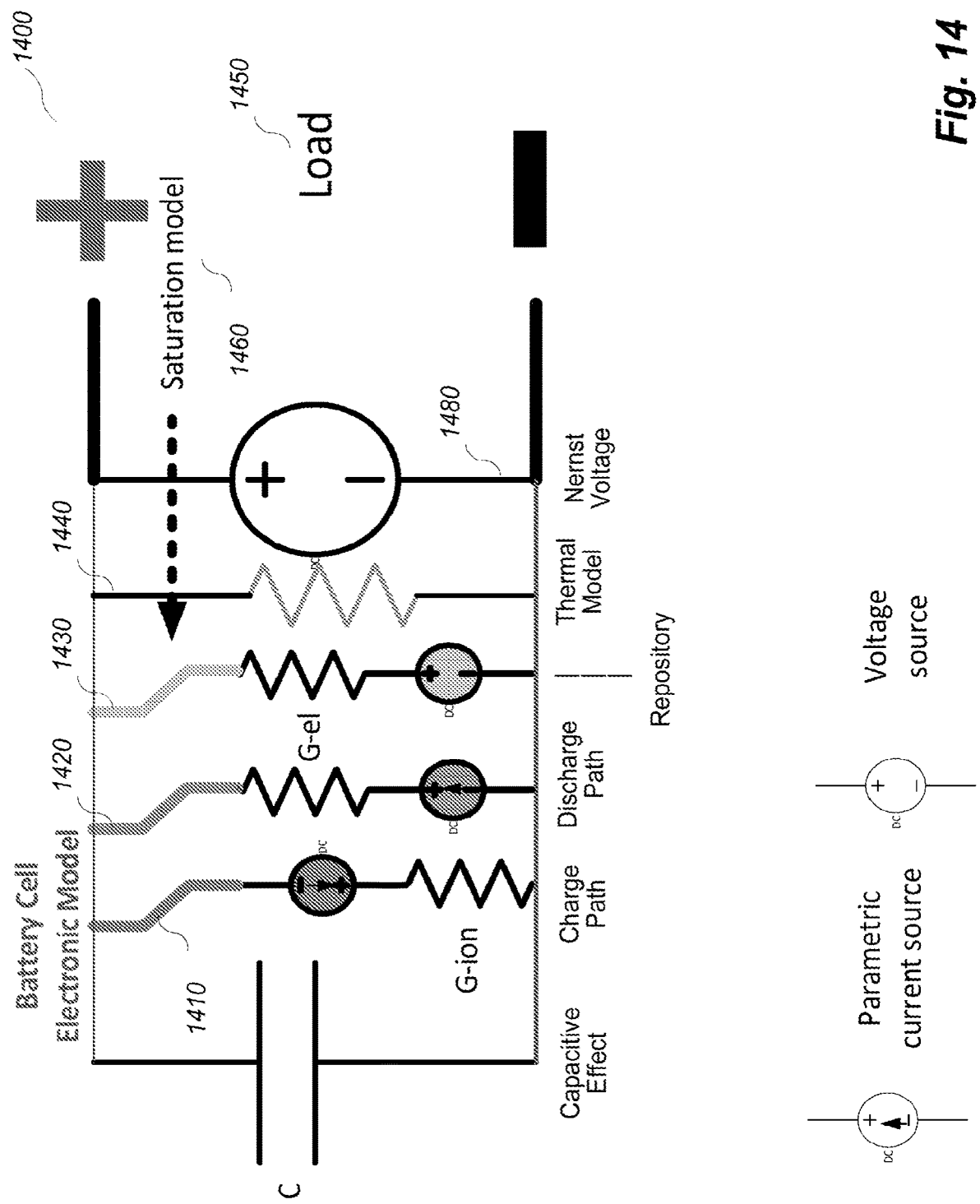
FIG. 14 is a block diagram illustrating example components of an embodiment of a system for modeling a battery's state and operation to enable automated control of DC power from the battery.

FIG. 14 is a block diagram illustrating example components of a model 1400 of a battery's state and operation, to enable automated control of DC power from the battery, such as in a real-time manner and to optimize long-term operation of the battery. In particular, the model 1400 of FIG. 14 includes representations of a charge path 1410 for the battery, a discharge path 1420 for the battery, a thermal model 1440 for the battery, a repository 1430, as well as a load 1450 that may be placed on the battery and supported by a nernst voltage 1480 produced by the battery. As discussed in greater detail elsewhere herein, in at least some embodiments and situations, the control of the battery may include preventing or minimizing the operation of the battery at a saturation level corresponding to the saturation model 1460, such as with the battery operating outside an optimal temperature range or other set of operational characteristics that decrease the life of the battery and/or impose other detrimental effects on the battery. By instead controlling the battery to operate in a linear range at all times or as much as is possible, various benefits are obtained, including increased battery life and/or other improved operational characteristics, as discussed in greater detail elsewhere herein.

Figure 17:
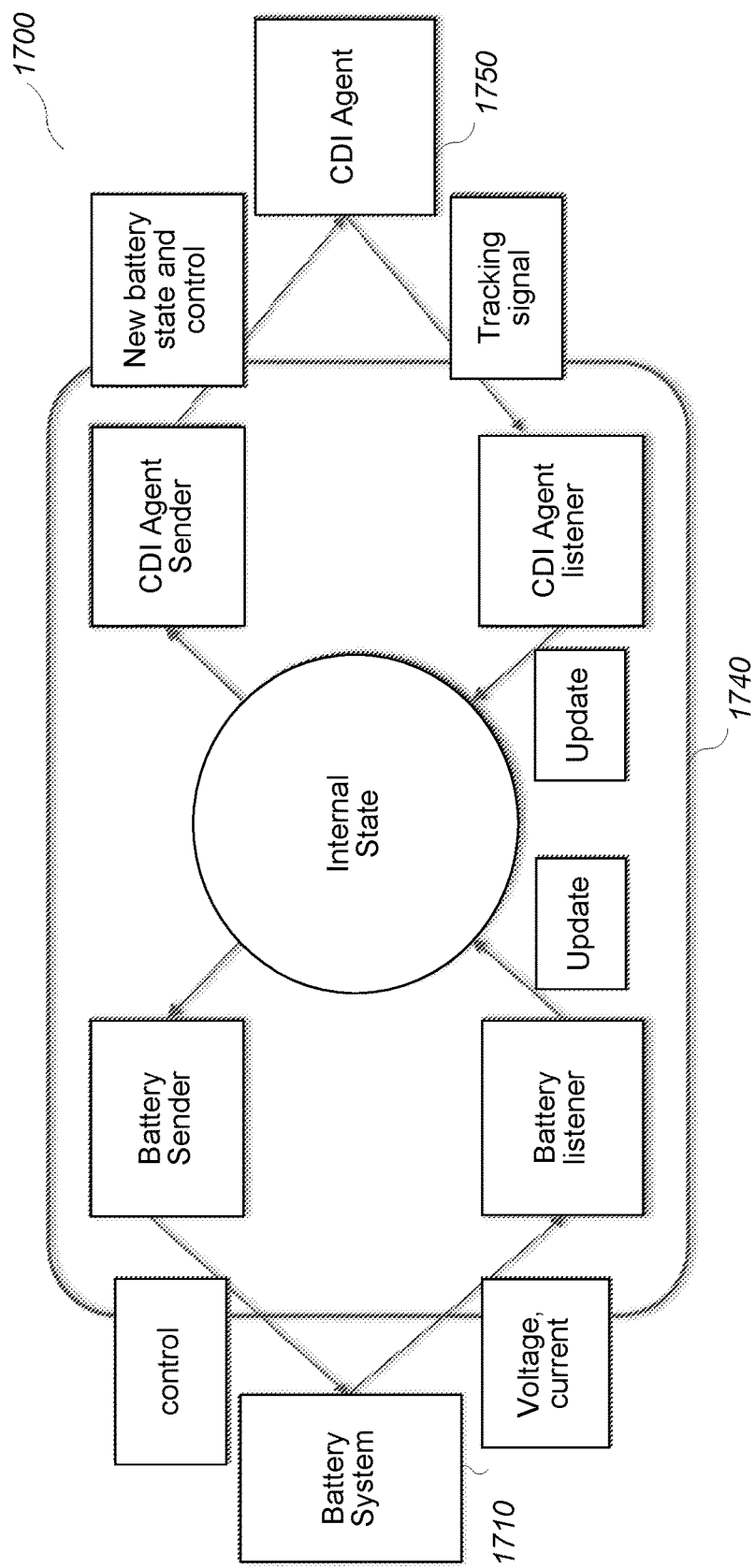
FIG. 17 is a block diagram illustrating example components of an embodiment of a system for using characteristics of a battery's state to perform automated control of DC power from the battery.

FIG. 17 is a block diagram illustrating an embodiment of an example system 1700 for using characteristics of a battery's state to perform automated control of DC power from the battery, such as in a real-time manner and to optimize long-term operation of the battery. In particular, in a manner similar to that of system 1000 of FIG. 10, a CDI agent 1750 operates to control operation of a battery system 1710, with details of the battery system (e.g., a battery, sensor(s), actuators, battery tracking controller, etc.) not illustrated. Additional information 1740 is also illustrated to show information used and exchanged as part of controlling the battery system, including to maintain information about an internal state of the battery, and monitoring components to send and listen to various information being exchanged (e.g., as part of an information publish/subscribe or other push system) and used to update the internal state information.

Figure 18:
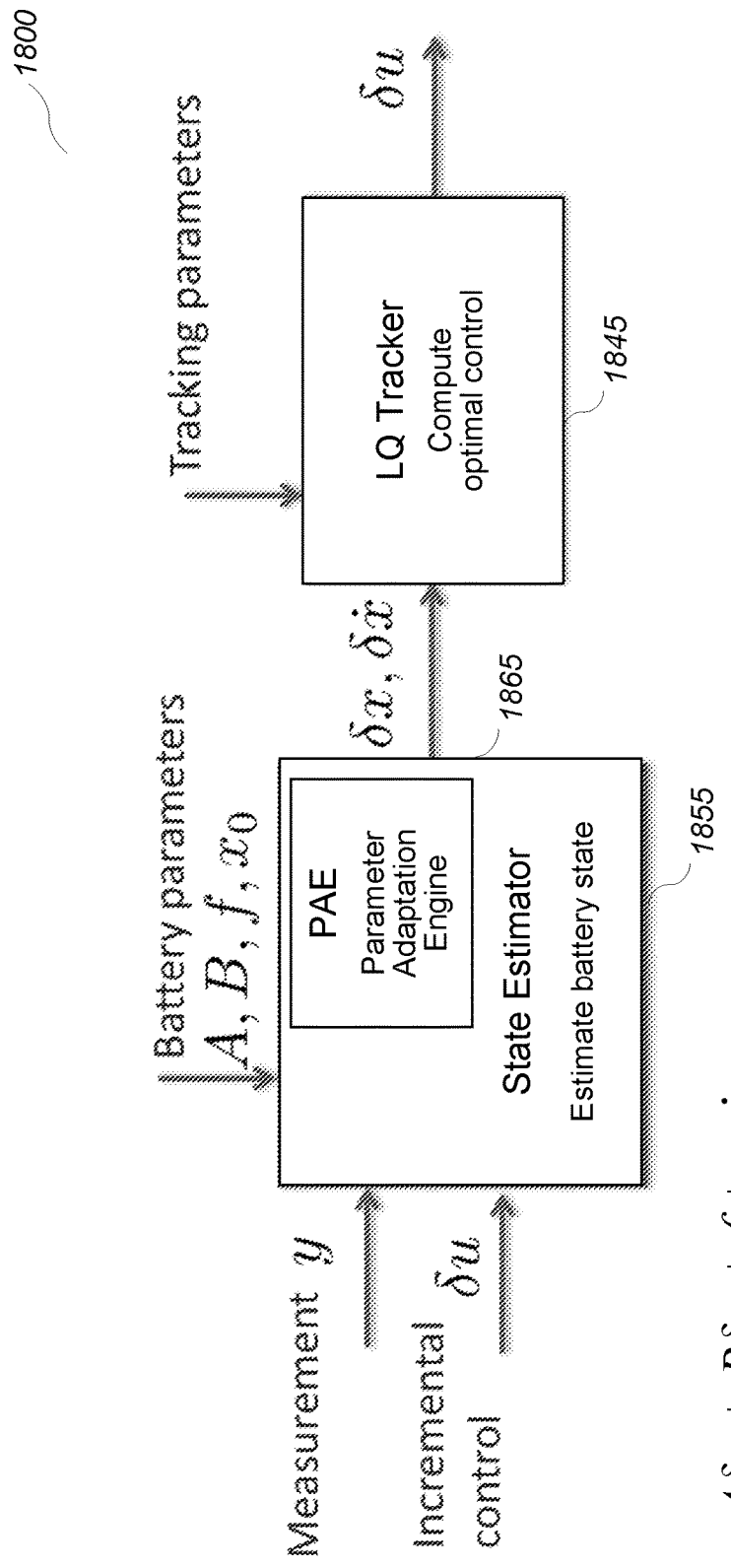
FIG. 18 is a block diagram illustrating example components of an embodiment of a system for using characteristics of a battery's state to perform automated control of DC power from the battery.

FIG. 18 is a block diagram illustrating example components of an embodiment of a system 1800 for using characteristics of a battery's state to perform automated control of DC power from the battery, such as in a real-time manner and to optimize long-term operation of the battery. In particular, the illustrated system shows data flow into and between various components, including a state estimator component 1855 that receives information for a battery including various battery parameters (e.g., nernst potential, incremental value to saturation, capacity, etc.), other measurements (e.g., voltage, current, temperature, etc.) and incremental control applied to the battery (e.g., a desired power to provide, either as an absolute value or an incremental change), and estimates a corresponding state of the battery. The state estimator component also includes a parameter adaptation engine (PAE) 1865 in this example that adapts the incoming battery parameter information in one or more defined manners. The state estimator component provides output about the estimated state to the LQ tracker component 1845, which operates as a battery tracking controller to receive the estimated battery state information and other tracking parameters, to compute one or more optimal or approximately optimal control actions for the battery, and to output those control actions to be applied to the battery.

Figure 19:
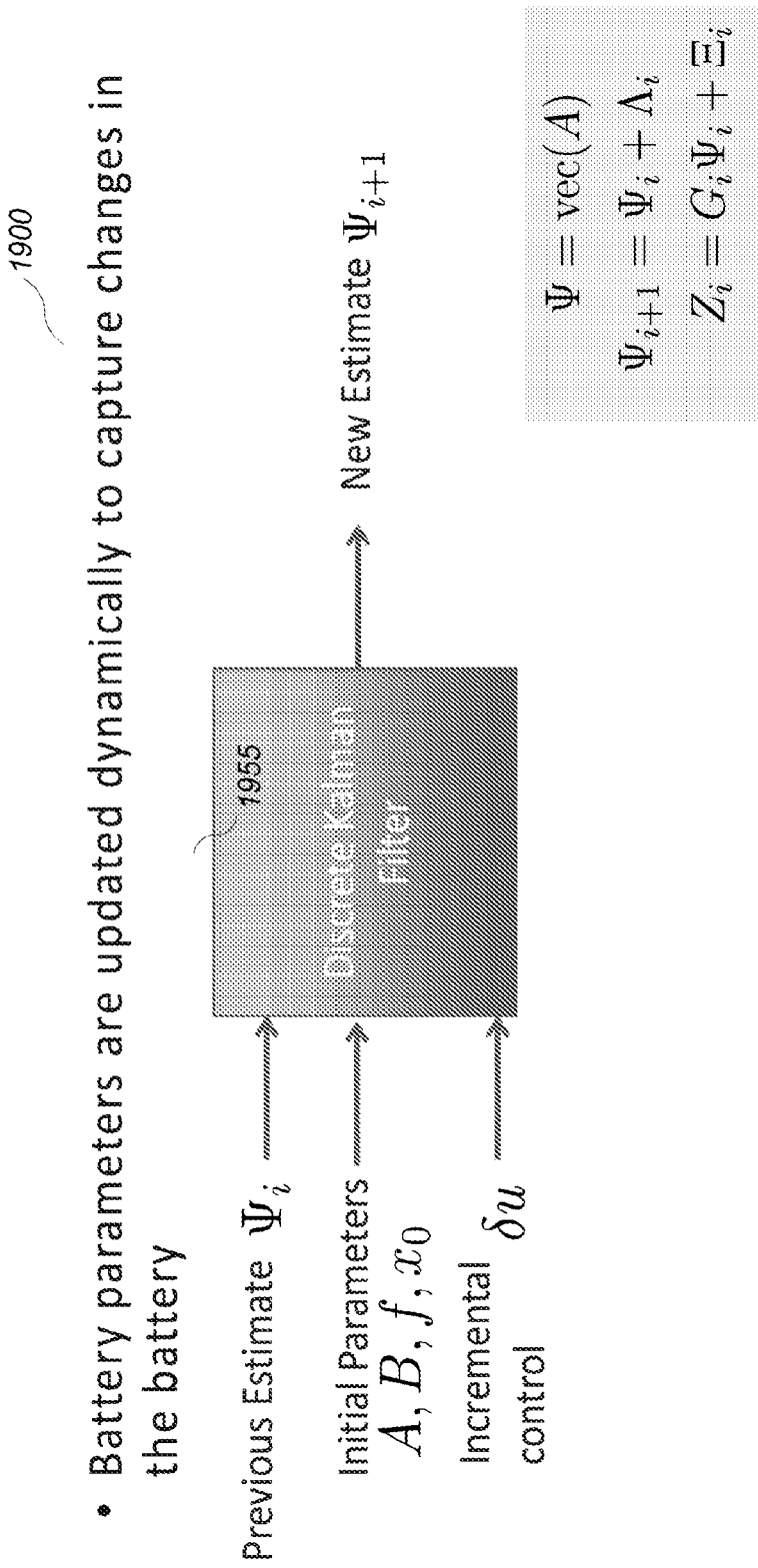
FIG. 19 is a block diagram illustrating example components of an embodiment of a system for using characteristics of a battery's state to perform automated control of DC power from the battery.

FIG. 19 is a block diagram illustrating example components of an embodiment of a system 1900 for using characteristics of a battery's state to perform automated control of DC power from the battery, such as in a real-time manner and to optimize long-term operation of the battery. In particular, FIG. 19 continues the example of FIG. 18, and provides further details regarding an example embodiment of the state estimator component 1855 of FIG. 18, which in the example of FIG. 19 is a discrete Kalman filter 1955. In this example, the filter 1955 takes as input information about the previously estimated battery parameters, initial values for the parameters, and information about incremental control actions taken for the battery, and uses the information to generate a new estimate of the battery parameters, so as to dynamically update the battery parameter estimates to capture ongoing changes in the battery.

Figure 20:
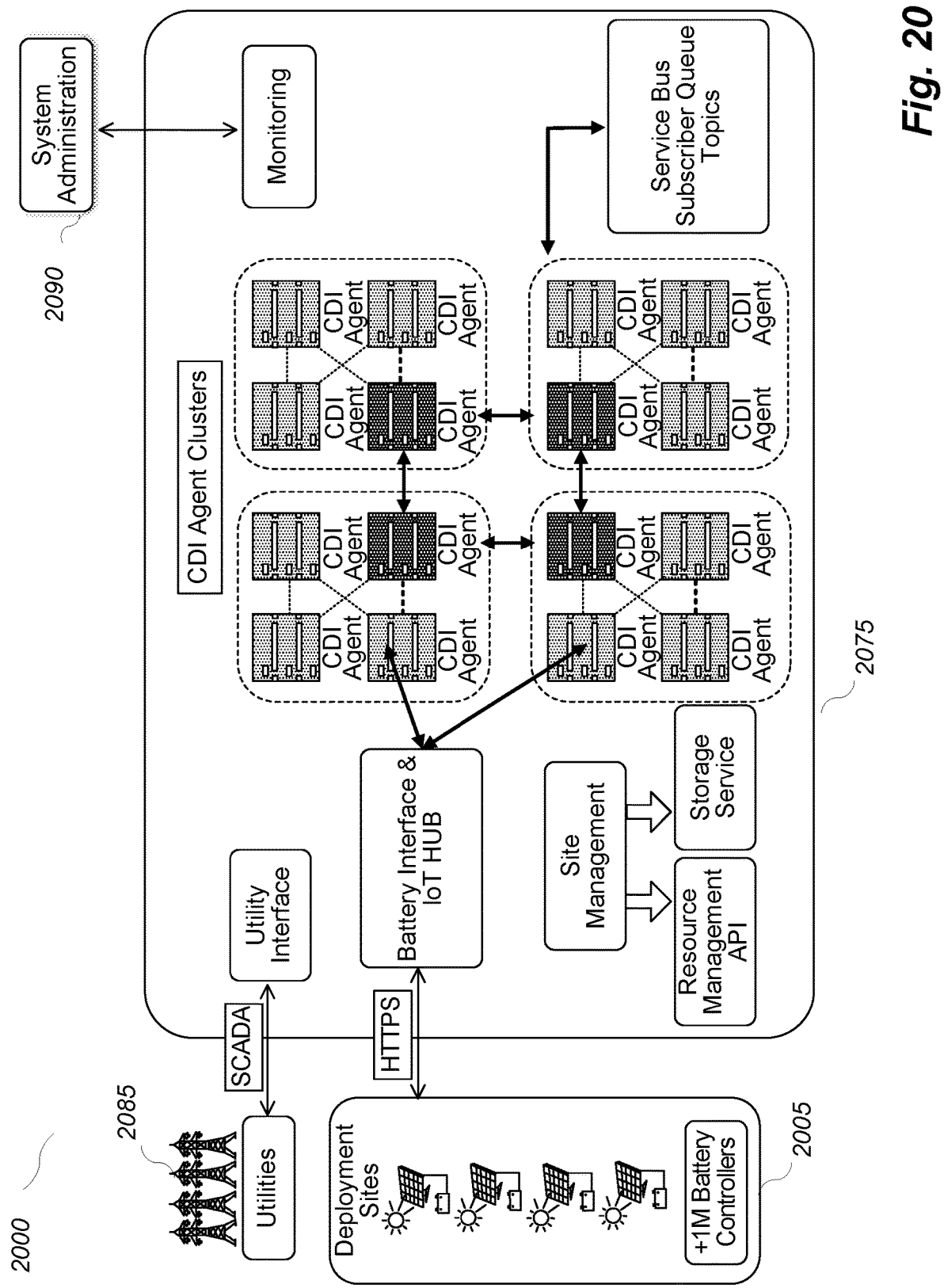
FIG. 20 is a block diagram illustrating example components of an embodiment of a system that performs automated control of DC power from multiple batteries in a coordinated manner.

FIG. 20 is a block diagram illustrating example components of an embodiment of a system 2000 that performs automated control of DC power from multiple batteries in a coordinated manner, such as in a real-time manner and to optimize long-term operation of the batteries. In particular, the system 2000 of FIG. 20 has some similarities to that of FIG. 12, but illustrates an example architecture of a system to support coordinated control of large numbers of batteries and associated systems (e.g., over one million such batteries and associated systems in this example, such as to correspond to one or more regions, states, countries, etc.). In particular, in the illustrated example, various batteries and associated systems 2005 (e.g., home power systems with solar panels) having on-site battery tracking controllers are illustrated, along with one or more utilities 2085 that provide power requests for the batteries and associated systems 2005, and one or more entities 2090 serving as system administration to manage a distributed control system 2075 for the batteries and associated systems 2005.

In this example, the distributed control system 2075 is implemented in a centralized manner in a network-accessible location, such as via an online computing environment (e.g., Microsoft Azure), although it may be implemented in other manners in other embodiments. The distributed control system 2075 includes one or more components to interface with and interact with the utilities 2085, one or more components to interface with and interact with the batteries and associated systems 2005, and one or more monitoring and/or configuration components with which the system administration entities 2090 may interact to monitor and/or control the distributed control system 2075. In addition, the various CDI agents that support the batteries and associated systems 2005 (e.g., with one CDI agent per battery pack and associated system) are executed in the network-accessible location and are clustered together, with various inter-cluster communication mechanisms used (e.g., a publish/subscribe system with various topics, a communication service bus between at least some CDI agents and/or clusters, etc.). The clusters may be formed in various manners in various embodiments, such as to group CDI agents based on having associated batteries and systems that share one or more characteristics, such as geographical location (e.g., being part of the system electrical grid substation area) and/or operating characteristics. In addition, the clusters may be used to coordinate the CDI agents in stages and/or tiers, such as to first coordinate the CDI agents within a cluster, then coordinate between two or more clusters, etc., and optionally with multiple tiers of clusters (e.g., structured in a hierarchical manner). Various additional components may be provided and used as part of the distributed control system 2075, such as a site management system to manage changes in CDI agents and/or batteries and associated systems (e.g., to add new CDI agents for new battery systems and/or to remove existing CDI agents for existing battery systems being removed from system 2075 management; to add new CDI agents to particular clusters and/or to remove existing CDI agents from clusters; to create, remove and modify clusters; etc.), storage services available from the network-accessible location to store state information and other information being used, resource management services available from the network-accessible location to manage computing resources provided by the network-accessible location, etc.

Figure 21:
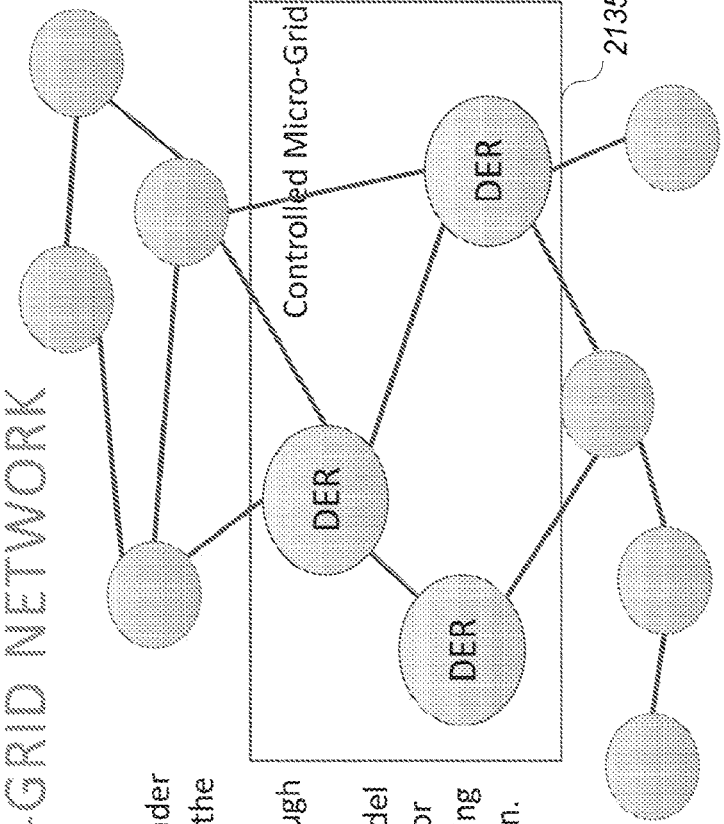
FIG. 21 is a block diagram illustrating example components of an embodiment of a system that performs automated control of DC power from multiple batteries in a coordinated manner.

FIG. 21 is a block diagram illustrating example components of an embodiment of a system 2100 that performs automated control of DC power from multiple batteries in a coordinated manner, such as in a real-time manner and to optimize long-term operation of the batteries. In particular, FIG. 21 illustrates that a micro-grid network or other network of batteries and associated systems may be controlled and managed in at least some embodiments via a subset 2135 of the batteries and associated systems, such as if other of the batteries and associated systems are not part of a distributed control system. In such situations, a virtual network model may be created to model and estimate information about the micro-grid network or other network as a whole, including to estimate information about other battery and associated systems (referred to as a DER, or distributed energy resource, in this example) that are not being controlled.

Figure 22:
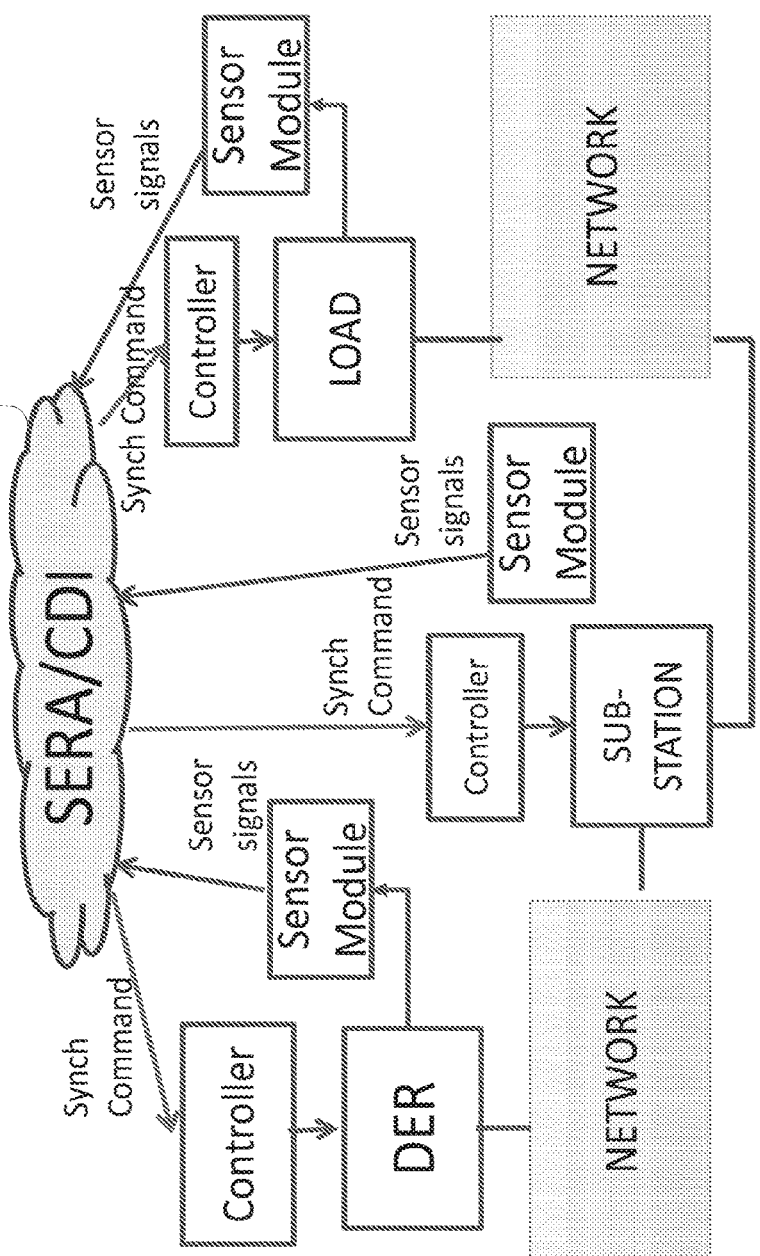
FIG. 22 is a block diagram illustrating example components of an embodiment of a system that performs automated control of DC power from multiple batteries in a coordinated manner.

FIG. 22 continues the example of FIG. 21, and includes additional information about the DER components being controlled in a coordinated manner. In particular, FIG. 22 is a block diagram illustrating example components of an embodiment of a system 2200 that performs automated control of DC power from multiple batteries in a coordinated manner, such as in a real-time manner and to optimize long-term operation of the batteries. The system 2200 includes a representation of a networked system 2245 analogous to distributed control system 2075 of FIG. 20 with multiple coordinated CDI agents, with the networked system 2245 also referred to as SERA (Smart Energy Reference Architecture) in this example. In this example, the networked system 2245 receives monitoring information from various DER components, and outputs synchronization signals to battery tracking controller components of the DER systems to control their operation.

Figure 23:
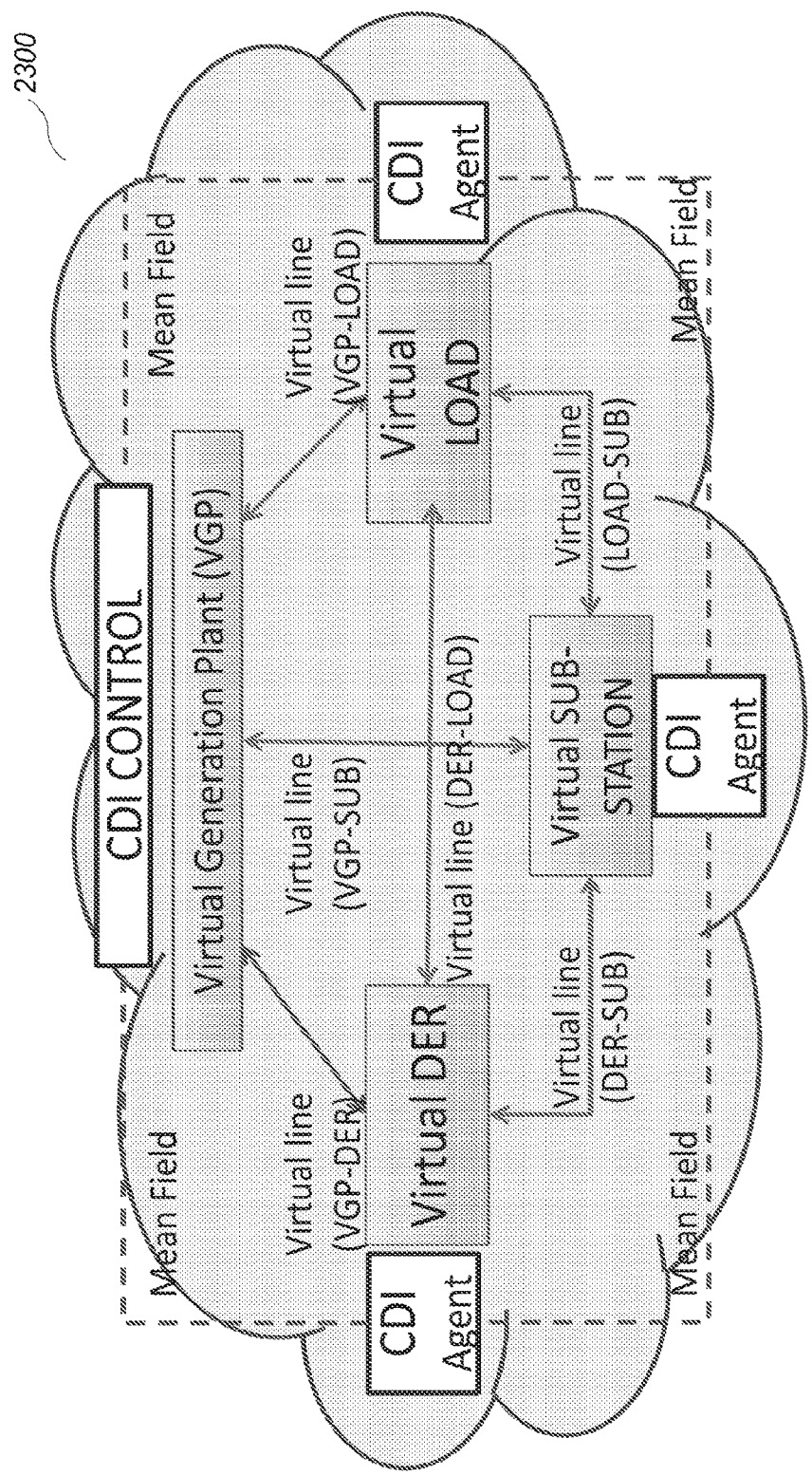
FIG. 23 is a block diagram illustrating example components of an embodiment of a system that performs automated control of DC power from multiple batteries in a coordinated manner.

FIG. 23 continues the examples of FIGS. 21 and 22, and includes additional information about the networked system 2245 of FIG. 22, such as to include information about a virtual network as noted with respect to FIG. 21, in order to simulate or otherwise estimate information about operation of the overall system of batteries and associated CDI agents. In particular, FIG. 23 is a block diagram illustrating example components of an embodiment of a system 2300 that performs automated control of DC power from multiple batteries in a coordinated manner, such as in a real-time manner and to optimize long-term operation of the batteries. The system 2300 includes models or other visual representations of various elements that include a virtual generation plant, virtual load, virtual substation(s), and virtual DER(s), with one or more CDI agents associated with each. The various elements exchange information as shown, including to estimate or otherwise model operation of the overall system as a whole, even in situations in which only a subset of the DER components are being controlled. The various CDI agents further use a mean field representation to coordinate their actions, as discussed in greater detail elsewhere herein.

Figure 24:
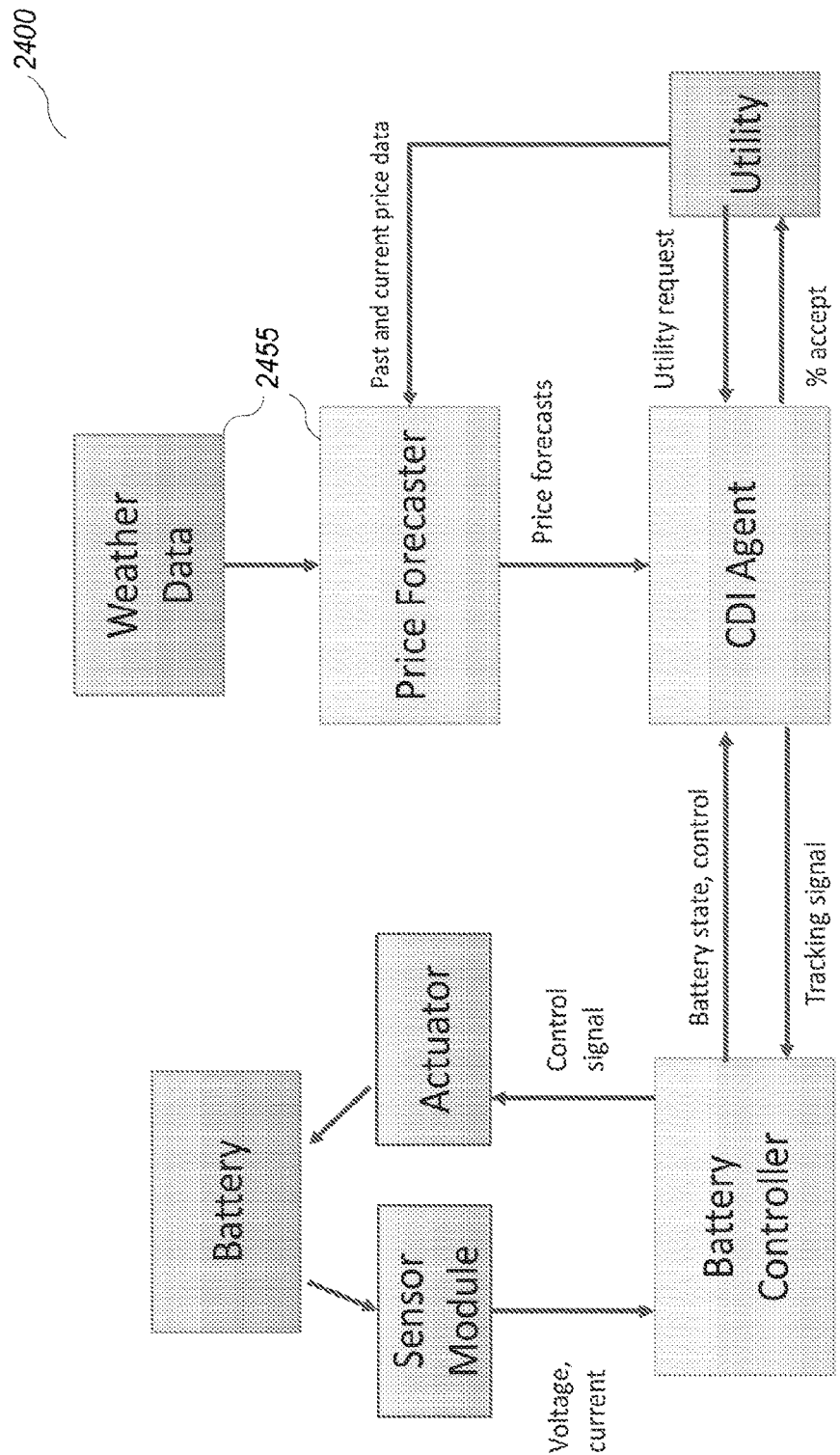
FIG. 24 is a block diagram illustrating example components of an embodiment of a system for using characteristics of a battery's state to perform automated control of DC power from the battery, as well as to use price forecasts and additional information to enhance financial performance of the system.

FIG. 24 illustrates a system 2400 similar to system 1000 of FIG. 10, in which various components interact to control operations of the battery according to defined criteria, but with additional elements 2455 illustrated in FIG. 24. In particular, FIG. 24 is a block diagram illustrating example components of an embodiment of a system 2400 for using characteristics of a battery's state to perform automated control of DC power from the battery, such as in a real-time manner and to optimize long-term operation of the battery, as well as to use price forecasts and additional information to enhance financial performance of the system. The additional elements 2455 of FIG. 24 allow the system 2400 to obtain and use information about forecasted prices for power supplied to the utility, such as based on weather data, past and current price data, etc., such as to further manage the control of the battery to optimize or otherwise enhance one or more financial constraints, such as in combination with other constraints related to battery life and/or other performance characteristics.

Additional details regarding an example embodiment of a typical battery tracking controller that uses monitoring/synchronization signals from an external entity (also referred to as a 'hybrid tracker') are as follows.

One example embodiment of a tracking control system for a generic lithium ion high power battery cell may be modeled by the electric circuit representation in FIG. 14.

The model 1400 includes current and voltage sources to represent the chemical reactions that characterize the cell in charging and discharging operations. The control actions are mediated by an actuator driven by a tracking controller. The Controller tracks a desired power signal that is generated by an inference module determining the desired response of the cell as a function of current electric storage level, and power demand. The inverter or rectifier circuits are not modeled in this example, and an idealized actuator is used for this model.

The dynamic behavior of the circuit in FIG. 14 is given by a differential equation as follows:

$$\dot{x}(t) = G(x(t), u(t), \text{parameters}) \quad (1)$$

where the state $$x(t) = \begin{bmatrix} \text{power}(t) \\ \text{voltage}(t) \\ \text{current}(t) \\ \text{temperature}(t) \end{bmatrix} \in R^4,$$

and the control $u(t) \in R$, and the time line is represented by $t \in R$.

The function $G(x_1(t), x_2(t), x_3(t), x_4(t), u(t))$ is given by (2)

$$\begin{bmatrix} G_1(x_1(t), x_2(t), x_3(t), x_4(t), u(t)) \\ G_2(x_1(t), x_2(t), x_3(t), x_4(t), u(t)) \\ G_3(x_1(t), x_2(t), x_3(t), x_4(t), u(t)) \\ G_4(x_1(t), x_2(t), x_3(t), x_4(t), u(t)) \end{bmatrix} = \quad (2)$$

$$\begin{bmatrix} \alpha_1 x_1(t) x_2(t) + \alpha_2 x_1(t) u(t) + \beta_1 x_2(t) + \lambda_1 x_4(t - \tau) \\ \beta_2 x_2(t) - \beta_3 x_1(t) + \phi_1 u(t) + \lambda_2 x_4(t - \tau) \\ \beta_4 x_3(t) + \beta_5 x_2(t) + \beta_6 x_1(t) + \lambda_3 x_4(t - \tau) \\ \beta_7 x_1(t) + \beta_8 x_2(t) + \beta_9 x_3(t) + \phi_2 u(t) + \lambda_4 x_4(t - \tau) \end{bmatrix}$$

For simplicity the dependence on the parameters in the argument have been suppressed. The parameters: $\alpha_1, \alpha_2, \beta_1, \ldots \beta_9, \phi_1, \phi_2, \lambda_1, \ldots, \lambda_4$ represent the physical components in the cell model (i.e., resistors, the capacitor, the voltage, current sources and the saturation limits). The parameter $\tau$ is a time delay, which can be estimated using the historical data. The parameters: $\alpha_1, \alpha_2, \beta_1, \ldots \beta_6, \phi$ represent the physical components in the cell model (i.e., resistors, the capacitor, the voltage, current sources and the saturation limits). The control design generates an approximate solution of (1) by a piecewise linear stochastic differential equation over small time intervals.

Thus, let $t_0, t_1 \ldots t_i, t_{i+1}, \ldots$, be a partition of the time line. On each interval $[t_i, t_{i+1})$, we seek solutions of the form $$x(t) = x(t_i) + \delta \hat{x}(t) \quad (3)$$

$$\dot{x}(t) = \delta \dot{\hat{x}}(t) \quad (4)$$

over $[t_i, t_{i+1})$, where $\delta \hat{x}(t)$ is the conditional mean of $\delta x(t)$, and $\delta \dot{\hat{x}}(t)$ is the conditional rate, obtained from a Kalman filter based on the following piecewise linear stochastic model. The stochastic increment $\delta x(t)$ satisfies the following stochastic differential equation:

$$d\delta x(t) = \frac{\partial G(x(t_i), u(t_i))}{\partial x} \delta x(t)dt + \quad (5)$$

$$\frac{\partial G(x(t_i), u(t_i))}{\partial u} \delta u(t)dt + G(x(t_i), u(t_i))dt + d\omega(t)$$

where the noise has zero mean and the covariance is proportional to the second order term that is taken out in the approximation, e.g., $$\omega(t) \sim N\left(0, \alpha \frac{\partial^2 \Sigma_{j=1}^3 G_j(x(t_i), u(t_i))}{\partial x^2} + \epsilon I\right),$$

where $\epsilon>0$ and I is the identity matrix. Sensors provide power, voltage, and current measurements. The observations from the battery sensors are modeled by $$y(t)=x(t)+\theta(t)$$

where the observation noise $\theta(t)$ is characteristic of the sensors, with zero mean and covariance matrix determined from the signal to noise ratio specifications.
From (3) and (5) the incremental observation is given by $$\delta y(t)=\delta x(t)+\theta(t)$$

with $\delta y(t)=y(t)-x(t_i)$.
An effective of the tracking problem has a criterion of the form $$\min_{\delta u(t)} E \int_{t_i}^{t_{i+1}} \frac{1}{2}[(\delta x(t) - \tilde{x}_\delta(t))^T Q_0 (\delta x(t) - \tilde{x}_\delta(t)) + \delta \dot{x}(t)^T Q_1 \delta \dot{x}(t) + \quad (6)$$

$$\delta u(t)^T R_0 \delta u(t) + \delta \dot{u}(t)^T R_1 \delta \dot{u}(t)]dt + \frac{1}{2} \delta x(t_{i+1})^T F_0 \delta x(t_{i+1}).$$

The tracking value $\tilde{x}_\delta(t)$ is generated from rules defining the desired power behavior of the battery, dynamically. Note that rules from a CDI agent may not be given in terms of the original state vector (power, current, voltage, temperature), and if not are translated to state desired behavior in terms of the desired incremental state $\tilde{x}_\delta(t)$. A first example of such rules is given below.
Rule 1: over a week, at least 78% of the power demand should be satisfied.
Rule 2: battery longevity ≥five years.
Rule 3: for the battery, satisfy thresholds on amount of charge and discharge.
A second example of such rules is given below.
1. Maximum charge limit: Do not charge the battery if the current charge has exceeded a first defined threshold level.
2. Minimum charge limit: Do not discharge the battery if the current charge is below a second defined threshold level.
3. Rate limitation: Do not change the desired power in/out to battery faster than a third defined threshold limit for rate of change.
4. Switching between charge and discharge: Reduce rate of charge when power is near zero to prevent switching between charging and discharging (or vice versa) too fast or frequently, such as based on one or more fourth defined threshold levels.
5. Maintain battery temperature: If the temperature begins to rise, adjust desired power output based on current battery state (i.e., if battery charge is low and the temperature starts increasing, then charge it).
As part of these rules of the second example, fulfill power requests as much as possible (referred to at times herein as maximizing the "Q factor"), such as, for example, at a rate of 70%. If power requests are being satisfied at more and/or at less than a desired level (e.g., 30%, 40%, 50%, 60%, 70%, 80%, 90%, etc.), weighting with one or more of the rules above may be adjusted up or down in some embodiments to lower or raise the level of satisfied power requests, respectively, and to correspondingly increase or reduce battery life, respectively, from such changes.
The rules here pertain to the increments, and convert the average over a long time frame (weeks, years) to a running average over $[t_i, t_{i+1}]$. For the battery model, the temperature typically changes much faster than power, voltage and current. Motivated by Aoki's partitioning method, the problem may be decoupled through the state variables so that the full state space problem can be transformed into two sub-problems which are solved with different time intervals. The temperature controller is referred to as "a high speed controller" and the power/voltage/current controller "a low speed controller", with the following details directed to the low speed controller. In particular, an optimal control tracking problem to be solved for the low speed controller may be summarized as:

$$\min_{\delta u(t)} E \int_{t_i}^{t_{i+1}} \frac{1}{2}[(\delta x(t) - \tilde{x}_\delta(t))^T Q_0 (\delta x(t) - \tilde{x}_\delta(t)) + \delta \dot{x}(t)^T Q_1 \delta \dot{x}(t) + \delta u(t)^T \quad (6)$$

$$R_0 \delta u(t) + \delta \dot{u}(t)^T R_1 \delta \dot{u}(t)]dt + \frac{1}{2} \delta x(t_{i+1})^T F_0 \delta x(t_{i+1})$$

subject to $$d\delta x(t) = \frac{\partial G(x(t_i), u(t_i))}{\partial x} \delta x(t)dt + \quad (7)$$

$$\frac{\partial G(x(t_i), u(t_i))}{\partial u} \delta u(t)dt + G(x(t_i), u(t_i))dt + \lambda T(t-\tau)dt + d\omega_0(t)$$

$$d^2 \delta x(t) = \frac{\partial G(x(t_i), u(t_i))}{\partial x} d\delta x(t)dt + \frac{\partial G(x(t_i), u(t_i))}{\partial u} \delta \dot{u}(t)dt + d\omega_1(t) \quad (8)$$

$$\delta \dot{u}(t) = v(t). \quad (9)$$

In (7), $$\lambda = \begin{bmatrix} \lambda_1 \\ \lambda_2 \\ \lambda_3 \end{bmatrix},$$

and $T(t-\tau)$ is the average temperature for the previous time interval $t_{i-1} \leq t \leq t_i$. So $\lambda T(t-\tau)$ can be considered a constant for $t_i \leq t \leq t_{i+1}$.
The optimization problem formulated in (6)-(9) satisfies the assumptions of the separation principle. This leads to the following approach.
Step 1: Determine the conditional mean $\delta \hat{x}(t)$ and the conditional rate $\delta \hat{\dot{x}}(t)$ for $t_i \leq t \leq t_{i+1}$ generated by a Kalman filter, which is described in a separate note.
Step 2: Solve (6)-(9), obtaining a feedback solution of the form $$\delta \dot{u}(t)=K_o(t)\delta x(t)+K_1(t)\delta \dot{x}(t)+K_2(t)\delta u(t)+\psi(t) \quad (10)$$

where $K_j(t), j=0,1,2$ and $\psi(t)$ are the gains and the affine terms resulting from the optimization.

Step 3. Replace δx(t) and δẋ(t) in (10) with δx̂(t) and δx̂̇(t) from the outputs of the Kalman filter.

Step 4. Integrate the following equation, $$\delta\dot{u}(t)=K_o(t)\delta\hat{x}(t)+K_1(t)\delta\dot{\hat{x}}(t)+K_2(t)\delta u(t)+\psi(t). \quad (11)$$

The intervals $[t_i,t_{i+1}]$ for all i, are chosen small enough so that the gains $K_j(t), j=0,1,2$ and $\psi(t)$ can be considered constant over each interval, and are evaluated at $t_i$.

Using the variation of constant formula, the integral of (11) at $t_{i+1}^-$ is given by $$\delta u(t_{i+1})=\int_{t_i}^{t_{i+1}}e^{K_2(t_i)(t_{i+1}-\tau)}(K_o(\tau)\delta\hat{x}(\tau)+K_1(\tau)\delta\dot{\hat{x}}(\tau)+\psi(\tau)) d\tau \quad (12)$$

Integrate (12) using an impulsive approximation assuming that the integrands are impulses at $t_i$. Thus, the incremental control for the low speed controller is $$\delta u(t_{i+1}^-)\approx e^{K_2(t_i)(t_{i+1}-t_i)}(K_o(t_i)\delta\hat{x}(t_i)+K_1(t_i)\delta\dot{\hat{x}}(t_i)+\psi(t_i)). \quad (13)$$

Solving for the high speed controller, we get the incremental control for the high speed controller, $\delta u_H(t_{i+1}^-)$. Taking the linear combination of the two incremental controls, we get $$\delta u(t_{i+1}^-)=\epsilon_1\delta u_L(t_{i+1}^-)+\epsilon_2\delta u_H(t_{i+1}^-). \quad (14)$$

The control to the battery at $t_{i+1}$ is given by $$u(t_{i+1})=u(t_i)+\delta u(t_{i+1}). \quad (15)$$

The state at $t_{i+1}$ is $$x(t_{i+1})=x(t_i)+\delta x(t_{i+1}). \quad (16)$$

the rate of the state at $t_{i+1}$ is $$\dot{x}(t_{i+1})=\dot{x}(t_i)+\delta\dot{x}(t_{i+1}). \quad (17)$$

Figure 25:
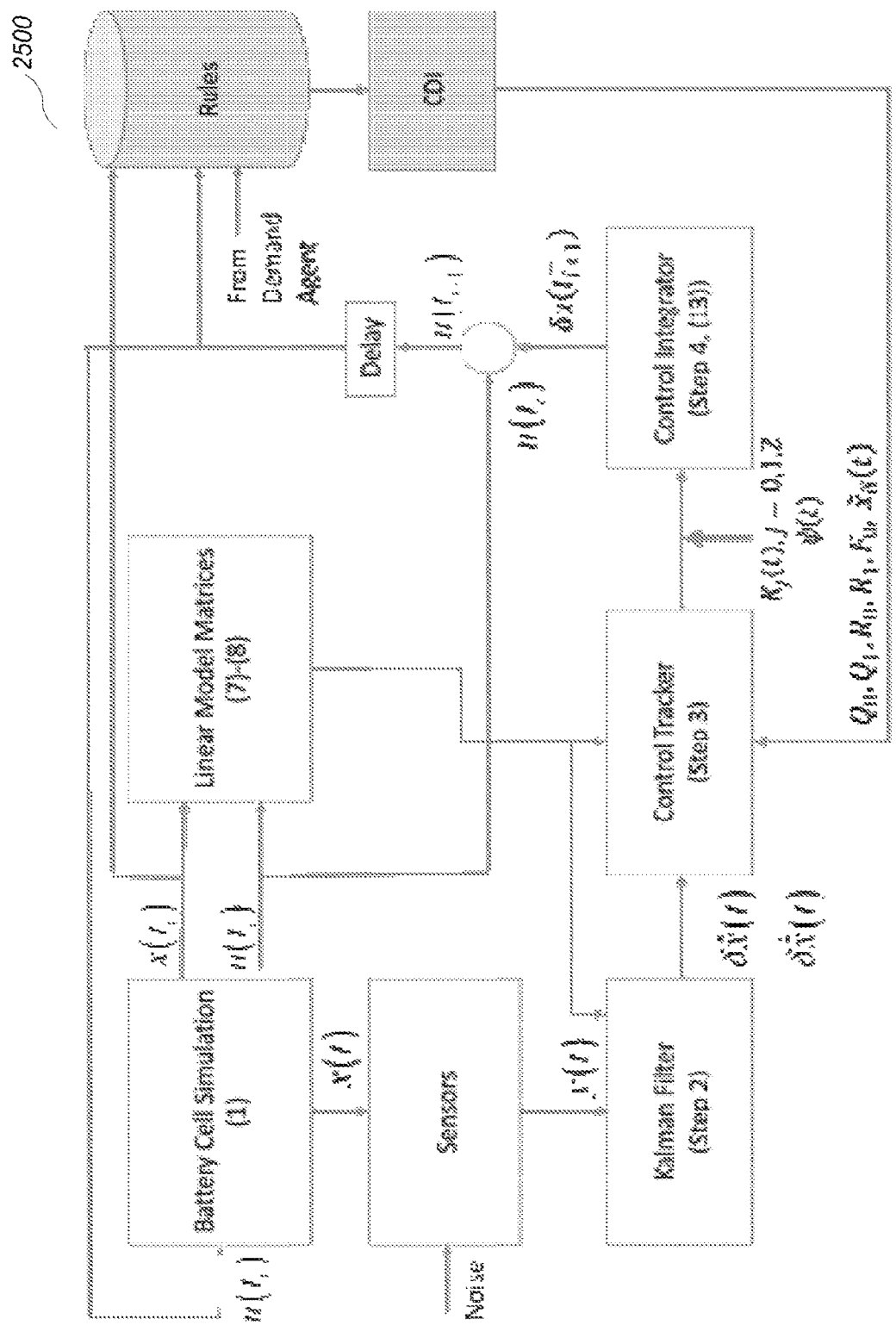
FIG. 25 is a block diagram illustrating an example architecture of a battery controller component.

Both (16) and (17) are sent to the rules module for future requirements to update $\tilde{x}_\delta(t)$. This approach is repeated on the next interval. This is illustrated in FIG. 25, showing the architecture 2500 of the battery controller.

The model of the cell may be trained, for example, with the following parameters, which are typical of a 1 kW rated Lithium ion battery.

| Parameter Table | |
| --- | --- |
| $\alpha_1$ | -0.001 |
| $\alpha_2$ | -0.002 |
| $\beta_1$ | -0.01 |
| $\beta_2$ | -0.01 |
| $\beta_3$ | 0.001 |
| $\beta_4$ | -0.01 |
| $\beta_5$ | 0.01 |
| $\beta_6$ | 0.001 |
| $\phi$ | 0.01 |

With respect to the battery operation, the controller for this example compensate very well for the uncertainty in the parameters and approximation errors, and exhibits good quality of robustness and time response.

Additional details regarding an example embodiment of continuously estimating state for a battery in use, such as for a generic lithium ion high power battery cell and for a low speed controller, are as follows:

The stochastic differential equation for the state update is:

$$d\delta x(t)=A(t)\delta x(t)dt+B(t)\delta u(t)dt+f(t)dt+d\omega)(t) \quad (1)$$

where the state $\delta x(t)\in R^3$, $u(t)\in R^1$, $A(t)$ is a 3×3 matrix, $B(t)$ is a 3×1 vector, $f(t)$ is a 3×1 vector and $\omega(t)$ is a 3×1 vector. The noise has zero mean and the covariance matrix W, e.g., $\omega(t)\sim N(0,W)$.

The observation equation is given by $$\delta y(t)=\delta x(t)+\theta(t) \quad (2)$$

where the measurement $\delta y(t)\in R^3$, and $\theta(t)$ is a 3×1 vector. The noise has zero mean and the covariance matrix V, e.g., $\theta(t)\sim N(0,V)$.

The state update equation is:

$$\delta\dot{\hat{x}}(t)=A(t)\delta\hat{x}(t)+B(t)\delta u(t)+K(t)(\delta y(t)-\delta\hat{x}(t)) \quad (3)$$

where the Kalman gain K is a 3×3 matrix, given by $$K(t)=P(t)V^{-1} \quad (4)$$

and the covariance update equation is:

$$\dot{P}(t)=A(t)P(t)+P(t)A(t)^T+W-P(t)V^{-1}P(t) \quad (5)$$

In order to determine the conditional mean $\delta\hat{x}(t)$ and the conditional rate $\delta\dot{\hat{x}}(t)$ for $t_i\le t<t_{i+1}$, the first step is to initialize $\delta\hat{x}(t_i)=0$ and $P(t_i)=0$.

The second step is to solve (5) numerically (e.g., Runge-Kutta method) for P(t), for $t_i\le t<t_{i+1}$. The third step is to get the Kalman gain, using (4).

The fourth step is to solve (3) numerically, where the parameters A(t), B(t) and the observations δy(t) are known. This provides the conditional mean $\delta\hat{x}(t)$ and the conditional rate $\delta\dot{\hat{x}}(t)$ for $t_i\le t<t_{i+1}$.

Additional details regarding an example embodiment of computing feedback gain for a battery in use, such as for a generic lithium ion high power battery cell and for a low speed controller as described above, are as follows:

An optimal control tracking problem to be solved may be summarized as:

$$\min_{\delta u(t)} E\int_{t_i}^{t_{i+1}} \frac{1}{2}[(\delta x(t)-\tilde{x}_\delta(t_i))^T Q_0(\delta x(t)-\tilde{x}_\delta(t_i))+ \\ \delta\dot{x}(t)^T Q_1\delta\dot{x}(t)+\delta u(t)^T R_0\delta u(t)+\delta\dot{u}(t)^T R_1\delta\dot{u}(t)] \\ dt+\frac{1}{2}\delta x(t_{i+1})^T F_0\delta x(t_{i+1}) \quad (1)$$

subject to $$d\delta x(t)=\frac{\partial G(x(t_i),u(t_i))}{\partial x}\delta x(t)dt+ \\ \frac{\partial G(x(t_i),u(t_i))}{\partial u}\delta u(t)dt+G(x(t_i),u(t_i))dt+\lambda T(t-\tau)dt+d\omega_0(t) \quad (2)$$

$$d^2\delta x(t)=\frac{\partial G(x(t_i),u(t_i))}{\partial x}d\delta x(t)dt+\frac{\partial G(x(t_i),u(t_i))}{\partial u}\delta\dot{u}(t)dt+d\omega_1(t) \quad (3)$$

$$\delta\dot{u}(t)=v(t). \quad (4)$$

Define the new state variable $$z(t)=\begin{bmatrix}\delta x(t) \\ \delta\dot{x}(t) \\ \delta u(t)\end{bmatrix}$$

and the new control variable $v(t)=\delta\dot{u}(t)$, the state equation in (2-4) can be rewritten as $$\dot{z}(t)=\tilde{A}(t_i)z(t)+\tilde{B}(t_i)v(t)+\tilde{f}(t_i)$$

with the initial conditions $z(t_i)=0$, and $$\tilde{A}(t_i)=\begin{bmatrix}\frac{\partial G(x(t_i),u(t_i))}{\partial x} & 0 & \frac{\partial G(x(t_i),u(t_i))}{\partial x} \\ 0 & \frac{\partial G(x(t_i),u(t_i))}{\partial x} & 0 \\ 0 & 0 & \epsilon I\end{bmatrix},$$

-continued $$\tilde{B}(t_i) = \begin{bmatrix} 0 \\ \frac{\partial G(x(t_i), u(t_i))}{\partial u} \\ 1 \end{bmatrix}, \tilde{f}(t_i) = \begin{bmatrix} G(x(t_i), u(t_i)) + \lambda T(t-\tau)dt \\ 0 \\ 0 \end{bmatrix}.$$

The optimal control tracking problem to be solved is summarized as:

$$\min_{v(t)} E \int_{t_i}^{t_{i+1}} \frac{1}{2}[(z(t)-\tilde{z}(t_i))^T Q(z(t)-\tilde{z}(t_i)) + v(t)^T Rv(t)]dt + \frac{1}{2}z(t_{i+1})^T Fz(t_{i+1}) \quad (5)$$

subject to $$dz(t) = \tilde{A}(t_i)z(t)dt + \tilde{B}(t_i)v(t)dt + \tilde{f}(t_i)dt + d\omega(t)$$

with $Q = \begin{bmatrix} Q_0 & 0 & 0 \\ 0 & Q_1 & 0 \\ 0 & 0 & R_0 \end{bmatrix}, R = R_1, F = \begin{bmatrix} F_0 & 0 & 0 \\ 0 & 0 & 0 \\ 0 & 0 & 0 \end{bmatrix}, \tilde{z}(t_i) = \begin{bmatrix} \tilde{x}_\delta(t_i) \\ 0 \\ 0 \end{bmatrix}.$ The feedback law $v(t)=-R^{-1}\tilde{B}^T p(t)$ with $p(t)=\Sigma(t)z(t)+\phi(t)$. $\Sigma(t)$ is a matrix, and $\phi(t)$ is a vector. They are provided by solving the following ordinary differential equations.

$$\dot{\Sigma}(t) = -\Sigma(t)\tilde{A}(t_i) - \tilde{A}(t_i)^T\Sigma(t) + \Sigma(t)\tilde{B}(t_i)R^{-1}(t_i)^T\Sigma(t) - Q$$
with $\Sigma(t_{i+1})=F$ (6)

$$\dot{\phi}(t) = (-\tilde{A}(t_i)^T + \Sigma(t)\tilde{B}(t_i)R^{-1}\tilde{B}(t_i)^T)\phi(t) - \Sigma\Sigma(t)\tilde{f}(t_i) + Q\tilde{z}(t_i)$$
with $\phi(t_{i+1})=0$. (7)

From (5), $$v(t) = -R^{-1}\tilde{B}^T(\Sigma(t)z(t)+\phi(t)) = -R^{-1}\tilde{B}^T\Sigma(t)z(t) - R^{-1}\tilde{B}^T\phi(t) = K_{LQ}(t)z(t)+\psi(t) \quad (8)$$

where $K_{LQ}(t)=-R^{-1}\tilde{B}^T\Sigma(t)$, $\psi(t)=-R^{-1}\tilde{B}_T\phi(t)$.

By the separation principle, we can calculate the $K_{LQ}(t)$ and $\psi(t)$ by solving the deterministic problem first, then replace the state $z(t)$ in (8) with $$\hat{z}(t) = \begin{bmatrix} \delta\hat{x}(t) \\ \delta\dot{\hat{x}}(t) \\ \delta u(t) \end{bmatrix}$$

to get $v(t)$, as shown in (9).

$$v(t) = \delta\dot{u}(t) = K_0(t)\delta\hat{x}(t) + K_1(t)\delta\dot{\hat{x}}(t) + K_2(t)\delta u(t) + \psi(t) \quad (9)$$

Using an impulsive approximation assuming that the integrands are impulses at $t_i$, yields $$\delta u(t_{i+1}^-) \approx e^{K_2(t_i)(t_{i+1}-t_i)}(K_o(t_i)\delta\hat{x}(t_i) + K_1(t_i)\delta\dot{\hat{x}}(t_i) + \psi(t_i)) \quad (10)$$

To get the state value for the deterministic problem, solve the following differential equation.

$$\dot{z}(t) = \tilde{A}(t_i)z(t) + \tilde{B}(t_i)(K_{LQ}(t_i)z(t) + \psi(t_i)) + \tilde{f}(t_i)$$
$$= (\tilde{A}(t_i) + \tilde{B}(t_i)K_{LQ}(t_i))z(t) + \tilde{B}(t_i)\psi(t_i) + \tilde{f}(t_i)$$

Figure 28:
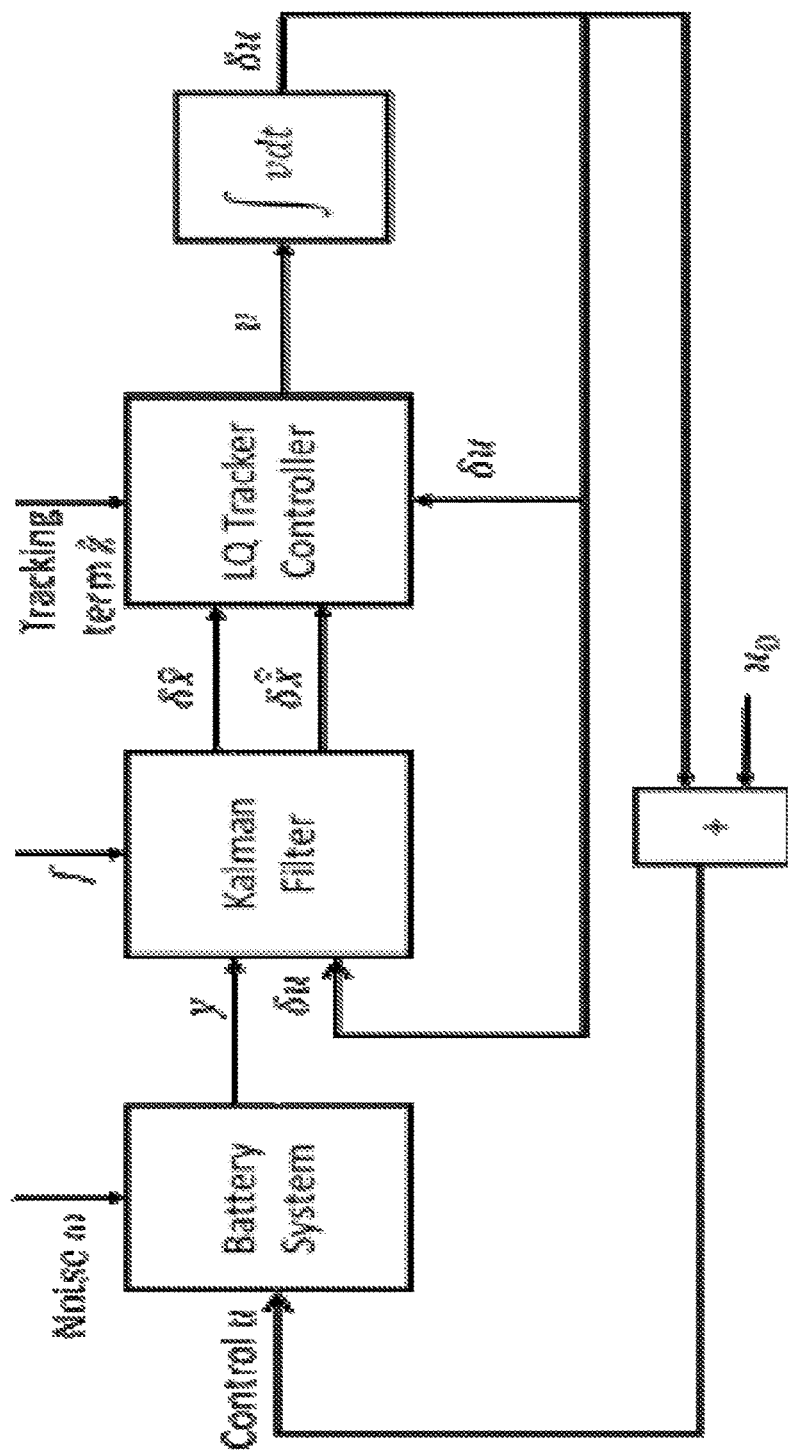
FIG. 28 is a block diagram illustrating an example architecture for computing feedback gain for a tracking controlling system for a battery.

An architecture for such operations is illustrated in system 2800 of FIG. 28.

Additional details regarding an example embodiment of an emergency battery tracking controller are as follows:
The state space model of the battery system:

$$\delta\dot{x}(t) = A\delta x(t) + B\delta u(t) + f \quad (1)$$

$$y(t) = C\delta x(t) \quad (2)$$

The state observer is of the form:

$$\delta\dot{\hat{x}}(t) = A\delta\hat{x}(t) + B\delta u(t) + f + K(y(t) - C\delta\hat{x}(t)) \quad (3)$$

where $\hat{x}(t)$ is the estimate of $x(t)$ and K is the latest Kalman filter gain computed by the hybrid tracker before we switch to the closed-loop tracker.
Equation (3) can be rewritten as follows:

$$\delta\dot{\hat{x}}(t) = (A-KC)\delta\hat{x}(t) + B\delta u(t) + f + Ky(t) \quad (4)$$

We take the Laplace transform of both sides of the equation:

$$s\delta\hat{x}(s) - \delta\hat{x}(0) = (A-KC)\delta\hat{x}(s) + B\delta u(s) + f(s) + Ky(s) \quad (5)$$

where $\delta\hat{x}(0) = 0$ and $$f(s) = \frac{f}{s}.$$

Solving for $\delta\hat{x}(s)$, we find:

$$\delta\hat{x}(s) = (sI-A+KC)^{-1}[B\delta u(s) + f(s) + Ky(s)] \quad (6)$$

Multiplying by C on both sides of (6) and replacing $C\delta\hat{x}(s)$ with $y(s)$, we get:

$$y(s) = C(sI-A+KC)^{-1}(B\delta u(s) + f(s) + Ky(s)) \quad (7)$$

Solving for $y(s)$, we find:

$$(I - C(sI-A+KC)^{-1}K)y(s) = C(sI-A+KC)^{-1}(B\delta u(s) + f(s)) \quad (8)$$

$$y(s) = [I - C(sI-A+KC)^{-1}K]^{-1}C(sI-A+KC)^{-1}(B\delta u(s) + f(s)) \quad (9)$$

Let $$G_u(s) = [I - C(sI-A+KC)^{-1}K]^{-1}C(sI-A+KC)^{-1}B \quad (10)$$

$$G_f(s) = [I - C(sI-A+KC)^{-1}K]^{-1}C(sI-A+KC)^{-1} \quad (11)$$

then, $$y(s) = G_u(s)\delta u(s) + G_f(s)f(s) \quad (12)$$

Let $y_{ref}(t)$ be a reference signal, which can be obtained by setting $\delta\dot{x}(t)=0$ and $\delta u(t)=0$ in (18), and then solving for $\delta x(t)$, yielding $$y_{ref}(t) = -(A^T A)^{-1} A^T f \quad (13)$$

Design a PI controller, such that $$\delta u(s) = \left(K_p + \frac{K_i}{s}\right)(y_{ref}(s) - y(s)) \quad (14)$$

where $K_p$ is the proportional gain and $K_i$ is the integral gain to be determined, and $$y_{ref}(s) = -(A^T A)^{-1} A^T f/s.$$

Figure 26:
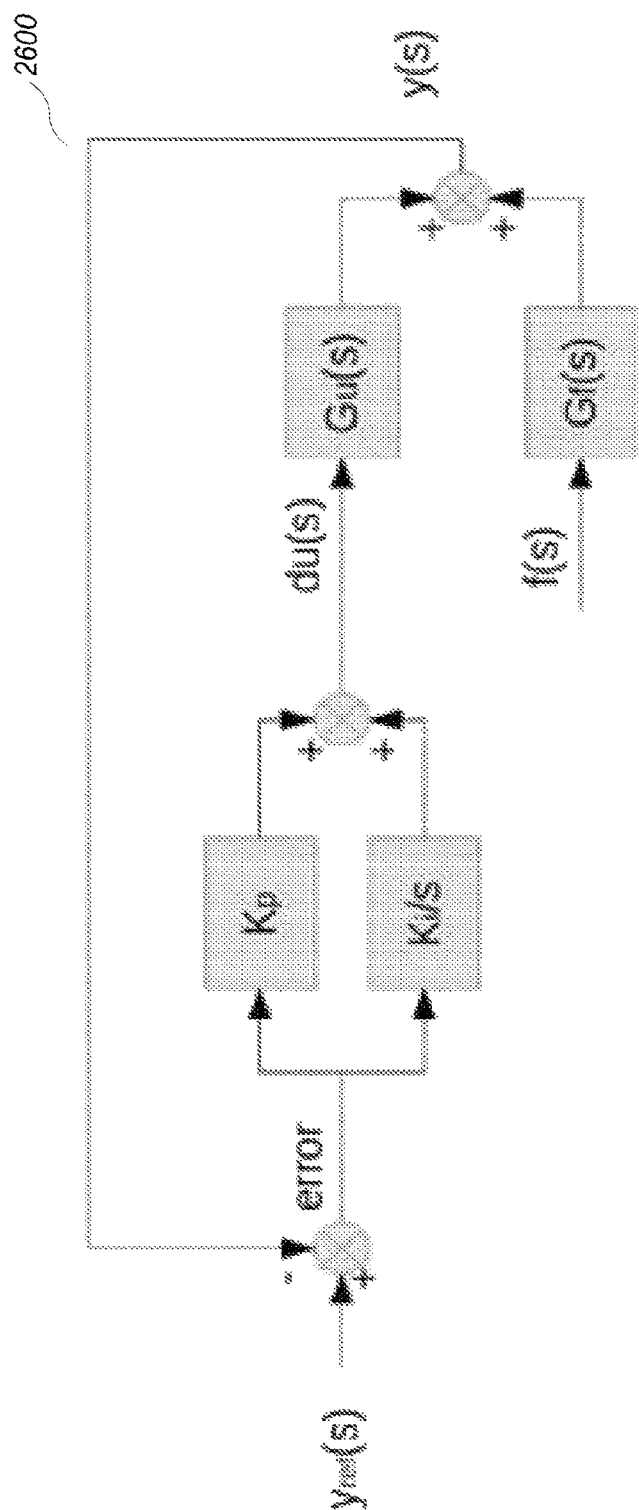
FIG. 26 is a block diagram illustrating an example feedback controller.

The feedback controller 2600 is shown in FIG. 26. Combine (12) and (24), yielding $$y(s) = G_u(s)\left(K_p + \frac{K_i}{s}\right)(y_{ref}(s) - y(s)) + G_f(s)f(s)$$

-continued $$\left[I + G_u(s)\left(K_p + \frac{K_i}{s}\right)\right]y(s) = G_u(s)\left(K_p + \frac{K_i}{s}\right)y_{ref}(s) + G_f(s)f(s)$$

Solving for y(s), we get:

$$y(s) = \left[I + G_u(s)\left(K_p + \frac{K_i}{s}\right)\right]^{-1} G_u(s)\left(K_p + \frac{K_i}{s}\right)y_{ref}(s) + \left[I + G_u(s)\left(K_p + \frac{K_i}{s}\right)\right]^{-1} G_f(s)f(s) \quad (15)$$

Now stabilize the feedback control system with $K_p$ and $K_i$ to be determined. The closed-loop transfer function is:

$$T(s) = \left[I + G_u(s)\left(K_p + \frac{K_i}{s}\right)\right]^{-1} G_u(s)\left(K_p + \frac{K_i}{s}\right) \quad (16)$$

$$= \left[I + \left([I - C(sI - A + KC)^{-1}K]^{-1}C(sI - A + KC)^{-1}B\right)\left(K_p + \frac{K_i}{s}\right)\right]^{-1}$$

$$\left([I - C(sI - A + KC)^{-1}K]^{-1}C(sI - A + KC)^{-1}B\right)\left(K_p + \frac{K_i}{s}\right) \quad (17)$$

Chose $K_p$ and $K_i$ such that all the poles of T(s) located in the open left half of the s-plane.

Numerical Implementation

The numerical algorithm to compute $K_p$ and $K_i$ is shown below. As previously mentioned, the state space model of the battery system is as follows:

$$\delta\dot{x}(t) = A\delta x(t) + B\delta u(t) + f \quad (18)$$

$$\delta y(t) = C\delta x(t) \quad (19)$$

The state observer is of the form:

$$\delta\dot{\hat{x}}(t) = A\delta\hat{x}(t) + B\delta u(t) + f + K(\delta y(t) - C\delta\hat{x}(t)) \quad (20)$$

where $\hat{x}(t)$ is the estimate of x(t) and K is the latest Kalman filter gain computed by the hybrid tracker before we switch to the closed-loop tracker. $\delta y(t)$ is obtained from the history measurement data. Equation (20) can be rewritten as follows:

$$\delta\dot{\hat{x}}(t) = (A - KC)\delta\hat{x}(t) + B\delta u(t) + f + K\delta y(t) \quad (21)$$

Equation (21) can be approximated by $$\delta\hat{x}(t+\Delta) = e^{(A-KC)\Delta}\delta\hat{x}(t) + \int_t^{t+\Delta} e^{(A-KC)(t+\Delta-\tau)}(B\delta u(\tau) + f + K\delta y(\tau))d\tau \quad (22)$$

Assuming the integrands are impulses at t, we have $$\delta\hat{x}(t+\Delta) = e^{(A-KC)\Delta}\delta\hat{x}(t) + e^{(A-KC)\Delta}(B\delta u(t) + f + K\delta y(t)) \quad (23)$$

$$= e^{(A-KC)\Delta}(\delta\hat{x}(t) + B\delta u(t) + f + K\delta y(t))$$

Design a PI controller, such that $$\delta u(t) = K_p(\delta y_{ref} - \delta y(t)) + K_i \int_0^t (\delta y_{ref} - \delta y(\tau))d\tau \quad (24)$$

where $K_p$ is the proportional gain and $K_i$ is the integral gain to be determined, $\delta y_{ref}$ is a reference signal, which can be obtained by setting $\delta\dot{x}(t) = 0$ and $\delta u(t) = 0$ in (18), and then solving for $\delta x(t)$, yielding $$\delta y_{ref} = -(A^T A)^{-1} A^T f \quad (25)$$

Solve a least squares problem for $K_p$ and $K_i$ such that the integral of squared residuals $\int_{t=0}^T (\delta y_{ref} - C\delta\hat{x}(t))^T (\delta y_{ref} - C\delta\hat{x}(t))$ is minimized, subject to equation (23), (24) and (25).

$$\min_{K_p, K_i} \sum_{n=0}^{N} (\delta y_{ref} - C\delta\hat{x}(n\Delta))^T (\delta y_{ref} - C\delta\hat{x}(n\Delta)) \quad (26)$$

$$\text{s.t. } \delta u(n\Delta) = K_p(\delta y_{ref} - \delta y(n\Delta)) + K_i \sum_{i=0}^{n} (\delta y_{ref} - \delta y(i\Delta)) \quad (27)$$

$$\delta\hat{x}((n+1)\Delta) = e^{(A-KC)\Delta}(\delta\hat{x}(n\Delta) + B\delta u(n\Delta) + f + K\delta y(n\Delta)) \quad (28)$$

$$\delta\hat{x}(0) = 0, \forall n = 0 \ldots N. \quad (29)$$

where, by Nyquist, N is determined by the minimum eigen-values of the state transition matrix A, $\lambda_{min}$, i.e., $$N = (5 \sim 10)\frac{1}{\lambda_{min}}, \quad (30)$$

Let $\tilde{A} = e^{(A-KC)\Delta}$, $\delta\hat{x}_n = \delta\hat{x}(n\Delta)$, $\delta y_n = \delta y(n\Delta)$ and replace $\delta u(n\Delta)$ in (28) with (27), yields:

$$\min_{K_p, K_i} \sum_{n=0}^{N} (\delta y_{ref} - C\delta\hat{x}_n)^T (\delta y_{ref} - C\delta\hat{x}_n) \quad (31)$$

$$\text{s.t. } \delta\hat{x}_{n+1} = \quad (32)$$

$$\tilde{A}\left(\delta\hat{x}_n + BK_p(\delta y_{ref} - \delta y_n) + BK_i \sum_{i=0}^{n} (\delta y_{ref} - \delta y_i) + f + K\delta y_n\right)$$

$$\delta\hat{x}_0 = 0, \forall n = 0 \ldots N. \quad (33)$$

Solve the problem using a dynamic programming approach. The cost-to-go function is written as:

$$V(\delta\hat{x}_n, n) = \min_{K_p, K_i} \{(\delta y_{ref} - C\delta\hat{x}_n)^T (\delta y_{ref} - C\delta\hat{x}_n) + V(\hat{x}_{n+1}, n+1)\} \quad (34)$$

$$= \min_{K_p, K_i} \{(\delta\hat{x}_n)^T C^T C\delta\hat{x}_n - 2(\delta\hat{x}_n)^T C^T \delta y_{ref} + (\delta y_{ref})^T \delta y_{ref} + V(\delta\hat{x}_{n+1}, n+1)\} \quad (35)$$

with $V(\hat{x}_N, N) = (\delta\hat{x}_N)^T C^T C\delta\hat{x}_N - 2(\delta\hat{x}_N)^T C^T \delta y_{ref} + (\delta y_{ref})^T \delta y_{ref}$, and equate it to the Riccati form $$V(\delta\hat{x}_n, n) = (\delta\hat{x}_n)^T \Phi_n \delta\hat{x}_n + (\delta\hat{x}_n)^T \Psi_n + \Omega_n \quad (36)$$

where $\Phi_n$ represents a symmetric positive definite matrix, $\Phi_n$ is a positive vector, and $\Omega_n$ is a positive scalar. Combining the equations (35), (36) and the dynamics in (32), yields $$V(\delta\hat{x}_n, n) = \min_{K_p, K_i} \{(\delta\hat{x}_n)^T C^T C\delta\hat{x}_n - 2(\delta\hat{x}_n)^T C^T \delta y_{ref} + (\delta y_{ref})^T \delta y_{ref} + (\delta\hat{x}_{n+1})^T \Phi_n \delta\hat{x}_{n+1} + (\delta\hat{x}_{n+1})^T \Psi_{n+1} + \Omega_{n+1}\} \quad (37)$$

$$= \min_{K_p, K_i} \{(\delta\hat{x}_n)^T C^T C\delta\hat{x}_n - 2(\delta\hat{x}_n)^T C^T \delta y_{ref} + (\delta y_{ref})^T \delta y_{ref}$$

$$+(\delta \hat{x}_n + BK_p(\delta y_{ref} - \delta y_n) + BK_i \sum_{i=0}^{n} (\delta y_{ref} - \delta y_i) + f + \quad (38)$$

$$K\delta y_n)^T \tilde{A}^T \Phi_n \tilde{A} (\delta \hat{x}_n + BK_p(\delta y_{ref} - \delta y_n) + BK_i \sum_{i=0}^{n} (\delta y_{ref} -$$

$$\delta y_i) + f + K\delta y_n) + (\delta \hat{x}_n + BK_p(\delta y_{ref} - \delta y_n) + BK_i \sum_{i=0}^{n} (\delta y_{ref} -$$

$$\delta y_i) + f + K\delta y_n)^T \Psi_{n+1} + \Omega_{n+1}\}$$

In order to minimize this expression, isolate the terms with $K_p$ and $K_i$ in them, $$(BK_p(\delta y_{ref} - \delta y_n))^T \tilde{A}^T \Phi_{n+1} \tilde{A} (BK_p(\delta y_{ref} - \delta y_n)) + \quad (39)$$

$$2(BK_p(\delta y_{ref} - \delta y_n))^T \tilde{A}^T \Phi_{n+1}$$

$$\tilde{A}\left(BK_i \sum_{i=0}^{n} (\delta y_{ref} - \delta y_i) + \delta \hat{x}_n + f + (K\delta y_n) + \right.$$

$$(BK_p(\delta y_{ref} - \delta y_n))^T \Psi_{n+1} + \left(BK_i \sum_{i=0}^{n} (\delta y_{ref} - \delta y_i)\right)^T \tilde{A}^T$$

$$\Phi_{n+1} \tilde{A}\left(BK_i \sum_{i=0}^{n} (\delta y_{ref} - \delta y_i)\right) + 2\left(BK_i \sum_{i=0}^{n} (\delta y_{ref} - \delta y_i)\right)^T$$

$$\tilde{A}^T \Phi_{n+1} \tilde{A}(BK_p(\delta y_{ref} - \delta y_n) + \delta \hat{x}_n + f + K\delta y_n)$$

$$+\left(BK_i \sum_{i=0}^{n} (\delta y_{ref} - \delta y_i)\right)^T \Psi_{n+1} \quad (40)$$

and take the derivative with respect to each element of $K_p$ and $K_i$, and set the value to 0. This yields the solution for the optimal gain $K^*_p$ and $K^*_i$ with respect to $\Phi_n$, $\Phi_n$ and $\Omega_n$. Equating the Riccati form (36) with the value function in (38) evaluated at $K^*_p$ and $K^*_i$, solve for $\Phi_n$, $\Phi_n$ and $\Omega_n$, thereafter, numerical values for $K^*_p$ and $K^*_i$.

Additional details regarding an example embodiment of controlling a battery as part of a network of multiple home solar power systems are as follows, which in this example use functionality to support Internet Of Things (IoT) capabilities in an online network environment such as Microsoft's Azure:

Architecture

In this example, the architecture is designed to control millions of batteries at multiple sites. The architecture consists of the following components:

Battery control units. These reside on-site and allow for control of batteries even in the case where network connection is lost Battery interface (Azure IoT hub). This allows sending and receiving of data to each battery control unit Utility interface (Azure IoT hub). Allows sending and receiving of data to the utility company.

CDI agents. There is one agent for each battery to control; these communicate to the batteries over the battery interface, and with each other to determine an optimal control.

Site management. This component adapts the network of CDI agents to allow for batteries to be added or removed from control automatically Monitoring. This component tracks vital statistics of the CDI agents to allow a user to verify that everything is working, and to provide diagnostics to take action if a problem occurs.

Battery Control Units

The battery control units are located in hardware, on site, and are directly connected to the battery. The battery control units connect to the cloud to receive their desired control via the Azure Internet of Things (IoT) Hub. When the connection is lost, the control units provide backup control to the batteries to ensure they stay in a stable state.

Battery Interface

As mentioned above, each site will connect to this example system via the Azure IoT (Internet of Things) Hub. This will be done using the HTTPS or AMQPS protocols. The IoT hub allows us to scale the number of batteries to the millions, and will handle authentication and message routing. Each battery control unit will have a unique topic that it sends sensor data to, and a unique topic that other components can send control messages to back to the battery.

Utility Interface

Another process is responsible for reading/writing utility requests to the utility. This interface is likely a variant of SCADA, but may be adapted to suit the utility company.

CDI Agents

Each battery will have a process, known as a "CDI agent" to compute the optimal control for the battery. The agents will be implemented as service bus listeners in the Azure cloud. The agents communicate with other agents via the Azure Service Bus using AMQP. Each agent subscribes to the IoT topic from the battery it controls, and so can receive the current state of its battery.

To compute an approximate globally optimal control, the CDI agents communicate their estimation state and optimal control with each other (known as a "mean field"). To keep computation and message passing scalable, the CDI agents are clustered into a 2- or 3-level hierarchy, based on location and possibly battery type. Clusters may, for example, be created for each substation level, and range from 100-1000 agents. Each cluster has a service bus topic to which all agents in the cluster publish and subscribe to. To share state between clusters, a particular node in each cluster is marked as a master. This node additionally subscribes and sends state to another topic shared by other master nodes.

Site Management

There is another set of nodes that are used for site management, that is, to be able to adapt the network of CDI agents as batteries are added or removed, or repair the network if failures occur.

The network structure is encoded by the list of agents and battery control units, as well as the list of which topics each agent should publish and subscribe to. This data is saved within the Azure Storage Service. Creating, destroying, and updating agents is done using the Azure Resource Management API.

When a new battery is installed, the system will receive new messages from the battery control unit for a request to add to the system; this request will include data about the battery (type, location, substation, etc.) that will be needed to find the appropriate CDI agent cluster to add to.

When a battery goes offline for a short time (e.g., due to loss of connection) then the IoT hub manages the last estimate of the state of the battery, and the battery goes into the backup local control until it reconnects. However, if a battery goes offline for a long time (e.g., because it is permanently disconnected) then the Site Management component then stops the associated CDI agent.

When clusters become too unbalanced, that is, they have too many or too few nodes, the site management component splits the cluster in two or combines nearby clusters into one, such as based on proximity or battery type. The site management component sends the affected agents the new lists of topics they subscribe and publish to. The picking of CDI master nodes is also done by the Site Management component.

Monitoring

The monitoring component listens for messages from each battery control unit and each CDI agent to make sure that
- messages are being sent as expected
- overall power is being produced within tolerances of the utility
- battery health is maintained for each battery at each site If a CDI agent is failing to control a battery, then the monitoring may alert a user over a dashboard, and also signal the site management component to restart that agent. If battery control units are failing to respond for a sufficient time, the monitoring may alert to have someone confirm that their battery is going offline, or have someone go out to the site if necessary. If power is not being produced to the requirements of the utility, or battery health is not maintained for some batteries, then the monitoring agent may send messages to the CDI agents to update their parameters to better meet demand or save battery life.

Updates/Maintenance

For updates to Battery Control code, the battery control unit is sent a first message to download the new code, and then a second message to stop the current processes and switch to the newly downloaded code. For updates to CDI Agent code, the site management component can stop running agents one at a time, and restart them with the new version of code. To deploy new code to the monitoring, site management, and utility listener, an updated version is started in parallel, and verified to work, then the old version is decommissioned.

As noted above, in some embodiments and situations, a general battery model may be trained to reflect attributes and characteristics specific to a particular battery in use, such as before controlling of the particular battery in use begins and/or during such controlling and use. Additional details regarding an example embodiment of training a model are as follows:

A parameter learning engine is described for adapting the parameters in the incremental model for the power battery cell to reflect a particular power battery cell.

The stochastic differential equation is:

$$d\delta x(t) = A(t)\delta x(t)dt + B(t)\delta u(t)dt + f(t)dt + d\omega)(t) \quad (1)$$

where the state $\delta x(t) \in \mathbb{R}^3$, $u(t) \in \mathbb{R}^1$ $A(t)$ is a 3×3 matrix, $B(t)$ is a 3×1 vector, $f(t)$ is a 3×1 vector and $\omega(t)$ is a 3×1 vector. The noise has zero mean and the covariance matrix W, e.g., $\omega(t) \sim N(0,W)$.

The observation equation is given by $$\delta y(t) = \delta x(t) + \theta(t) \quad (2)$$

where the measurement $\delta y(t) \in \mathbb{R}^3$, and $\theta(t)$ is a 3×1 vector. The noise has zero mean and the covariance matrix V, e.g., $\theta(t) \sim N(0,V)$.

The parameter learning engine estimates the A matrix, creating a vector of the nine values $\text{vect}(a_{11}, a_{12}, a_{13}, a_{21}, a_{22}, a_{23}, a_{31}, a_{32}, a_{33})$. These parameters are expected to change slower than the incremental state dynamic updates, so a discrete Kalman filter can be used to estimate the A parameters. For this parameter learning engine, the values of $B(t)$, $\delta u(t)$, $f(t)$, $\omega(t)$, $\delta y(t)$, and $\theta(t)$ are known at times $t_i$, $t_{i-1}$ and $t_{i-2}$.

Let $\psi_t = \text{vect}(a_{11}, a_{12}, a_{13}, a_{21}, a_{22}, a_{23}, a_{31}, a_{32}, a_{33})_t$ and the dynamics of the parameters is, $\psi_{t+1} = \psi_t + \Lambda_t$ (3)

where $\Lambda_t$ is $N(0,A)$.

Solving (1) using the variation of constants formula, we get $$\delta x(t_{i+1}) = e^{A(t_{i+1}-t_i)}\delta x(t_i) + \int_{t_i}^{t_{i+1}} e^{A(t_{i+1}-\tau)}(B(\tau)\delta u(\tau) + f(\tau) + \omega(\tau))d\tau \quad (4)$$

and using an impulsive approximation, yields, $$\delta x(t_{i+1}) = e^{A(t_{i+1}-t_i)}\delta x(t_i) + e^{A(t_{i+1}-t_i)}(B(t_i)\delta u(t_i) + f(t_i) + \omega(t_i)) \quad (5)$$

and applying a first order Taylor series expansion on the exponential term yields, $$\delta x(t_{i+1}) = (I + A(t_{i+1}-t_i))(\delta x(t_i) + B(t_i)\delta u(t_i) + f(t) + \omega(t)). \quad (6)$$

Substituting $\delta x(t_i) = \delta y(t_i) - \theta(t_i)$ from (2) yields, $$\delta y(t_{i+1}) = (I + A(t_{i+1}-t_i))(\delta y(t_i) + B(t_i)\delta u(t_i) + f(t_i) + \omega(t_i) - \theta(t_i)) + \theta(t_{i+1}). \quad (7)$$

To simplify the notation, let $$\gamma(t_i) = \delta y(t_i) + B(t_i)\delta u(t_i) + f(t_i) \quad (8)$$

then, $$\delta y(t_{i+1}) = (I + A(t_{i+1}-t_i))(\gamma(t_i) + \omega(t_i) - \theta(t_i)) + \theta(t_{i+1})$$

$$\delta y(t_{i+1}) = A(t_{i+1}-t_i)\gamma(t_i) + (\gamma(t_i) + \omega(t_i) - \theta(t_i)) + \theta(t_{i+1}) + \Omega(t_{i+1})$$

where $\Omega(t_{i+1})$ is a noise term. Then we have, $$\delta y(t_{i+1}) - \gamma(t_i) = A(t_{i+1}-t_i)\gamma(t_i) + \omega(t_i) - \theta(t_i) + \theta(t_{i+1}) + \Omega(t_{i+1}) \quad (9)$$

$$= A(t_{i+1}-t_i)(\gamma(t_i)) + \Xi(t_{i+1})$$

Let the sum of the independent noise vectors be $\Xi(t_{i+1}) = \omega(t_i) - \theta(t_i) + \theta(t_{i+1}) + \Omega(t_{i+1})$ which has zero mean and because the noises are independent, the covariance matrix is the sum of the individual variances.

Now, to estimate the nine parameter values in A, which are constant over long intervals, we write (9) at times $t_i$, $t_{i-1}$ and $t_{i-2}$, $$\delta y(t_i) - \gamma(t_{i-1}) = A(t_i - t_{i-1})(\gamma(t_{i-1})) + \Xi(t_i)$$

$$\delta y(t_{i-1}) - \gamma(t_{i-2}) = A(t_{i-1} - t_{i-2})(\gamma(t_{i-2})) + \Xi(t_{i-1})$$

$$\delta y(t_{i-2}) - \gamma(t_{i-3}) = A(t_{i-2} - t_{i-3})(\gamma(t_{i-2})) + \Xi(t_{i-2})$$

and rewrite in matrix form for the parameter observation equation for the parameters, as, $$\begin{bmatrix} \delta y_1(t_i) - \gamma_1(t_{i-1}) \\ \delta y_2(t_i) - \gamma_2(t_{i-1}) \\ \delta y_3(t_i) - \gamma_3(t_{i-1}) \\ \delta y_1(t_{i-1}) - \gamma_1(t_{i-2}) \\ \delta y_2(t_{i-1}) - \gamma_2(t_{i-2}) \\ \delta y_3(t_{i-1}) - \gamma_3(t_{i-2}) \\ \delta y_1(t_{i-2}) - \gamma_1(t_{i-3}) \\ \delta y_2(t_{i-2}) - \gamma_2(t_{i-3}) \\ \delta y_3(t_{i-2}) - \gamma_3(t_{i-3}) \end{bmatrix} = \mathcal{G}(t_i) \begin{bmatrix} a_{11} \\ a_{12} \\ a_{13} \\ a_{21} \\ a_{22} \\ a_{23} \\ a_{31} \\ a_{32} \\ a_{33} \end{bmatrix} + \tilde{\Xi}(t_i) \quad (10)$$

where $\tilde{\Xi}(t_i)$ is a 9×1 Gaussian vector with zero mean and a diagonal covariance matrix, with diagonal entries equal to the diagonal elements of $W + 2V + \text{Cov}(\Omega)$.

Now, we have, $$G(t_i) = \begin{bmatrix} G_{11}(t_i) & G_{12}(t_i) & G_{13}(t_i) \\ G_{21}(t_i) & G_{22}(t_i) & G_{23}(t_i) \\ G_{31}(t_i) & G_{32}(t_i) & G_{33}(t_i) \end{bmatrix} \quad (11)$$

where $$G_{11}(t_i) = \begin{bmatrix} \gamma_1(t_{i-1})(t_i - t_{i-1}) & \gamma_2(t_{i-1})(t_i - t_{i-1}) & \gamma_3(t_{i-1})(t_i - t_{i-1}) \\ 0 & 0 & 0 \\ 0 & 0 & 0 \end{bmatrix}$$

$$G_{12}(t_i) = \begin{bmatrix} 0 & 0 & 0 \\ \gamma_1(t_{i-1})(t_i - t_{i-1}) & \gamma_2(t_{i-1})(t_i - t_{i-1}) & \gamma_3(t_{i-1})(t_i - t_{i-1}) \\ 0 & 0 & 0 \end{bmatrix}$$

$$G_{13}(t_i) = \begin{bmatrix} 0 & 0 & 0 \\ 0 & 0 & 0 \\ \gamma_1(t_{i-1})(t_i - t_{i-1}) & \gamma_2(t_{i-1})(t_i - t_{i-1}) & \gamma_3(t_{i-1})(t_i - t_{i-1}) \end{bmatrix}$$

and $$G_{21}(t_i) = \begin{bmatrix} \gamma_1(t_{i-2})(t_{i-1} - t_{i-2}) & \gamma_2(t_{i-2})(t_{i-1} - t_{i-2}) & \gamma_3(t_{i-2})(t_{i-1} - t_{i-2}) \\ 0 & 0 & 0 \\ 0 & 0 & 0 \end{bmatrix}$$

$$G_{22}(t_i) = \begin{bmatrix} 0 & 0 & 0 \\ \gamma_1(t_{i-2})(t_{i-1} - t_{i-2}) & \gamma_2(t_{i-2})(t_{i-1} - t_{i-2}) & \gamma_3(t_{i-2})(t_{i-1} - t_{i-2}) \\ 0 & 0 & 0 \end{bmatrix}$$

$$G_{23}(t_i) = \begin{bmatrix} 0 & 0 & 0 \\ 0 & 0 & 0 \\ \gamma_1(t_{i-2})(t_{i-1} - t_{i-2}) & \gamma_2(t_{i-2})(t_{i-1} - t_{i-2}) & \gamma_3(t_{i-2})(t_{i-1} - t_{i-2}) \end{bmatrix}$$

and $$G_{31}(t_i) = \begin{bmatrix} \gamma_1(t_{i-3})(t_{i-2} - t_{i-3}) & \gamma_2(t_{i-3})(t_{i-2} - t_{i-3}) & \gamma_3(t_{i-3})(t_{i-2} - t_{i-3}) \\ 0 & 0 & 0 \\ 0 & 0 & 0 \end{bmatrix}$$

$$G_{32}(t_i) = \begin{bmatrix} 0 & 0 & 0 \\ \gamma_1(t_{i-3})(t_{i-2} - t_{i-3}) & \gamma_2(t_{i-3})(t_{i-2} - t_{i-3}) & \gamma_3(t_{i-3})(t_{i-2} - t_{i-3}) \\ 0 & 0 & 0 \end{bmatrix}$$

$$G_{33}(t_i) = \begin{bmatrix} 0 & 0 & 0 \\ 0 & 0 & 0 \\ \gamma_1(t_{i-3})(t_{i-2} - t_{i-3}) & \gamma_2(t_{i-3})(t_{i-2} - t_{i-3}) & \gamma_3(t_{i-3})(t_{i-2} - t_{i-3}) \end{bmatrix}$$

Now we use a discrete Kalman filter to estimate the parameters $$\psi_i = \begin{bmatrix} a_{11} \\ a_{12} \\ a_{13} \\ a_{21} \\ a_{22} \\ a_{23} \\ a_{31} \\ a_{32} \\ a_{33} \end{bmatrix}_{t_i}.$$

As shown in (3) and (10), the parameter dynamics equation and the parameter observation equation are $$\psi_{i+1} = \psi_i + \Lambda_i$$

$$Z_i = G_i \psi_i + \tilde{\Xi}_i$$

where $\Lambda_i$ is $N(0,\lambda)$, $\tilde{\Xi}_i$ is $N(0, W+2V+\text{Cov}(\Omega))$, $G_i = G(t_i)$ as shown in (11), and the observation $$Z_i = \begin{bmatrix} \delta y_1(t_i) - \gamma_1(t_{i-1}) \\ \delta y_2(t_i) - \gamma_2(t_{i-1}) \\ \delta y_3(t_i) - \gamma_3(t_{i-1}) \\ \delta y_1(t_{i-1}) - \gamma_1(t_{i-2}) \\ \delta y_2(t_{i-1}) - \gamma_2(t_{i-2}) \\ \delta y_3(t_{i-1}) - \gamma_3(t_{i-2}) \\ \delta y_1(t_{i-2}) - \gamma_1(t_{i-3}) \\ \delta y_2(t_{i-2}) - \gamma_2(t_{i-3}) \\ \delta y_3(t_{i-2}) - \gamma_3(t_{i-3}) \end{bmatrix}$$

as shown in (10).

The Discrete Kalman filter equations follow.
The predictor equation of the state estimate is $$\psi_{i+1|i} = \psi_{i|i} \tag{12}$$

and the corrector equation with measurement is $$\psi_{i+1|i+1} = \psi_{i+1|i} + K_i^{gain}(Z_i - \psi_{i+1|i}) \tag{13}$$

where $K_i^{gain}$ is the gain matrix.
The covariance matrix for the Kalman filter, denoted as $\Sigma$, is computed by the predictor equation, $$\Sigma_{i+1|i} = \Sigma_{i|i} + \lambda \tag{14}$$

and the corrector equation, $$\Sigma_{i+1|i+1} = [I - K_i^{gain}]\Sigma_{i+1|i}. \tag{15}$$

The gain is $$K_i^{gain} = \Sigma_{i+1|i}(\Sigma_{i+1|i} + W + 2V + \text{Cov}(\Omega))^{-1}. \tag{16}$$

The initial condition is $$\Sigma_{0|0} = 0_0. \tag{17}$$

Figure 27:
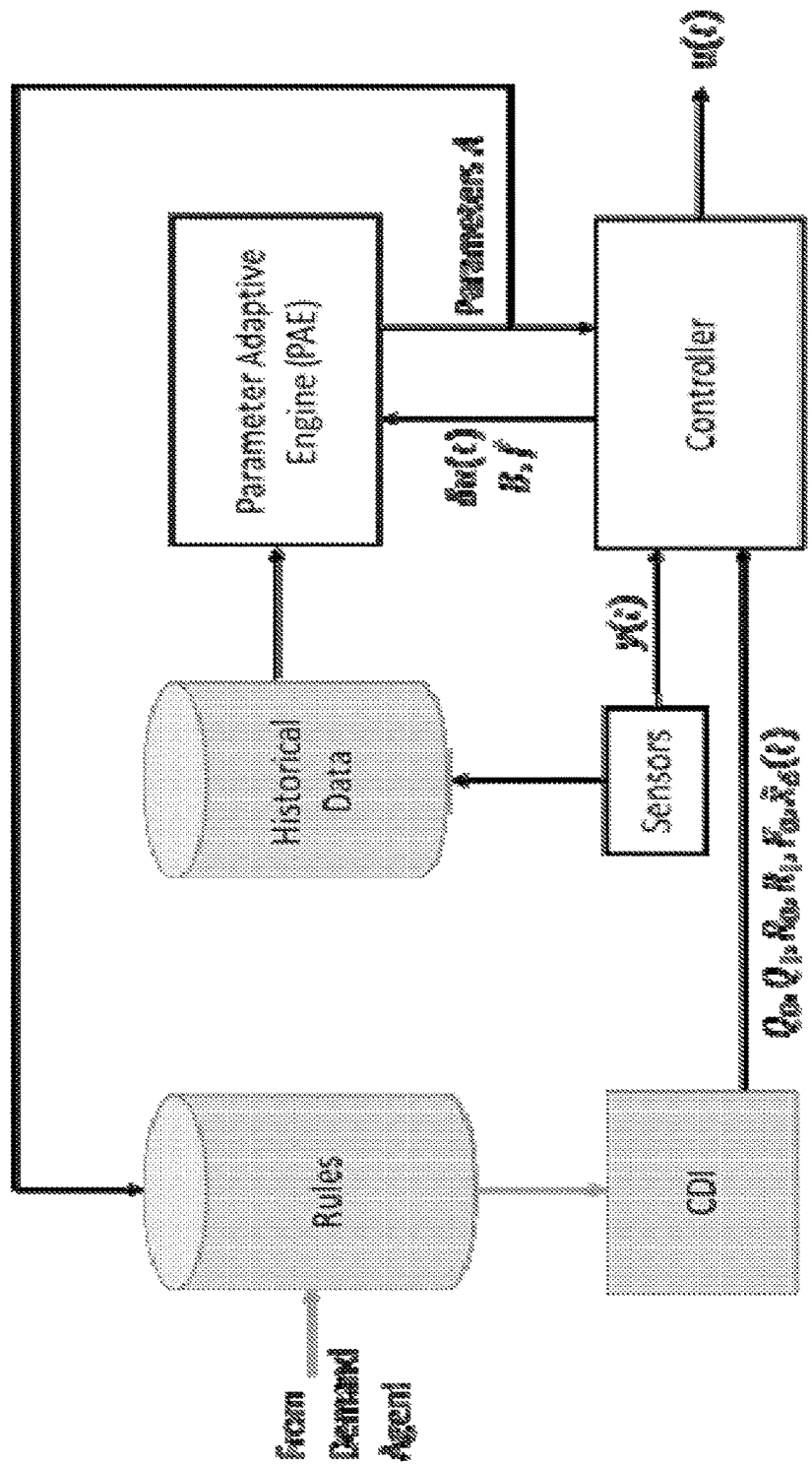
FIG. 27 is a block diagram illustrating an example architecture for training a battery model for a battery.

FIG. 27 illustrates an architecture 2700 of the Parameter Learning Engine, with the Parameter Adaptive Engine (PAE) being a central component. The parameters of the model change slower than the state of the system.

As noted above, in some embodiments and situations, the internal state of an operating battery may be estimated, such as to estimate an internal temperature of the battery. Rather than managing battery temperature in the manner discussed herein, it is noted that prior systems, if they use temperature at all, typically merely shut down a battery's operation if the external temperature is too high, rather than control the battery's operations to manage the temperature. In addition, while not described in the example temperature model below, in some embodiments additional operations may be performed to control the internal temperature of the battery based at least in part on managing an external temperature surrounding the battery, such as by controlling the external temperature based at least in part on an estimated internal state of the battery.

Additional details regarding an example embodiment of using a battery temperature model to estimate such internal battery temperature are as follows:

The incremental dynamic behavior of the battery temperature (running at a higher speed) is given by a differential equation, $$\delta \dot{T}(t) = a\delta T(t-\tau) + v(t) \tag{1}$$

where $\tau$ is a time delay representing diffusion effect, and $v(t)$ is a linear function of the incremental state vector $\delta x(t)$ (power, voltage, current) and the incremental control $\delta u(t)$ for the lower speed control tracker, $$v(t) = b \cdot \delta x(t) + c \cdot \delta u(t) + v_1(t) \tag{2}$$

The parameters $a$, $b$, $c$ and $\tau$ can be estimated by a non-linear least squares estimator using the historical data, and $v_1(t)$ is a Gaussian noise.
The Laplace transform of (1) is $$s\delta T(s) = ae^{-s\tau}\delta T(s) + v(s) \tag{3}$$

$$(s - ae^{-s\tau})\delta T(s) = v(s) \tag{4}$$

We approximate the term $(s - ae^{-s\tau})$ in (4) with a Pade approximant [1] of the form $$\frac{P(s)}{Q(s)},$$

where P and Q are polynomials in s, and the order $o(P) > o(Q)$. The Laplace transform of (1) is approximated by $$\frac{P(s)}{Q(s)}\delta T(s) = v(s) \tag{5}$$

For a low frequency approximation, we select a Pade approximant of the form $$\frac{P(s)}{Q(s)}$$

with $$P(s) = s^2 + a_1 s + a_0 \tag{6}$$

$$Q(s) = \beta_1 s + \beta_0 \tag{7}$$

We define $$w(s) = P(s)\delta T(s) \tag{8}$$

Replacing P(s) in (8) with (6), yields $$s^2\delta T(s) + a_1 s\delta T(s) + a_0\delta T(s) = w(s) \tag{9}$$

The inverse Laplace transform of (9) is $$\delta\ddot{T}(t) + a_1\delta\dot{T}(t) + a_0\delta T(t) = w(t) \tag{10}$$

Define $y_1(t) = \delta T(t)$ and $y_2(t) = \dot{y}(t) = \delta\dot{T}(t)$, we have $$\dot{y}_2(t) = \delta\ddot{T}(t) = -a_1\delta\dot{T}(t) - a_0\delta T(t) + w(t) = -a_1 y_2(t) - a_0 y_1(t) + w(t)$$

$$\begin{bmatrix} \dot{y}_1(t) \\ \dot{y}_2(t) \end{bmatrix} = \begin{bmatrix} 0 & 1 \\ -\alpha_0 & -\alpha_1 \end{bmatrix} \begin{bmatrix} y_1(t) \\ y_2(t) \end{bmatrix} + \begin{bmatrix} 0 \\ 1 \end{bmatrix} w(t)$$

From (5) and (8), we also have $$w(s) = Q(s)v(s) \tag{12}$$

Replacing Q(s) in (12) with (7), yields $$w(s) = \beta_1 s v(s) + \beta_0 v(s) \tag{13}$$

The inverse Laplace transform of (13) is $$w(t) = \beta_1 \dot{v}(t) + \beta_0 v(t) \tag{14}$$

Replacing v(t) in (14) with (2), yields $$w(t) = \beta_1 b \cdot \delta\dot{x}(t) + \beta_1 c \cdot \delta\dot{u}(t) + \beta_0 b \cdot \delta x(t) + \beta_0 c \cdot \delta u(t) + v_1(t) \tag{15}$$

where $v_1(t)$ is a Gaussian noise.
In (15), we set the values of $\delta\dot{x}(t)$, $\delta x(t)$ and $\delta u(t)$ to be constant during a unit time interval of the lower speed controller, i.e., $$\delta\dot{x}(t) = \delta\dot{x}^L(t_0), \delta x(t) = \delta x^L(t_0), \delta u(t) = \delta u^L(t_0) \tag{16}$$

and let $\delta\dot{u}(t)$ to be the control variable for the high speed controller, yielding $$\begin{bmatrix} \dot{y}_1(t) \\ \dot{y}_2(t) \end{bmatrix} = \begin{bmatrix} 0 & 1 \\ -\alpha_0 & -\alpha_1 \end{bmatrix} \begin{bmatrix} y_1(t) \\ y_2(t) \end{bmatrix} + \begin{bmatrix} 0 \\ \beta_1 c \end{bmatrix} \delta \dot{u}(t) + \begin{bmatrix} 0 \\ \beta_1 b \cdot \delta \dot{x}^L(t_0) + \beta_0 b \cdot \delta x^L(t_0) + \beta_0 c \cdot \delta u^L(t_0 + v_1(t)) \end{bmatrix} \quad (17)$$

The state equation in (17) can be rewritten as:

$$\dot{y}(t) = Ay(t) + B\delta \dot{u}(t) + f + \Omega(t) \quad (18)$$

with $$A = \begin{bmatrix} 0 & 1 \\ -\alpha_0 & -\alpha_1 \end{bmatrix}, B = \begin{bmatrix} 0 \\ \beta_1 c \end{bmatrix} \text{ and}$$

$$f = \begin{bmatrix} 0 \\ \beta_1 b \cdot \delta \dot{x}^L(t_0) + \beta_0 b \cdot \delta x^L(t_0) + \beta_0 c \cdot \delta u^L(t_0) \end{bmatrix},$$

and $\Omega(t)$ is a Gaussian noise.

The optimal control tracking problem for the high speed controller is summarized as:

$$\min_{\delta u(t)} E \int_{t_i}^{t_{i+1}} (y(t)^T Q y(t) + \delta \dot{u}(t)^T R \delta \dot{u}(t)) dt \quad (19)$$

$$s.t. \quad \dot{y}(t) = Ay(t) + B\delta \dot{u}(t) + f + \Omega(t) \quad (20)$$

By the separation principle, we can get the incremental control for the high speed controller, $$\delta u^H(t) = K\hat{y}(t) + \Phi \quad (21)$$

where $\hat{y}(t)$ is the state estimate by running a discrete Kalman filter, K and $\Phi$ are obtained by solving the deterministic tracking problem.

In the end, we take the linear combination of the two incremental controls $\delta u^L(t)$ and $\delta u^H(t)$ to get the incremental control $\delta u(t)$, $$\delta u(t) = \in_1 \delta u^L(t) + \in_2 \delta u^H(t) \quad (22)$$

where $\in_1 + \in_2 = 1$ and $0 \le \in_1, \in_2 \le 1$.

Notes: The (2,1) pade approximation for $$e^x = \frac{x^2 + 4x + 6}{-2x + 6}$$

then the (2,1) pade approximation for ($=ae^{-s\tau}$) is $$\frac{P(s)}{Q(s)} = s - a\frac{(-s\tau)^2 + 4(-s\tau) + 6}{-2(-s\tau) + 6} = \frac{(2\tau - a\tau^2)s^2 + (4a\tau + 6)s - 6a}{2\tau s + 6} = \frac{a^2 + \frac{4a\tau + 6}{2\tau - a\tau^2}s - \frac{6a}{2\tau - a\tau^2}}{\frac{2\tau}{2\tau - a\tau^2}s + \frac{6}{2\tau - a\tau^2}} \quad (23)$$

From (6) and (7), we have $$a_1 = \frac{4a\tau + 6}{2\tau - a\tau^2}, a_2 = \frac{-6a}{2\tau - a\tau^2}, \beta_1 = \frac{2\tau}{2\tau - a\tau^2}, \quad (24)$$

$$\beta_2 = \frac{6}{2\tau - a\tau^2}$$

In general, if P and Q are on an order of m and n respectively, (11) and (14) can be generalized as follows, $$\begin{bmatrix} \dot{y}_1(t) \\ \dot{y}_2(t) \\ \vdots \\ \dot{y}_{m-1}(t) \\ \dot{y}_m(t) \end{bmatrix} = \begin{bmatrix} 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \\ -a_0 & -a_1 & -a_2 & \ldots & -a_{m-1} \end{bmatrix} \begin{bmatrix} y_1(t) \\ y_2(t) \\ \vdots \\ y_{m-1}(t) \\ y_m(t) \end{bmatrix} + \begin{bmatrix} 0 \\ 0 \\ \vdots \\ 0 \\ 1 \end{bmatrix} w(t) \quad (25)$$

$$w(t) = \beta_0 v(t) + \beta_1 \dot{v}(t) + \beta_2 v^{(2)}(t) + \ldots + \beta_n v^{(n)}(t) \quad (26)$$

Figure 29:
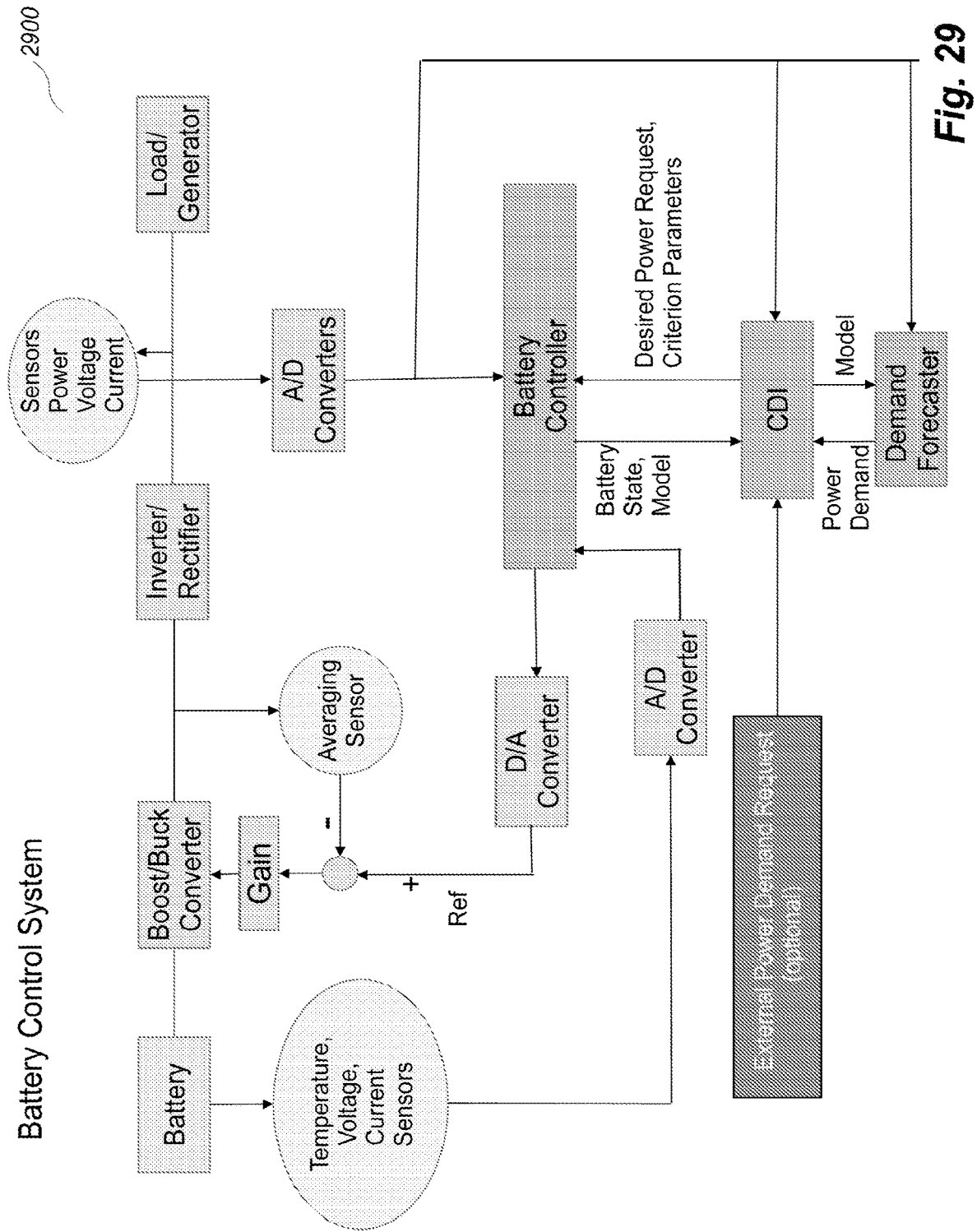
FIG. 29 is a block diagram illustrating an example architecture for a battery control system.

FIG. 29 is a block diagram illustrating an example architecture 2900 for a battery control system. The example architecture includes, for example, the following components:

a Boost/Buck Converter, such as a DC-to-DC converter used to match the average pulsed output to the commanded power from the battery controller;

an Inverter/Rectifier, such as with the power inverter converting DC to AC when battery is discharging, and with the rectifier converting AC to DC when battery is charging;

a A/D converter, such as an analog-to-digital converter that converts a continuous physical quantity to a digital number that represents the quantity's amplitude;

a D/A converter, such as a digital-to-analog converter that converts digital data (usually binary) into an analog signal (current, voltage, or electric charge);

a Battery Controller, such as an incremental feedback hybrid tracking control system (e.g., that includes a state estimator, a parameter learning engine, and a state and state rate tracker controller, as discussed in greater detail elsewhere herein) that drives/controls the Boost/Buck converter so that the battery operates in near resonance with a desired power signal generated by a CDI agent;

a CDI Agent, such as to infer battery parameters and to use longevity and performance rules to generate the tracking signal for the desired power signal; and a Demand Forecaster, such as to generate the desired output power/charge power forecast of the battery.

Figure 3:
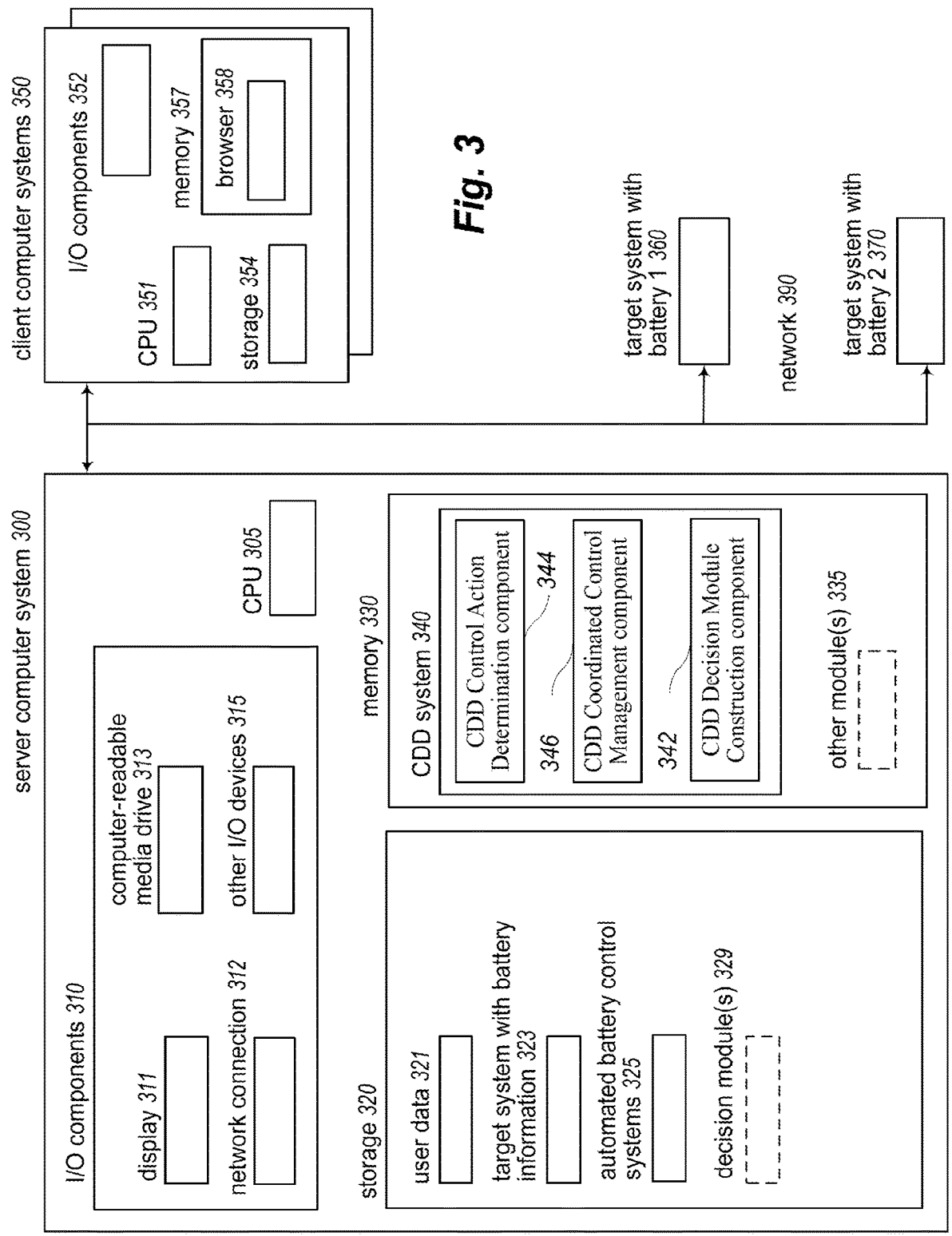
FIG. 3 is a block diagram illustrating example computing systems suitable for executing an embodiment of a system for performing cooperative distributed control of target systems in configured manners.

FIG. 3 is a block diagram illustrating example computing systems suitable for performing techniques for implementing automated control systems to control or otherwise manipulate at least some operations of specified physical systems or other target systems in configured manners, such as to control physical target systems having one or more batteries by using characteristics of each battery's state to perform automated control of DC power that is provided from the battery (e.g., in a real-time manner and to optimize long-term operation of the battery), such as in the matter discussed above with respect to FIGS. 10-29 and elsewhere herein. In particular, FIG. 3 illustrates a server computing system 300 suitable for providing at least some functionality of a CDD system, although in other embodiments multiple computing systems may be used for the execution (e.g., to have distinct computing systems executing the CDD Decision Module Construction component for initial configuration and setup before run-time control occurs, and one or more copies of the CDD Control Action Determination component 344 and/or the CDD Coordinated Control Managements component 346 for the actual run-time control). FIG. 3 also illustrates various client computer systems 350 that may be used by customers or other users of the CDD system 340, as well as one or more target systems with batteries to be controlled (in this example, target system 1 360 and target system 2 370, which are accessible to the CDD system 340 over one or more computer networks 390).

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more CPUs 351, 1/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, but such computing systems and components are not illustrated in this example for the sake of brevity.

The CDD system 340 is executing in memory 330 and includes components 342-346, and in some embodiments the system and/or components each includes various software instructions that when executed program one or more of the CPU processors 305 to provide an embodiment of a CDD system as described elsewhere herein. The CDD system 340 may interact with computing systems 350 over the network 390 (e.g., via the Internet and/or the World Wide Web, via a private cellular network, etc.), as well as the target systems 360 and 370 in this example. In this example embodiment, the CDD system includes functionality related to generating and deploying decision modules in configured manners for customers or other users, as discussed in greater detail elsewhere herein. The other computing systems 350 may also be executing various software as part of interactions with the CDD system 340 and/or its components. For example, client computing systems 350 may be executing software in memory 357 to interact with CDD system 340 (e.g., as part of a Web browser, a specialized client-side application program, etc.), such as to interact with one or more interfaces (not shown) of the CDD system 340 to configure and deploy automated control systems (e.g., stored automated control systems 325 that were previously created by the CDD system 340 for use in controlling one or more physical target systems with batteries) or other decision modules 329, as well as to perform various other types of actions, as discussed in greater detail elsewhere. Various information related to the functionality of the CDD system 340 may be stored in storage 320, such as information 321 related to users of the CDD system (e.g., account information), and information 323 related to one or more target systems that have batteries to be controlled.

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDD system 340 and its components may in some embodiments be distributed in additional components. Similarly, in some embodiments some of the functionality of the CDD system 340 and/or CDD components 342-346 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the CDD system 340 and/or the CDD components 342-346) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

For illustrative purposes, some additional details are included below regarding some embodiments in which specific types of operations are performed in specific manners, including with respect to particular types of target systems and for particular types of control activities determined in particular manners. These examples are provided for illustrative purposes and are simplified for the sake of brevity, and the inventive techniques may be used in a wide variety of other situations, including in other environments and with other types of automated control action determination techniques, some of which are discussed below.

FIG. 1 is a network diagram illustrating an example environment in which a system for performing cooperative distributed control of one or more target systems may be configured and initiated. In particular, an embodiment of a CDD system 140 is executing on one or more computing systems 190, including in the illustrated embodiment to operate in an online manner and provide a graphical user interface (GUI) (not shown) and/or other interfaces 119 to enable one or more remote users of client computing systems 110 to interact over one or more intervening computer networks 100 with the CDD system 140 to configure and create one or more decision modules to include as part of an automated control system to use with each of one or more target systems to be controlled.

In particular, target system 1 160 and target system 2 170 are example target systems illustrated in this example, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In this example, the one or more users (not shown) may interact with the CDD system 140 to generate an example automated control system 122 for target system 1, with the automated control system including multiple decision modules 124 in this example that will cooperatively interact to control portions of the target system 1 160 when later deployed and implemented. The process of the users interacting with the CDD system 140 to create the automated control system 122 may involve a variety of interactions over time, including in some cases independent actions of different groups of users, as discussed in greater detail elsewhere. In addition, as part of the process of creating and/or training or testing automated control system 122, it may perform one or more interactions with the target system 1 as illustrated, such as to obtain partial initial state information, although some or all training activities may in at least some embodiments include simulating effects of control actions in the target system 1 without actually implementing those control actions at that time.

After the automated control system 122 is created, the automated control system may be deployed and implemented to begin performing operations involving controlling the target system 1 160, such as by optionally executing the automated control system 122 on the one or more computing systems 190 of the CDD system 140, so as to interact over the computer networks 100 with the target system 1. In other embodiments and situations, the automated control system 122 may instead be deployed by executing local copies of some or all of the automated control system 122 (e.g., one or more of the multiple decision modules 124) in a manner local to the target system 1, as illustrated with respect to a deployed copy 121 of some or all of automated control system 1, such as on one or more computing systems (not shown) that are part of the target system 1.

In a similar manner to that discussed with respect to automated control system 122, one or more users (whether the same users, overlapping users, or completely unrelated users to those that were involved in creating the automated control system 122) may similarly interact over the computer network 100 with the CDD system 140 to create a separate automated control system 126 for use in controlling some or all of the target system 2 170. In this example, the automated control system 126 for target system 2 includes only a single decision module 128 that will perform all of the control actions for the automated control system 126. The automated control system 126 may similarly be deployed and implemented for target system 2 in a manner similar to that discussed with respect to automated control system 122, such as to execute locally on the one or more computing systems 190 and/or on one or more computing systems (not shown) that are part of the target system 2, although a deployed copy of automated control system 2 is not illustrated in this example. It will be further appreciated that the automated control systems 122 and/or 126 may further include other components and/or functionality that are separate from the particular decision modules 124 and 128, respectively, although such other components and/or functionality are not illustrated in FIG. 1.

The network 100 may, for example, be a publicly accessible network of linked networks, possibly operated by various distinct parties, such as the Internet, with the CDD system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the CDD system 140 in the illustrated embodiment is implemented in an online manner to support various users over the one or more computer networks 100, in other embodiments a copy of the CDD system 140 may instead be implemented in other manners, such as to support a single user or a group of related users (e.g., a company or other organization), such as if the one or more computer networks 100 are instead an internal computer network of the company or other organization, and with such a copy of the CDD system optionally not being available to other users external to the company or other organizations. The online version of the CDD system 140 and/or local copy version of the CDD system 140 may in some embodiments and situations operate in a fee-based manner, such that the one or more users provide various fees to use various operations of the CDD system, such as to perform interactions to generate decision modules and corresponding automated control systems, and/or to deploy or implement such decision modules and corresponding automated control systems in various manners. In addition, the CDD system 140, each of its components (including component 142 and optional other components 117, such as one or more CDD Control Action Determination components and/or one or more CDD Coordinated Control Management components), each of the decision modules, and/or each of the automated control systems may include software instructions that execute on one or more computing systems (not shown) by one or more processors (not shown), such as to configure those processors and computing systems to operate as specialized machines with respect to performing their programmed functionality.

While not illustrated in FIGS. 1 and 2, the distributed nature of operations of automated control systems such as those of 122 allow partially decoupled operations of the various decision modules, include to allow modifications to the group of decision modules 124 to be modified over time while the automated control system 122 is in use, such as to add new decision modules 124 and/or to remove existing decision modules 124. In a similar manner, changes may be made to particular decision modules 124 and/or 128, such as to change rules or other restrictions specific to a particular decision module and/or to change goals specific to a particular decision module over time, with a new corresponding model being generated and deployed within such a decision module, including in some embodiments and situations while the corresponding automated control system continues control operations of a corresponding target system. In addition, while each automated control system is described as controlling a single target system in the examples of FIGS. 1 and 2, in other embodiments and situations, other configurations may be used, such as for a single automated control system to control multiple target systems (e.g., multiple inter-related target systems, multiple target systems of the same type, etc.), and/or multiple automated control systems may operate to control a single target system, such as by each operating independently to control different portions of that target control system. It will be appreciated that other configurations may similarly be used in other embodiments and situations.

Figure 4:
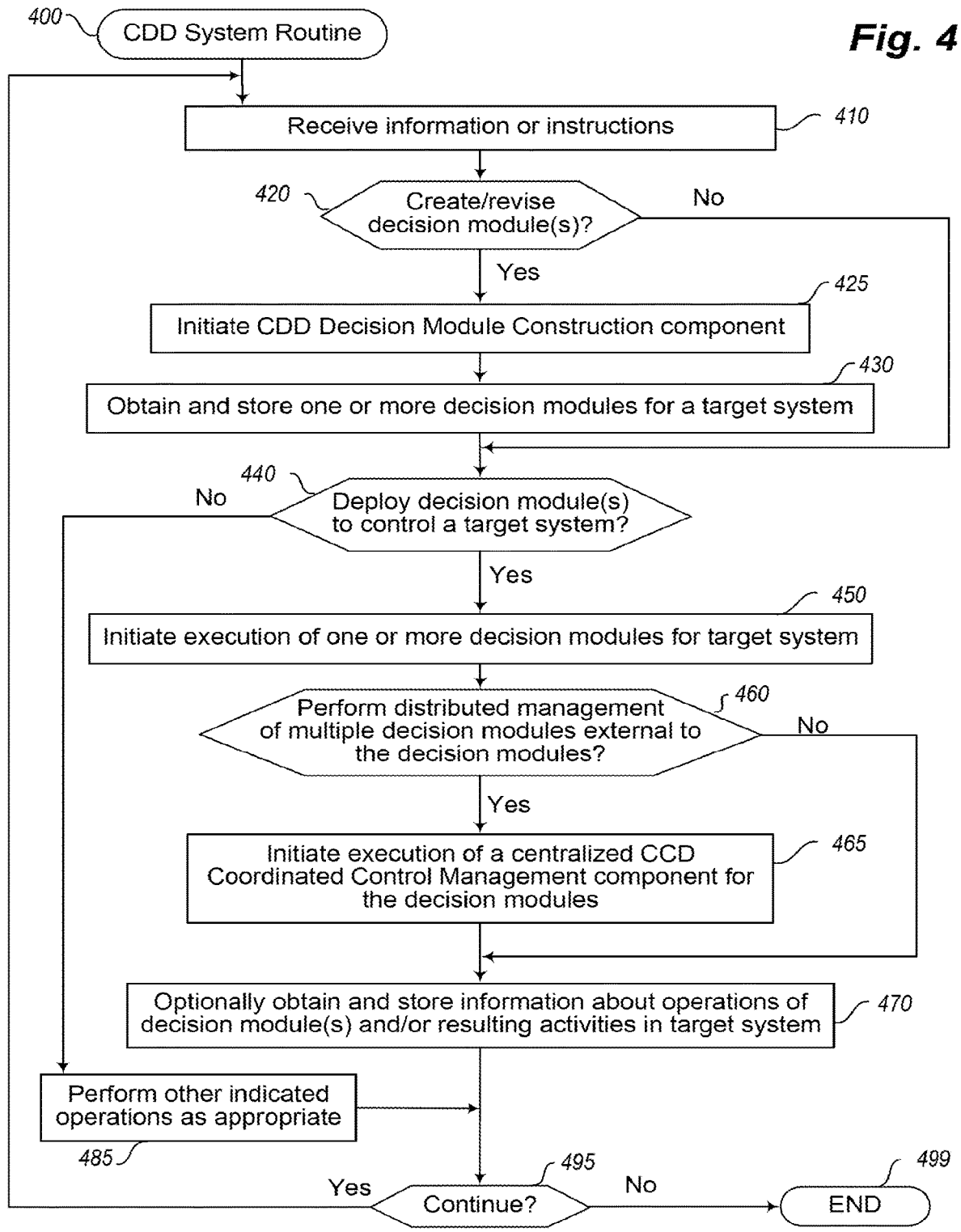
FIG. 4 illustrates a flow diagram of an example embodiment of a Collaborative Distributed Decision (CDD) System routine.

FIG. 4 is a flow diagram of an example embodiment of a Collaborative Distributed Decision (CDD) system routine 400. The routine may, for example, be provided by execution of the CDD system 340 of FIG. 3 and/or the CDD system 140 of FIG. 1, such as to provide functionality to construct and implement automated control systems for specified target systems.

The illustrated embodiment of the routine begins at block 410, where information or instructions are received. If it is determined in block 420 that the information or instructions of block 410 include an indication to create or revise one or more decision modules for use as part of an automated control system for a particular target system, the routine continues to block 425 to initiate execution of a Decision Module Construction component, and in block 430 obtains and stores one or more resulting decision modules for the target system that are created in block 425. One example of a routine for such a Decision Module Construction component is discussed in greater detail with respect to FIGS. 5A-5B.

After block 430, or if it is instead determined in block 420 that the information or instructions received in block 410 are not to create or revise one or more decision modules, the routine continues to block 440 to determine whether the information or instructions received in block 410 indicate to deploy one or more created decision modules to control a specified target system, such as for one or more decision modules that are part of an automated control system for that target system. The one or more decision modules to deploy may have been created immediately prior with respect to block 425, such that the deployment occurs in a manner that is substantially simultaneous with the creation, or in other situations may include one or more decision modules that were created at a previous time and stored for later use. If it is determined to deploy one or more such decision modules for such a target system, the routine continues to block 450 to initiate the execution of those one or more decision modules for that target system, such as on one or more computing systems local to an environment of the target system, or instead on one or more remote computing systems that communicate with the target system over one or more intermediary computer networks (e.g., one or more computing systems under control of a provider of the CDD system).

After block 450, the routine continues to block 460 to determine whether to perform distributed management of multiple decision modules being deployed in a manner external to those decision modules, such as via one or more centralized Coordinated Control Management components. If so, the routine continues to block 465 to initiate execution of one or more such centralized CDD Coordinated Control Management components for use with those decision modules. After block 465, or if it is instead determined in block 460 to not perform such distributed management in an external manner (e.g., if only one decision module is executed, if multiple decision modules are executed but coordinate their operations in a distributed peer-to-peer manner, etc.), the routine continues to block 470 to optionally obtain and store information about the operations of the one or more decision modules and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of decision modules and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple decision modules for an automated control system in a partially decoupled manner allows various changes to be made while the automated control system is in operation, such as to add one or more new decision modules, to remove one or more existing decision modules, to modify the operation of a particular decision module (e.g., by changing rules or other information describing the target system that is part of a model for the decision module), etc. In addition, the partially decoupled nature of multiple such decision modules in an automated control system allows one or more such decision modules to operate individually at times, such as if network communication issues or other problems prevent communication between multiple decision modules that would otherwise allow their individualized control actions to be coordinated—in such situations, some or all such decision modules may continue to operate in an individualized manner, such as to provide useful ongoing control operations for a target system even if optimal or near-optimal solutions cannot be identified from coordination and synchronization between a group of multiple decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
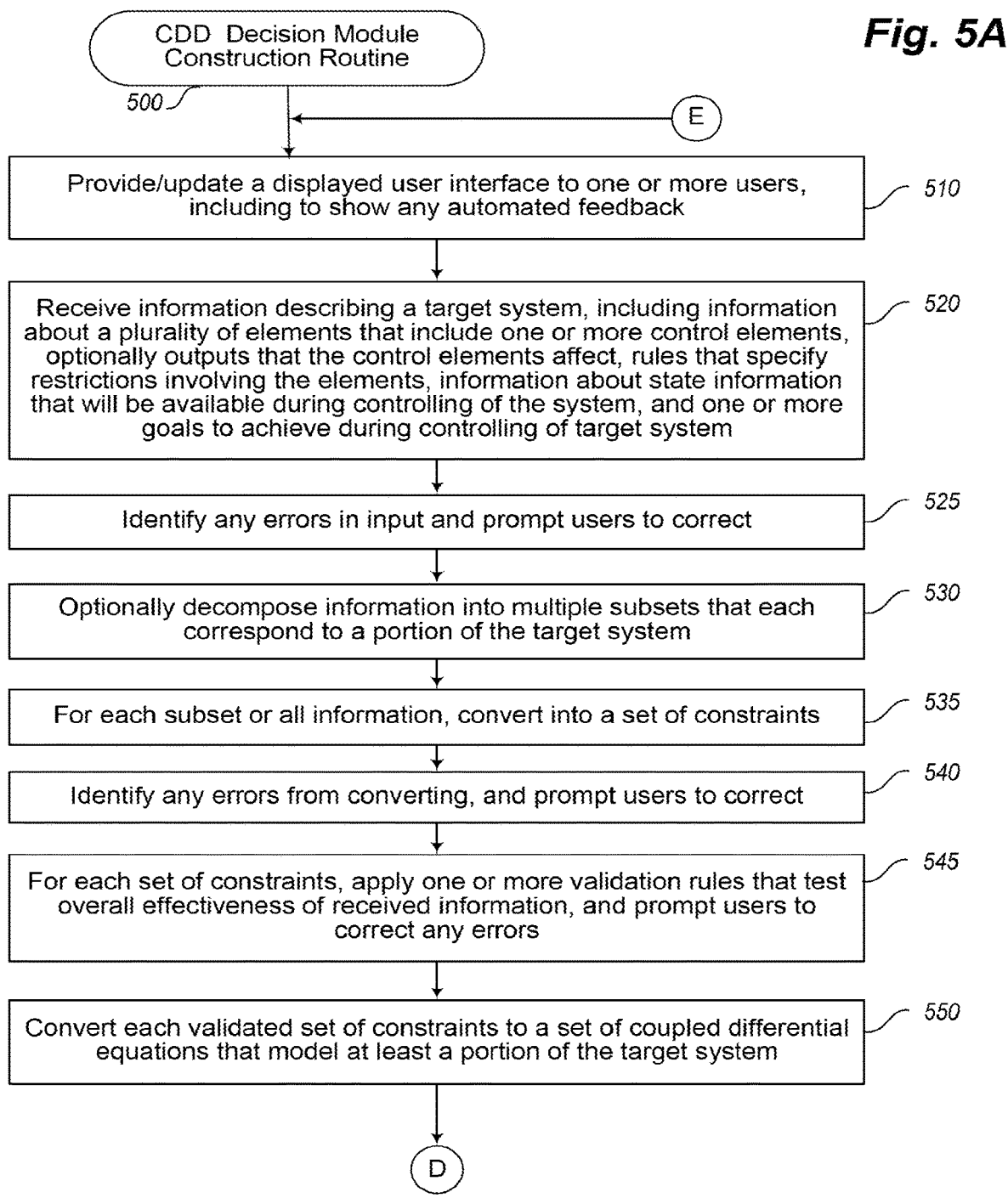
FIGS. 5A-5B illustrate a flow diagram of an example embodiment of a CDD Decision Module Construction routine.
Figure 5B:
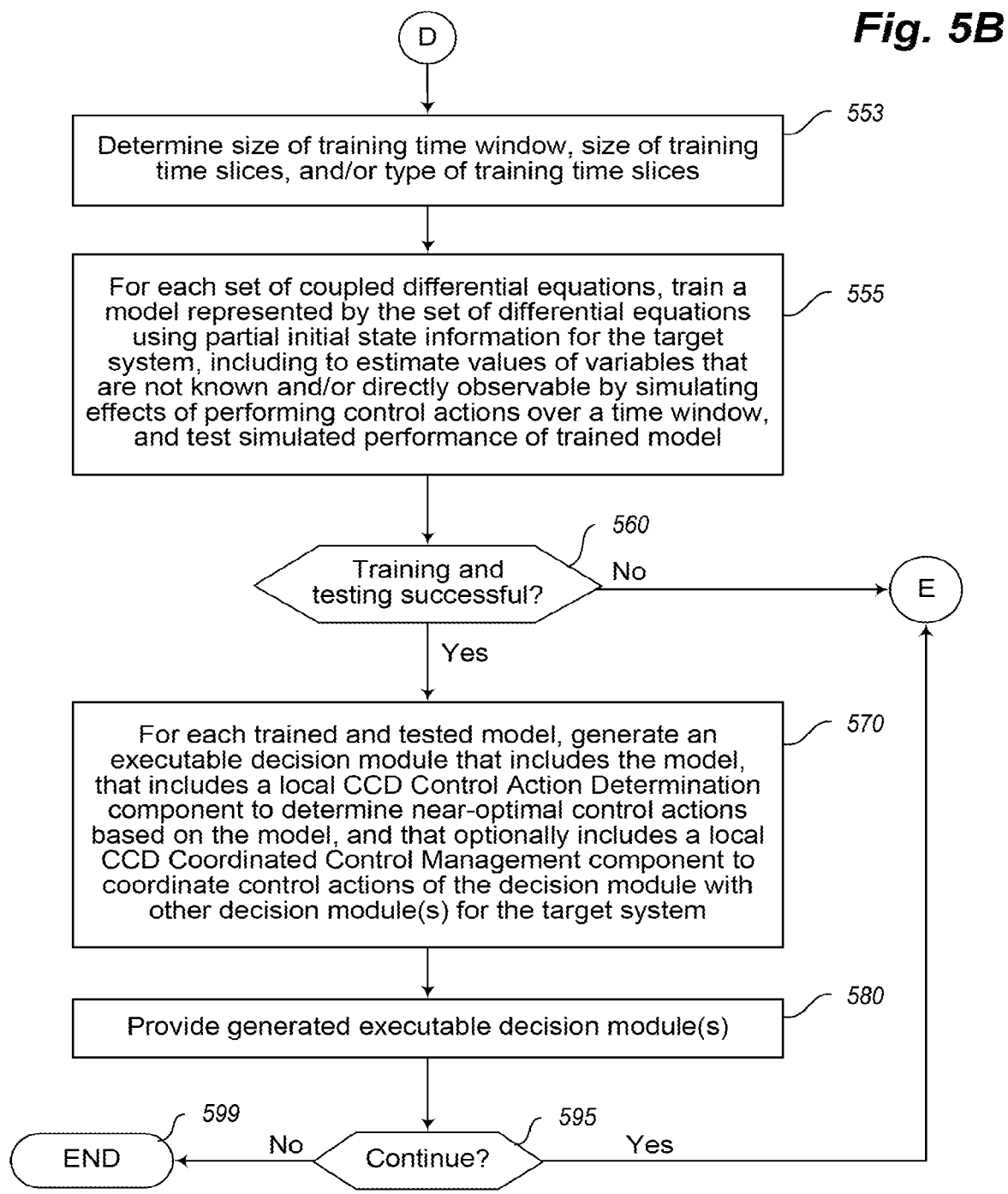

FIGS. 5A-5B illustrate a flow diagram of an example embodiment of a CDD Decision Module Construction routine 500. The routine may, for example, be provided by execution of the component 342 of FIG. 3 and/or the component 142 of FIG. 1, such as to provide functionality to allow users to provide information describing a target system of interest, and to perform corresponding automated operations to construct one or more decision modules to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use, such as by implementing an online interface that is available to a variety of remote users over a public network such as the Internet, while in other embodiments a copy of the CDD system and/or particular CDD components may be used to support a single organization or other group of one or more users, such as by being executed on computing systems under the control of the organization or group. In addition, the CDD Decision Module Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

The illustrated embodiment of the routine 500 begins at block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 520 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system.

After block 520, the routine continues to block 525 to identify any errors that have been received in the user input, and to prompt the user(s) to correct those errors, such as by updating the display in a corresponding manner as discussed with respect to block 510. While the identification of such errors is illustrated as occurring after the receiving of the information in block 520, it will be appreciated that some or all such errors may instead be identified as the users are inputting information into the user interface, such as to identify syntax errors in rules or other information that the users specify. After block 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different subgroups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 525 and 510. While not illustrated in this example, the routine may in some situations in blocks 525 and/or 540 return to block 510 when such errors are identified, to display corresponding feedback to the user(s) and to allow the user(s) to make corrections and re-perform following operations such as those of blocks 520-540. The errors identified in the converting process in block 540 may include, for example, errors related to inconsistent restrictions, such as if the restrictions as a group are impossible to satisfy.

After block 540, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 525, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or pre-specified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information for the target system, including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not returns to block 510 to display corresponding feedback information to the users to allow them to correct errors that caused the lack of success. If it is instead determined in block 560 that the testing and training were successful, however, the routine continues instead to block 570 to generate an executable decision module for each trained and tested model that includes that model, as well as a local CCD Control Action Determination component that the decision module will use when executed to determine optimal or near-optimal control actions to perform for the target system based on the information included in the model, and in light of the one or more goals for that decision module. The generated executable decision module may in some embodiments and situations further include a local CCD Coordinated Control Management component to coordinate control actions of multiple decision modules that collectively will provide an automated control system for the target system, such as by synchronizing respective models of the various decision modules over time. After block 570, the routine continues to block 580 to provide the generated executable decision modules for use, including to optionally store them for later execution and/or deployment.

After block 580, the routine continues to block 595 to determine whether to continue, such as until an explicit indication to terminate is received. If it is determined to continue, the routine returns to block 510, and otherwise continues to block 599 and ends.

Figure 6A:
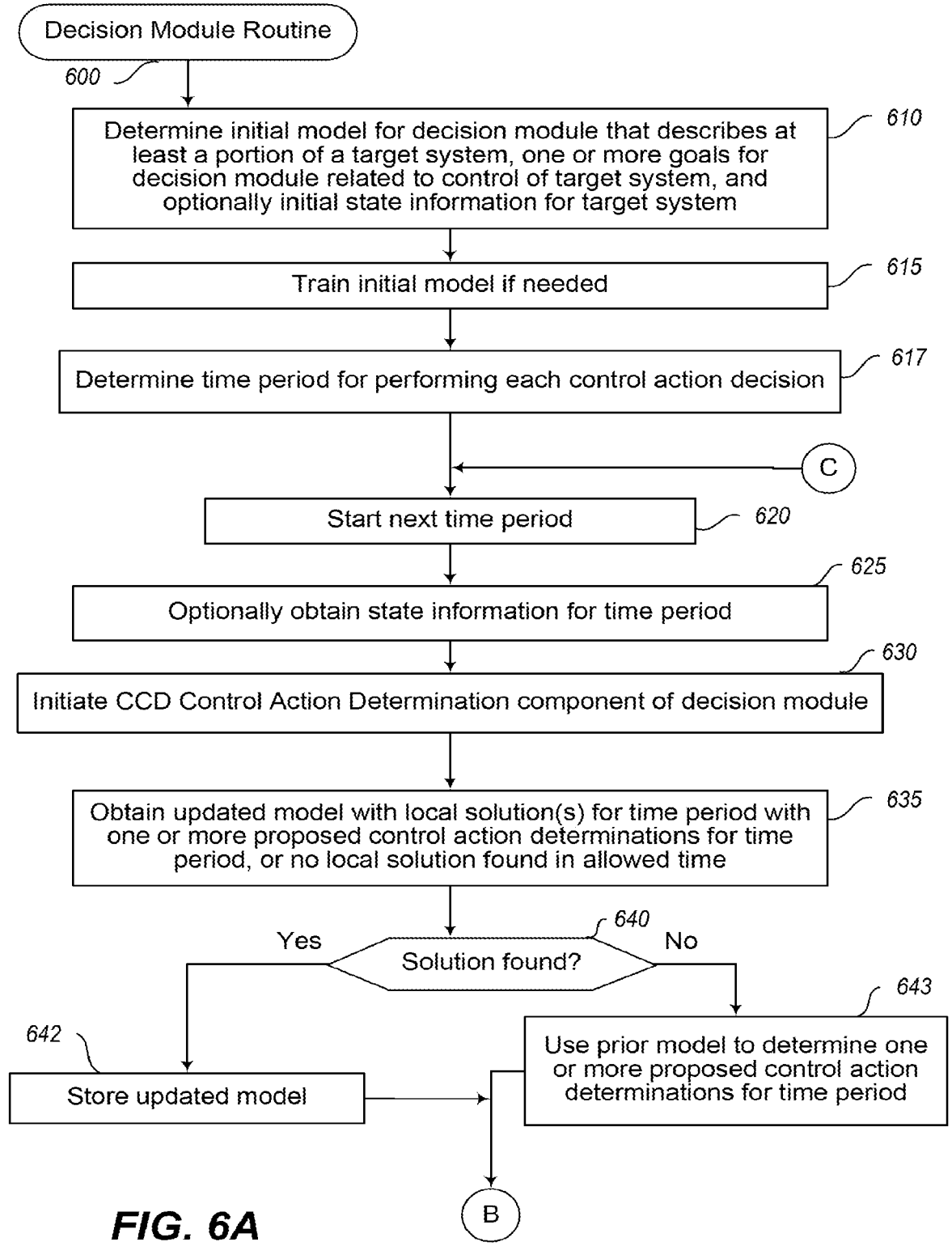
FIGS. 6A-6B illustrate a flow diagram of an example embodiment of a decision module routine.
Figure 6B:
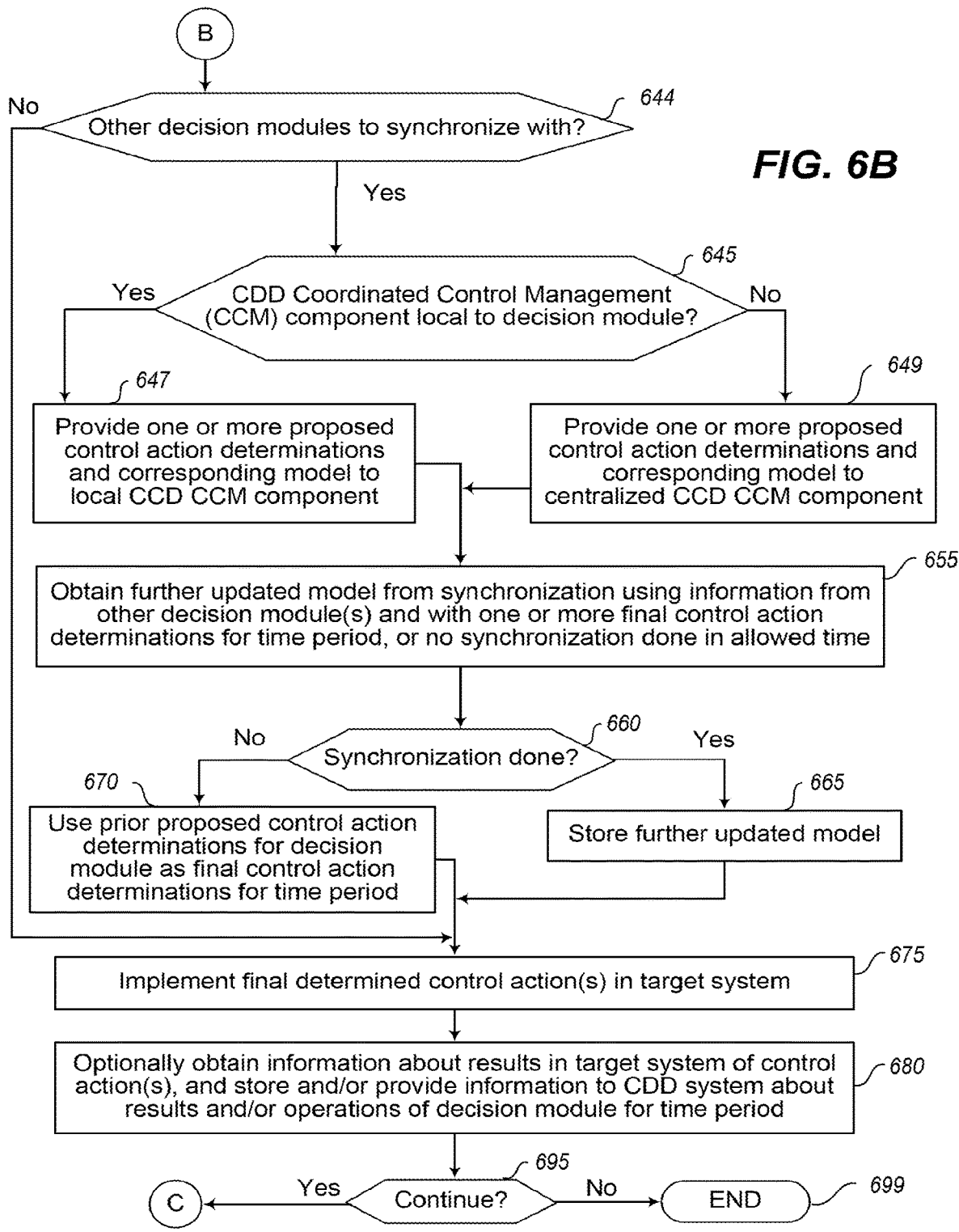

FIGS. 6A-6B illustrate a flow diagram of an example embodiment of a routine 600 corresponding to a generic representation of a decision module that is being executed. The routine may, for example, be provided by execution of a decision module 329 or as part of an automated control system 325 of FIG. 3 and/or a decision module 124 or 128 of FIG. 1 or 2, such as to provide functionality for controlling at least a portion of a target system in a manner specific to information and a model encoded for the decision module, including to reflect one or more goals to be achieved by the decision module during its controlling activities. As discussed in greater detail elsewhere, in some embodiments and situations, multiple decision modules may collectively and cooperatively act to control a particular target system, such as with each decision module controlling one or more distinct control elements for the target system or otherwise representing or interacting with a portion of the target system, while in other embodiments and situations a single decision module may act alone to control a target system. The routine 600 further reflects actions performed by a particular example decision module when it is deployed in controlling a portion of a target system, although execution of at least portions of a decision module may occur at other times, such as initially to train a model for the decision module before the decision module is deployed, as discussed in greater detail with respect to the CDD Decision Module Construction routine 500 of FIGS. 5A-5B.

The illustrated embodiment of the routine 600 begins at block 610, where an initial model for the decision module is determined that describes at least a portion of a target system to be controlled, one or more goals for the decision module to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5B—in some embodiments and situations, such training for block 615 is performed only if initial training is not done by the routine 500 of FIGS. 5A-5B, while in other embodiments and situations the training of block 615 is performed to capture information about a current state of the target system at a time that the decision module begins to execute (e.g., if not immediately deployed after initial creation and training) and/or to re-train the model at times as discussed in greater detail with respect to routine 700 of FIGS. 7A-7B as initiated by block 630.

After block 615, the routine continues to block 617 to determine a time period to use for performing each control action decision for the decision module, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the decision module. Blocks 620-680 are then performed in a loop for each such time period going forward until execution of the decision module is suspended or terminated, although in other embodiments a particular decision module may execute for only a single time period each time that it is executed.

In block 625, the routine optionally obtains state information for the time period, such as current state information that has been received for the target system or one or more related external sources since the last time period began, and/or by actively retrieving current values of one or more elements of the target system or corresponding variables as needed. In block 630, the routine then initiates execution of a local CCD Control Action Determination component of the decision module, with one example of such a routine discussed in greater detail with respect to routine 700 of FIGS. 7A-7B. In block 635, the results of the execution of the component in block 630 are received, including to either obtain an updated model for the decision module with a local solution for the current time period and decision module that includes one or more proposed control action determinations that the decision module may perform for the current time period, or to receive an indication that no local solution was found for the decision module in the allowed time for the execution of the component in block 630. It is then determined in block 640 whether a solution was found, and if so continues to block 642 to store the updated model for the decision module, and otherwise continues to block 643 to use the prior model for the decision module to determine one or more control action determinations that are proposed for the current time period based on a previous model (e.g., that does not reflect recent changes in state information and/or recent changes in activities of other decision modules, if any), as discussed in greater detail with respect to routine 700 of FIGS. 7A-7B.

After blocks 642 or 643, the routine continues to block 644 to determine if other decision modules are collectively controlling portions of the current target system, such as part of the same automated control system as the local decision module, and if so continues to block 645. Otherwise, the routine selects the local proposed control actions of the decision module as a final determined control action to perform, and continues to block 675 to implement those control actions for the current time period.

If there are other operating decision modules, the routine in block 645 determines if the local decision module includes a local copy of a CDD Coordinated Control Management (CCM) component for use in synchronizing the proposed control action determinations for the decision module's local solutions with activities of other decision modules that are collectively controlling the same target system. If so, the routine continues to block 647 to provide the one or more proposed control action determinations of the decision module and the corresponding current local model for the decision module to the local CDD CCM component, and otherwise continues to block 649 to provide the one or more proposed control action determinations for the decision module and the corresponding local model of the decision module to one or more centralized CDD CCM components.

After blocks 647 or 649, the routine continues to block 655 to obtain results of the actions of the CDD CCM component(s) in blocks 647 or 649, including to either obtain a further updated model resulting from synchronization of the local model for the current decision module with information from one or more other decision modules, such that the further updated model indicates one or more final control action determinations to perform for the time period for the current decision module, or an indication that no such synchronization was completed in the allowed time. The routine continues to block 660 to determine whether the synchronization was completed, and if so continues to block 665 to store the further updated model from the synchronization, and otherwise continues to block 670 to use the prior proposed control action determinations locally to the decision module as the final control action determinations for the time period.

After blocks 665 or 670, the routine continues to block 675 to implement the one or more final determined control actions for the decision module in the target system, such as by interacting with one or more effectuators in the target system that modify values or otherwise manipulate one or more control elements of the target system, or by otherwise providing input to the target system to cause such modifications or other manipulations to occur. In block 680, the routine optionally obtains information about the results in the target system of the control actions performed, and stores and/or provides information to the CDD system about such obtained results and/or about the activities of the decision module for the current time period.

After block 680, the routine continues to block 695 to determine whether to continue, such as until an indication to terminate or suspend is received (e.g., to reflect an end to current operation of the target system or an end of use of the decision module to control at least a portion of the target system). If it is determined to continue, the routine returns to block 620 to start the next time period, and otherwise continues to block 699 and ends.

Figure 7A:
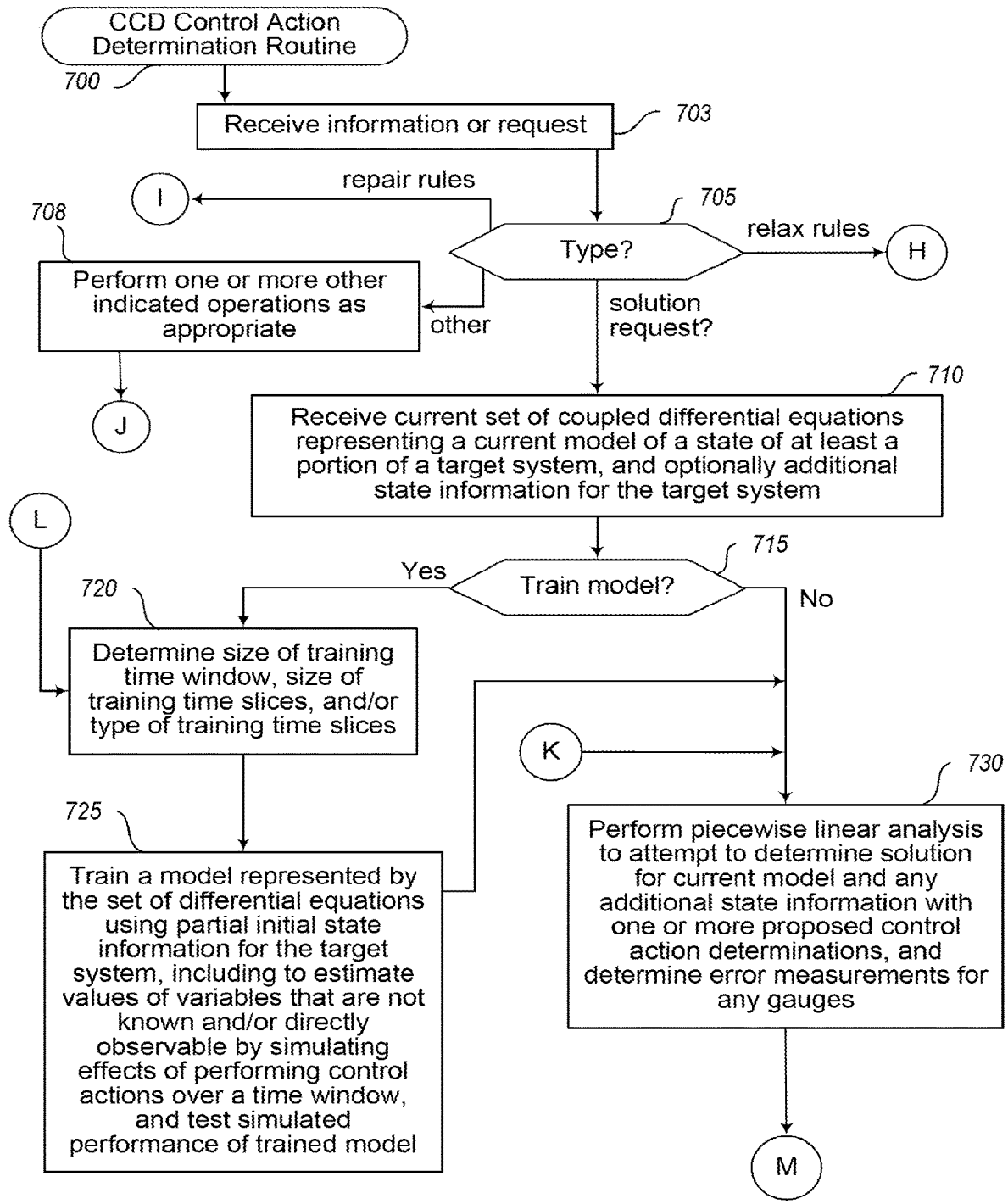
FIGS. 7A-7B illustrate a flow diagram of an example embodiment of a CDD Control Action Determination routine.
Figure 7B:
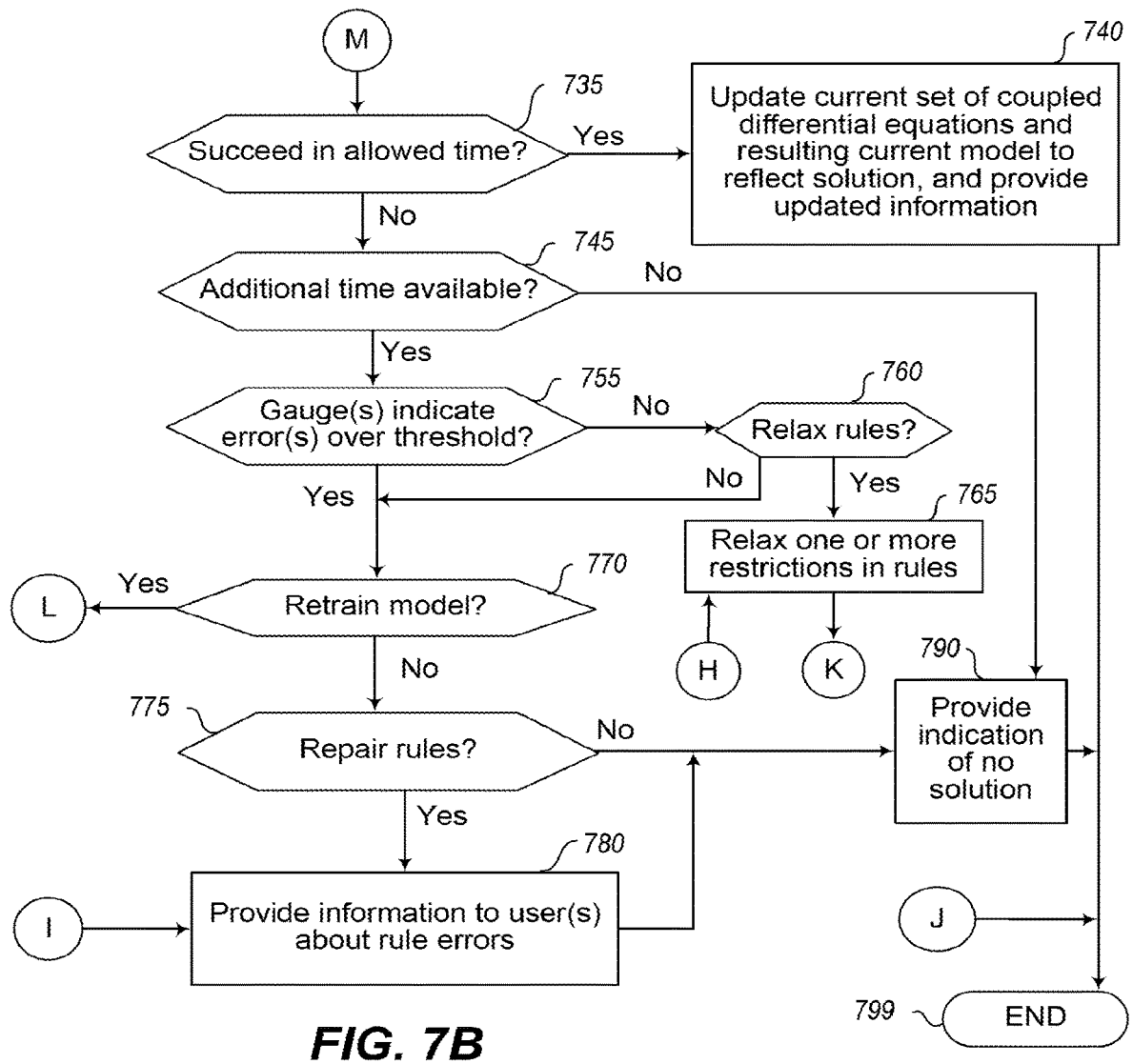

FIGS. 7A-7B are a flow diagram of a example embodiment of a CDD Control Action Determination routine 700. The routine may, for example, be provided by execution of the component 344 of FIG. 3 and/or components 144*a-n* or 244 of FIG. 2, such as to determine control actions for a decision module to propose and/or implement for a target system during a particular time period, including in some embodiments to perform an optimization to determine near-optimal actions (e.g., within a threshold of an optimal solution) to perform with respect to one or more goals if possible. While the illustrated embodiment of the routine is performed in a manner local to a particular decision module, such that some or all decision modules may each implement a local version of such a routine, in other embodiments the routine may be implemented in a centralized manner by one or more components with which one or more decision modules interact over one or more networks, such as with a particular decision module indicated to be used at a particular time rather than acting on behalf of the local decision module.

The illustrated embodiment of the routine 700 begins at block 703, where information or a request is received. The routine continues to block 705 to determine a type of the information or request, and to proceed accordingly. In particular, if a request is received in block 703 to attempt to determine a solution for a current time period given a current model of the local decision module, the routine continues to block 710 to begin to perform such activities, as discussed in greater detail with respect to block 710-790. If it is instead determined in block 705 that a request to relax one or more rules or other restrictions for the current model of the local decision module is received, such as discussed in greater detail with respect to blocks 760 and 765, the routine continues to block 765. If it is determined in block 705 that a request is received to repair one or more rules or other restrictions for the current model of the local decision module, such as discussed in greater detail with respect to blocks 775 and 780, the routine continues to block 780 to obtain user input to use during the rule repair process (e.g., to interact with a CDD Decision Module Construction component, or to instead interact with one or more users in another manner), such as to allow the current model for the local decision module to later be updated and replaced based on further resulting user actions, or if operation of the target system can be suspended, to optionally wait to further perform the routine 700 until such an updated model is received. If it is instead determined in block 705 that the information or request is of another type, the routine continues instead to block 708 to perform one or more other indicated operations as appropriate, and to then proceed to block 799. Such other indicated operations may include, for example, receiving information about current models and/or control actions proposed or performed by one or more other decision modules that are collectively controlling a target system with the local decision module (such as for use in synchronizing the model of the local decision module with such other decision modules by generating a consensus or converged shared model, as discussed in greater detail with respect to routine 800 of FIGS. 8A-8B), to receive updates to a model or underlying information for the model for use in ongoing operation of the routine 700 (e.g., from a CDD Decision Module Construction component, such as results from interactions performed in block 780), to receive current state information for the target system, such as for use as discussed in routine 600 of FIGS. 6A-6B, etc.

If it determined in block 705 that a request for a solution was received in block 703 for a current time period and based on a current model of the local decision module, the routine continues to block 710 to receive a current set of coupled differential equations that represent the current model for the local decision module of at least a portion of the target system, optionally along with additional state information for the target system for the current time. The routine then continues to block 715 to determine whether to train or re-train the model, such as if the routine is called for a first time upon initial execution of a corresponding decision module or if error measurements from ongoing operations indicate a need for re-training, as discussed in greater detail with respect to blocks 755, 770 and 730. If it is determined to train or re-train the model, the routine continues to block 720 to determine one or more of the size of a training time window, size of training time slices within the time window, and/or type of training time slices within the training time window, such as in a manner similar to that previously discussed with respect to block 553 of routine 500 of FIGS. 5A-5B. After block 720, the routine continues to block 725 to use partial initial state information for the target system to train the model, including to estimate values of state variables for the target system that are not known and/or directly observable, by simulating effects of performing control actions over the time window for each of the time slices, as discussed in greater detail with respect to block 555 of routine 500 of FIGS. 5A-5B.

After block 725, or if it is instead determined in block 715 not to train or re-train the model, the routine continues to block 730 to perform a piecewise linear analysis to attempt to determine a solution for the current model and any additional state information that was obtained in block 710, with the solution (if determined) including one or more proposed control action determinations for the local decision module to take for a current time period, as well as in some embodiments to use one or more model error gauges to make one or more error measurements with respect to the current model, as discussed in greater detail elsewhere. The routine then continues to block 735 to determine if the operations in block 730 determined a solution within a amount of time allowed for the operation of block 730 (e.g., a defined subset or fraction of the current time period), and if so continues to block 740 to update the current set of coupled differential equations and the resulting current model for the local decision module to reflect the solution, with the resulting updated information provided as an output of the routine 700.

If it is instead determined in block 735 that the operations in block 730 did not determine a solution, the routine continues to block 745 to determine if additional time is available within the current time period for further attempts to determine a solution, and if not continues to block 790 to provide output of the routine 700 indicating that no solution was determined for the current time period.

If additional time is available within the current time period, however, the routine continues to perform blocks 755-780 to perform one or more further attempts to identify the solution—it will be appreciated that one or more of the operations of blocks 755-780 may be repeatedly performed multiple times for a given time period if sufficient time is available to continue further solution determination attempts. In particular, the routine continues to block 755 if additional time is determined to be available in block 745, where it determines whether the measurements from one or more gauges indicate model error measurements that are over one or more thresholds indicating modifications to the model are needed, such as based on the model error measurements from the gauges discussed with respect to block 730. If not, the routine continues to block 760 to determine whether there are one or more rules or other restrictions in the current model that are available to be relaxed for the current time period (that have not previously attempted to be relaxed during the time period, if this is not the first pass through this portion of the routing for the current time period), and if so continues to block 765 to relax one or more such rules or other restrictions and to return to block 730 to re-attempt the piecewise linear analysis with the revised model based on those relaxed rules or other restrictions.

If it is instead determined in block 755 that the model error measurements from one or more of the gauges are sufficient to satisfy one or more corresponding thresholds, the routine continues instead to block 770 to determine whether to re-train the model based on one or more of the gauges indicating sufficient errors to do so, such as based on accumulated errors over one or more time periods of updates to the model. If so, the routine returns to block 720 to perform such re-training in blocks 720 and 725, and then continues to block 730 to re-attempt the piecewise linear analysis with the resulting re-trained model.

If it is instead determined in block 770 not to re-train the model (or if the model was re-trained already for the current time period and the resulting re-attempt in block 730 again failed to find a solution), the routine continues to block 775 to determine whether the model error measurements from one or more of the gauges indicate a subset of one or more rules or other restrictions in the model that potentially have errors that need to be repaired. If so, the routine continues to block 780 to provide information to one or more users via the CDD Decision Module Construction component, to allow the users to revise the rules or other restrictions as appropriate, although in other embodiments some or all such rule repair activities may instead be attempted or performed in an automated manner. After block 780, or if it is instead determined in block 775 not to repair any rules, the routine continues to block 790 to provide an indication that no solution was determined for the current time period. After blocks 740, 708, or 790, the routine continues to block 799 and ends. It will be appreciated that if the routine 700 was instead implemented as a centralized routine that supports one or more decision modules remote from the executing component for the routine, the routine 700 may instead return to block 703 to await further information or requests.

Figure 8A:
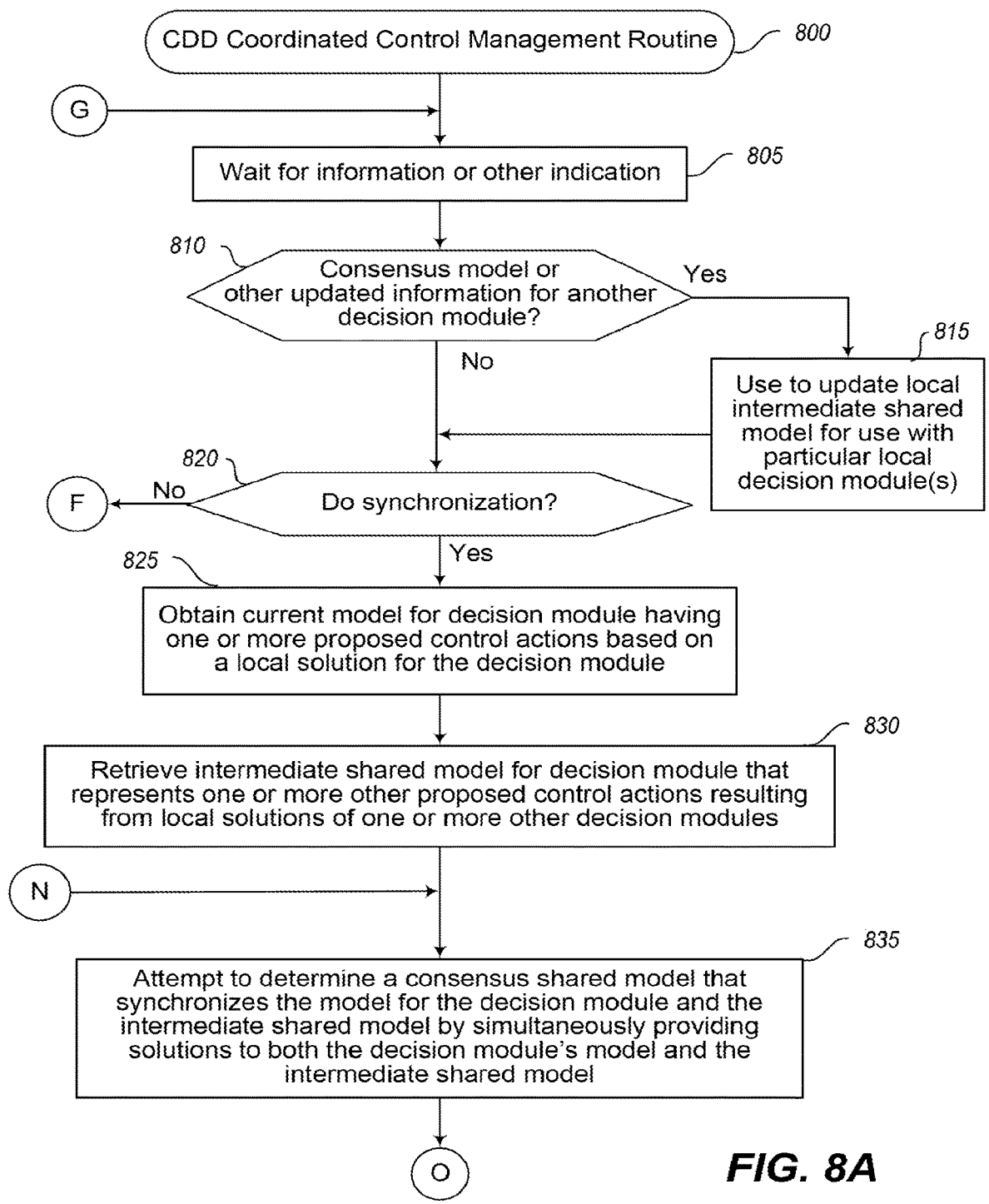
FIGS. 8A-8B illustrate a flow diagram of an example embodiment of a CDD Coordinated Control Management routine.
Figure 8B:
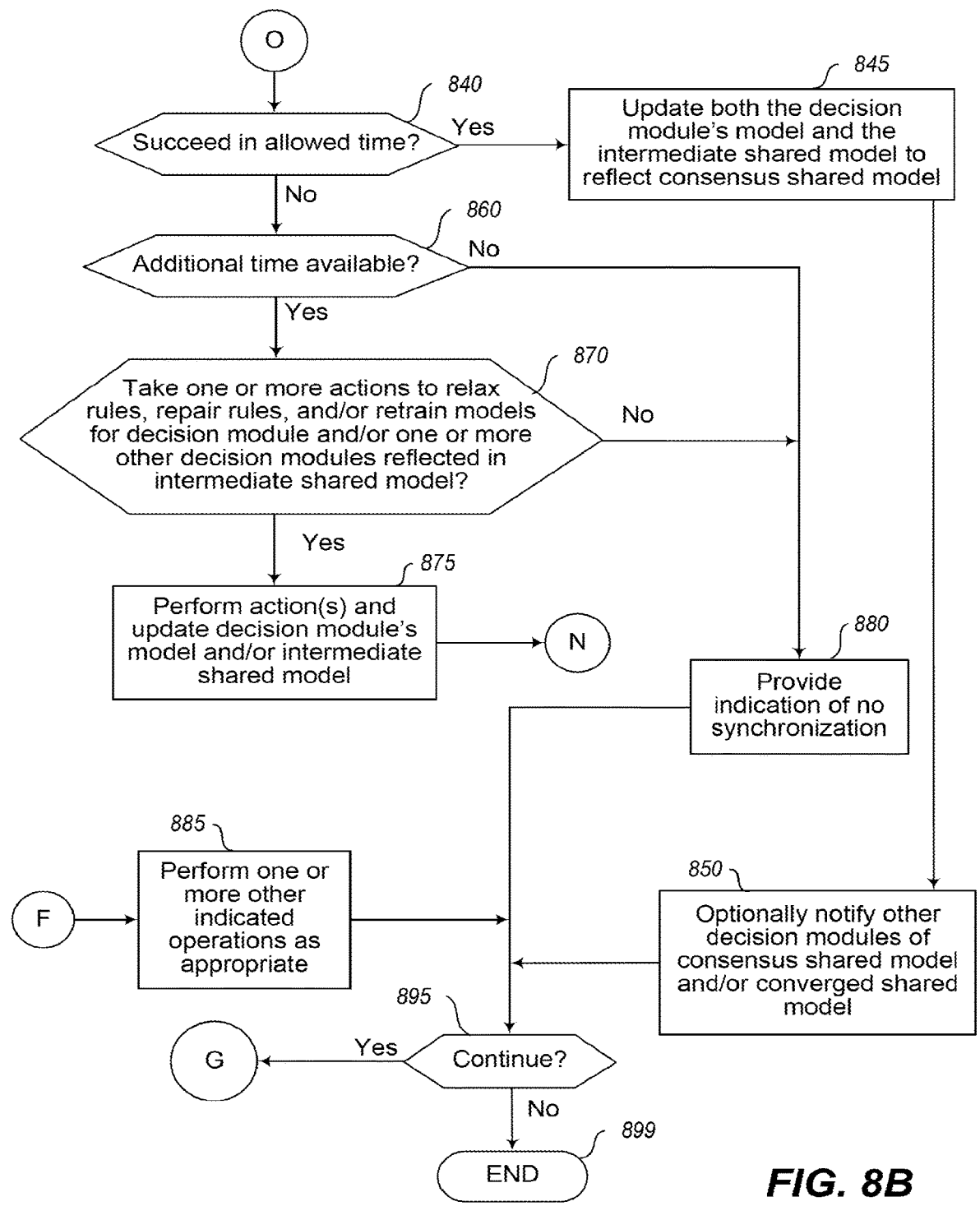

FIGS. 8A-8B are a flow diagram of an example embodiment of a CDD Coordinated Control Management routine 800. The routine may, for example, be provided by execution of the component 346 of FIG. 3 and/or the components 146a-n of FIG. 2, such as to attempt to synchronize current models and their proposed control actions between multiple decision modules that are collectively controlling a target system. In the illustrated embodiment of the routine, the synchronization is performed in a pairwise manner between a particular local decision module's local current model and an intermediate shared model for that decision module that is based on information about the current state of one or more other decision modules, by using a Pareto game technique to determine a Pareto equilibrium if possible that is represented in a consensus shared model, although in other embodiments other types of synchronization methods may be used. In addition, in the illustrated embodiment, the routine 800 is performed in a local manner for a particular local decision module, such as by being included within that local decision module, although in other embodiments the routine 800 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module.

The illustrated embodiment of the routine 800 begins at block 805, where it waits to receive information or another indication. The routine continues to block 810 to determine if a consensus model or other updated information for another decision module has been received, such as from a copy of the routine 800 executing for that other decision module, and if so continues to block 815 to use the received information to update local intermediate shared model information for use with the local decision module on whose behalf the current copy of the routine 800 is executing, as discussed in greater detail with respect to block 830. If it is instead determined in block 810 that the information or request received in block 805 is not information related to one or more other decision modules, or after block 815, the routine continues to block 820 to determine whether to currently perform a synchronization for the current local model of the local decision module by using information about an intermediate shared model of the local decision module that includes information for one or more other decision modules, such as to do such synchronization each time that an update to the local decision module's model is received (e.g., based on operation of the routine 700 for a copy of the CDD Control Action Determination component local to that decision module) in block 805 and/or each time that information to update the local decision module's intermediate shared model is received in block 805 and used in block 815, or instead as explicitly indicated in block 805—if the synchronization is to currently be performed, the routine continues to block 825 and begins to perform blocks 820-880 related to such synchronization activities. Otherwise, the routine continues to block 885 to perform one or more other indicated operations as appropriate, such as to receive requests from the CDD system or other requestor for current information about operation of the routine 800 and/or to provide corresponding information to one or more entities (e.g., to reflect prior requests), etc.

If it is determined in block 820 that synchronization is to be currently performed, such as based on updated model-related information that is received in block 805, the routine continues to block 825 to obtain a current local model for the local decision module to use in the synchronizing, with the model including one or more proposed control actions to perform for a current time period based on a local solution for the local decision module. The routine then continues to block 830 to retrieve information for an intermediate shared model of the local decision module that represents information for one or more other decision modules (e.g., all other decision modules) that are collectively participating in controlling the target system, with that intermediate shared model similarly representing one or more other proposed control actions resulting from local solutions of those one or more other decision modules, optionally after partial or complete synchronization has been performed for those one or more other decision modules between themselves.

The routine then continues to block 835 to attempt to determine a consensus shared model that synchronizes the current model of the local decision module and the intermediate shared model by simultaneously providing solutions to both the local decision module's current model and the intermediate shared model. In some embodiments, the operations of block 835 are performed in a manner similar to that discussed with respect to blocks 710-730 of routine 700 of FIG. 7A-7B, such as if the local model and the intermediate shared model are combined to create a combination model for whom one or more solutions are to be identified. As discussed in greater detail elsewhere, in some embodiments, the local current model and intermediate shared model may each be represented by a Hamiltonian function to enable a straightforward creation of such a combined model in an additive manner for the respective Hamiltonian functions, with the operations of routines 600 and/or 700 of FIGS. 6A-6B and 7A-7B, respectively, similarly representing the models that they update and otherwise manipulate using such Hamiltonian functions.

After block 835, the routine continues to block 840 to determine whether the operations of block 835 succeeded in an allowed amount of time, such as a fraction or other portion of the current time period for which the synchronization is attempted to be performed, and if so the routine continues to block 845 to update both the local model and the intermediate shared model of the local decision module to reflect the consensus shared model. As earlier noted, if sufficient time is allowed for each decision module to repeatedly determine a consensus shared model with changing intermediate shared models representing one or more other decision modules of a collective group, the decision modules of the collective group may eventually converge on a single converged shared model, although in other embodiments and situations there may not be sufficient time for such convergence to occur, or other issues may prevent such convergence. After block 845, the routine continues to block 850 to optionally notify other decision modules of the consensus shared model determined for the local decision module (and/or of a converged shared model, if the operations of 835 were a last step in creating such a converged shared model), such as if each of the notified decision modules is implementing its own local version of the routine 800 and the provided information will be used as part of an intermediate shared model of those other decision modules that includes information from the current local decision module's newly constructed consensus shared model.

If it is instead determined in block 840 that a synchronization did not occur in the allowed time, the routine continues to perform blocks 860-875 to re-attempt the synchronization with one or more modifications, sometimes repeatedly if sufficient time is available, and in a manner similar to that discussed with respect to blocks 745-780 of routine 700 of FIGS. 7A-7B. In the illustrated example, the routine determines in block 860 if additional time is available for one or more such re-attempts at synchronization, and if not the routine continues to block 880 to provide an indication that no synchronization was performed within the allowed time. Otherwise, the routine continues to block 870 to take one or more actions to perform one or more of relaxing rules or other restrictions, repairing rules or other restrictions, and/or re-training a model, with respect to one or both of the current model of the local decision module and/or one or more other decision modules whose information is represented in the intermediate shared model of the local decision module. If it is determined in block 870 to proceed in this manner, the routine continues to block 875 to perform corresponding actions, sometimes one at a time in a manner similar to that discussed with respect to routine 700, including to cause resulting updates to the current model of the local decision module and/or to the local intermediate shared model of the local decision module, after which the routine returns to block 835 to re-attempt to synchronize the local model and the intermediate shared model of the local decision module.

If it is instead determined in block 870 that no further actions are to be performed with respect to relaxation, repair and/or re-training, the routine continues instead to block 880. After blocks 850, 880 or 885, the routine continues to block 895 to determine whether to continue, such as until an explicit indication to terminate or suspend operation of the routine 800 is received, such as to reflect an end to operation of the target system and/or an end to use of the local decision module and/or a collective group of multiple decision modules to control the target system. If it is determined to continue, the routine returns to block 805, and otherwise continues to block 899 and ends.

Figure 9:
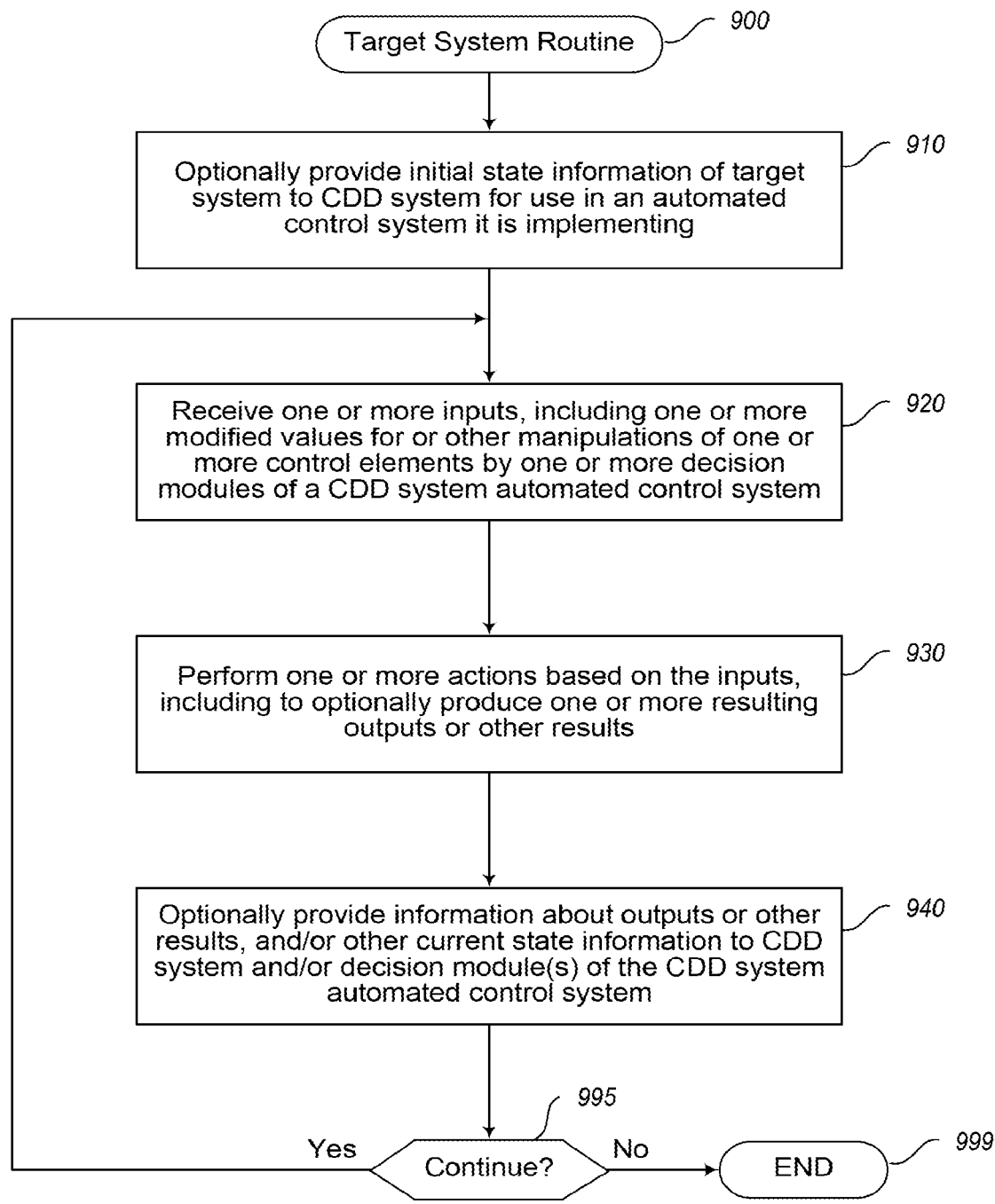
FIG. 9 illustrates a flow diagram of an example embodiment of a routine for a target system being controlled.

FIG. 9 illustrates a flow diagram of an example embodiment of a routine 900 performed for a representative generic target system, with respect to interactions between the target system and one or more decision modules that are controlling at least a portion of the target system. The routine may, for example, be provided by execution of a target system 360 and/or 370 of FIG. 3, and/or a target system 160 and/or 170 of FIGS. 1 and 2, such as to implement operations specific to the target system. It will be appreciated that the illustrated embodiment of the routine focuses on interactions of the target system with the one or more decision modules, and that many or all such target systems will perform many other operations in a manner specific to those target systems that are not illustrated here for the purpose of brevity.

The routine begins at block 910, where it optionally provides initial state information for the target system to a CDD system for use in an automated control system of the CDD system for the target system, such as in response to a request from the CDD system or its automated control system for the target system, or instead based on configuration specific to the target system (e.g., to be performed upon startup of the target system). After block 910, the routine continues to block 920 to receive one or more inputs from a collective group of one or more decision modules that implement the automated control system for the target system, including one or more modified values for or other manipulations of one or more control elements of a plurality of elements of the target system that are performed by one or more such decision modules of the automated control system. As discussed in greater detail elsewhere, the blocks 920, 930, 940 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, etc.).

After block 920, the routine continues to block 930 to perform one or more actions in the target system based on the inputs received, including to optionally produce one or more resulting outputs or other results within the target system based on the manipulations of the control elements. In block 940, the routine then optionally provides information about the outputs or other results within the target system and/or provides other current state information for the target system to the automated control system of the CDD system and/or to particular decision modules of the automated control system. The routine then continues to block 995 to determine whether to continue, such as until an explicit indication to terminate or suspend operation of the target system is received. If it is determined to continue, the routine returns to block 920 to begin a next set of control actions for a next time period, and otherwise continues to block 999 and ends. As discussed in greater detail elsewhere, state information that is provided to a particular decision module may include requests from external systems to the target system, which the automated control system and its decision modules may determine how to respond to in one or more manners.

Non-exclusive example embodiments described herein are further discussed in the following clauses.

1. A computer-implemented method comprising:

receiving, by an automated control system implemented at least in part by one or more computing systems, information for use in controlling electrical power being output by a battery via electrical direct current (DC) supplied by the battery, wherein the received information includes a model based on multiple rules that each has one or more conditions to evaluate and that specify restrictions involving manipulating a DC-to-DC amplifier connected to the battery in a manner to achieve one or more defined goals including maintaining an internal state of the battery in a defined range during the controlling of the electrical power being output; and controlling, by the automated control system and based on the received information, the electrical power being output by the battery, including:

obtaining, by the automated control system and at one or more times, sensor information identifying current values for one or more attributes of the battery at the one or more times, and information about one or more electrical loads to be satisfied at the one or more times;

generating, by the automated control system and based at least in part on the obtained sensor information, one or more estimates of the internal state of the battery for the one or more times;

determining, by the automated control system, and based at least in part on the model and on the one or more estimates of the internal state of the battery and on the one or more electrical loads, one or more amounts of electrical power for the battery to supply at the one or more times to satisfy at least some of the one or more electrical loads while maintaining the internal state of the battery in the defined range during the one or more times; and implementing, by the automated control system and for each of the one or more determined amounts of electrical power, one or more settings of the DC-to-DC amplifier to cause electrical power being output to satisfy the determined amount of electrical power.

2. The computer-implemented method of clause 1 wherein the one or more times include a first time and a later second time, wherein the one or more electrical loads include a first electrical load at the first time and a second electrical load at the second time, wherein the determining of the one or more amounts of electrical power for the battery to supply at the one or more times includes determining to supply a first amount of electrical power at the first time that is less than the first electrical load and determining to supply a second amount of electrical power at the second time that satisfies the second electrical load, and wherein the implementing of the one or more settings of the DC-to-DC amplifier includes implementing at least one first setting of the DC-to-DC amplifier at the first time to cause the first amount of electrical power to be supplied at the first time, and implementing at least one second setting of the DC-to-DC amplifier at the second time to cause the second amount of electrical power to be supplied at the second time.

3. The computer-implemented method of clause 2 wherein the determining to supply the first amount of electrical power at the first time that is less than the first electrical load includes determining that supplying a larger amount of electrical power at the first time to satisfy the first electrical load is likely to cause the internal state of the battery to exceed the defined range.

4. The computer-implemented method of any of clauses 1-3 wherein the determining of the one or more amounts of electrical power for the battery to supply at the one or more times includes:

determining a first amount of electrical power at a first time that satisfies a first electrical load at the first time and that the battery is capable of supplying;

determining, based at least in part on one of the one or more estimates of the internal state of the battery that is for the first time, that the internal state of the battery exceeds the defined range; and determining, based at least in part on the determining that the internal state of the battery exceeds the defined range, a second amount of electrical power that is less than the first amount and is not sufficient to satisfy the first electrical load, and wherein the implementing of the one or more settings of the DC-to-DC amplifier includes implementing at least one first setting of the DC-to-DC amplifier at the first time to cause the second amount of electrical power to be supplied at the first time.

5. The computer-implemented method of any of clauses 1-4 wherein the DC-to-DC amplifier is a field-effect transistor (FET) amplifier, and wherein the implementing of the one or more settings of the DC-to-DC amplifier includes determining an amount of current to supply and applying a voltage to a gate of the FET amplifier to produce the determined amount of current.

6. The computer-implemented method of any of clauses 1-5 wherein the DC-to-DC amplifier is part of at least one of a buck converter or a boost converter, and wherein the implementing of the one or more settings of the DC-to-DC amplifier includes determining an amount of voltage to supply, and modifying the at least one of the buck converter or the boost converter to produce the determined amount of voltage.

7. The computer-implemented method of any of clauses 1-6 wherein the obtained sensor information identifies current values for electrical current, voltage and one or more temperatures associated with the battery, and wherein the generating of the one or more estimates of the internal state of the battery includes using a defined battery temperature model to estimate an additional internal temperature of the battery based at least in part on the current values.

8. The computer-implemented method of any of clauses 1-7 wherein the obtained sensor information identifies a current value for at least one of electrical current, voltage or a temperature associated with the battery, and wherein the generating of the one or more estimates of the internal state of the battery includes estimating at least one of an additional internal temperature of the battery or an internal chemical reaction state for the battery.

9. The computer-implemented method of any of clauses 1-8 wherein the obtained sensor information identifies a current value for at least one of electrical current, voltage or a temperature associated with the battery, wherein the generating of the one or more estimates of the internal state of the battery includes estimating at least one internal temperature of the battery, and wherein the defined range includes a range of internal temperatures of the battery at which the battery operates without causing premature damage.

10. The computer-implemented method of any of clauses 1-9 wherein the battery is part of a system having one or more electrically powered devices, and wherein the obtained information about the one or more electrical loads includes an amount of electrical demand from the one or more electrically powered devices.

11. The computer-implemented method of any of clauses 1-10 wherein the battery is connected to an electrical grid, and wherein the obtained information about the one or more electrical loads includes requests from an operator of the electrical grid for electrical power to be supplied from the battery.

12. The computer-implemented method of any of clauses 1-11 wherein the model further includes one or more rules that specify restrictions involving manipulating the DC-to-DC amplifier connected to the battery to maintain the internal state of the battery in the defined range during controlling of electrical power being supplied to the battery for charging, and wherein the method further comprises controlling, by the automated control system, the electrical power being supplied to the battery for charging, including:

obtaining, by the automated control system and at one or more additional times, additional sensor information identifying current values for one or more attributes of the battery at the one or more additional times, and information about one or more electrical supply amounts to be provided to the battery at the one or more additional times;

generating, by the automated control system and based at least in part on the obtained additional sensor information, one or more additional estimates of the internal state of the battery for the one or more additional times;

determining, by the automated control system, and based at least in part on the model and on the one or more additional estimates of the internal state of the battery and on the one or more electrical supply amounts, one or more additional amounts of electrical power for the battery to receive at the one or more additional times to accept at least some of the one or more electrical supply amounts while maintaining the internal state of the battery in the defined range during the one or more additional times; and implementing, by the automated control system and for each of the one or more determined additional amounts of electrical power, one or more settings of the DC-to-DC amplifier to cause electrical power being supplied to the battery to satisfy the determined additional amount of electrical power.

13. The computer-implemented method of clause 12 wherein the battery is part of a system having a solar power generator, and wherein the obtained information about the one or more electrical supply amounts to be provided to the battery includes an amount of electrical supply available from the solar power generator.

14. The computer-implemented method of any of clauses 1-13 wherein the model included in the received information is configured for a battery type of the battery, and wherein the method further comprises adapting the model to information specific to the battery by, during an initial training period before the controlling of the electrical power being output, monitoring changes in values of the one or more attributes of the battery and changes in electrical loads being supplied by the battery, and modifying the model to correspond to the monitored changes in values and the monitored changes in electrical loads.

15. The computer-implemented method of any of clauses 1-14 wherein the controlling of the electrical power being output further includes adapting the model included in the received information to additional information specific to the battery by monitoring changes over time in values of the one or more attributes of the battery that are based at least in part on increasing impedance of the battery, and modifying the model to correspond to the monitored changes, and wherein at least one amount of electrical power for the battery to supply that is determined and is caused to be output by the implementing is based at least in part on the modified model.

16. The computer-implemented method of any of clauses 1-15 wherein the automated controller system includes a battery controller component connectively coupled to the batter and further includes a control action determination component that is executing remotely from the battery on at least one of the one or more computing systems and that communicates with the battery controller component over one or more computer networks, wherein the control action determination component performs at least the determining of the one or more amounts of electrical power and further performs sending instructions over the one or more computer networks to the battery controller component about the determined one or more amounts of electrical power, and wherein the battery controller component performs at least the implementing of the one or more settings of the DC-to-DC amplifier based at least in part on the sent instructions.

17. The computer-implemented method of clause 16 further comprising, controlling, by the battery controller component and at an additional time without receiving any instructions over the one or more computer networks from the control action determination component, the electrical power being output by the battery, including:

obtaining, by the battery controller component and at the additional time, additional sensor information identifying current values for the one or more attributes of the battery at the additional time;

generating, by the battery controller component and based at least in part on the obtained additional sensor information, an additional estimate of the internal state of the battery for the additional time;

determining, by the battery controller component, and based at least in part on the additional estimate of the internal state of the battery, an additional amount of electrical power for the battery to supply at the additional time to maintain the internal state of the battery in the defined range for the additional time; and implementing, by the battery controller component, one or more settings of the DC-to-DC amplifier to cause electrical power being output to satisfy the determined additional amount of electrical power.

18. The computer-implemented method of any of clauses 1-17 further comprising, controlling, by the automated control system and at an additional time without a current electrical load, the electrical power being output by the battery, including:

obtaining, by the automated control system and at the additional time, additional sensor information identifying current values for the one or more attributes of the battery at the additional time;

generating, by the automated control system and based at least in part on the obtained additional sensor information, an additional estimate of the internal state of the battery for the additional time;

determining, by the automated control system, and based at least in part on the model and on the additional estimate of the internal state of the battery, an additional amount of electrical power for the battery to supply at the additional time to maintain the internal state of the battery in the defined range for the additional time; and implementing, by the automated control system, one or more settings of the DC-to-DC amplifier to cause electrical power being output to satisfy the determined additional amount of electrical power.

19. The computer-implemented method of any of clauses 1-18 wherein the determining of the one or more amounts of electrical power for the battery to supply at the one or more times further includes retrieving information about at least one previous amount of electrical power that the battery supplied, and selecting the determined one or more amounts of electrical power to further control a rate of change in amount of electrical power that the battery supplies, as part of maintaining the internal state of the battery in the defined range during the one or more times.

20. The computer-implemented method of any of clauses 1-19 further comprising identifying at least one previous electrical load, determining one or more amounts of change in electrical load from the at least one previous electrical load to the one or more electrical loads, and further performing the selecting of the determined one or more amounts of electrical power based at least in part on the determined one or more amounts of change in electrical load.

21. The computer-implemented method of any of clauses 1-20 further comprising identifying at least one previous estimate of the internal state of the battery that is based at least in part on an internal impedance of the battery, determining one or more amounts of change in estimated internal impedance of the battery from the at least one previous estimate to the one or more estimates, and further performing the selecting of the determined one or more amounts of electrical power based at least in part on the determined one or more amounts of change in the estimated internal impedance of the battery.

22. The computer-implemented method of any of clauses 1-21 further comprising identifying at least one previous estimate of the internal state of the battery that is based at least in part on an internal temperature of the battery, determining one or more amounts of change in estimated internal temperature of the battery from the at least one previous estimate to the one or more estimates, and further performing the selecting of the determined one or more amounts of electrical power based at least in part on the determined one or more amounts of change in the estimated internal temperature of the battery.

23. A non-transitory computer-readable medium having stored software instructions that, when executed, cause one or more devices implementing at least part of an automated control system to perform the method of any of clauses 1-22.

24. A system comprising:

one or more hardware processors of one or more devices; and one or more memories storing instructions that, when executed by at least one of the one or more hardware processors, cause the system to perform the method of any of clauses 1-22.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
    receiving, by an automated control system implemented at least in part by one or more computing systems, information for use in controlling electrical power being output by a battery via electrical direct current (DC) supplied by the battery, wherein the received information includes a model based on multiple rules that each has one or more conditions to evaluate and that specify restrictions involving manipulating a DC-to-DC amplifier connected to the battery in a manner to achieve one or more defined goals including maintaining an internal state of the battery to include an internal temperature of the battery being in a defined range during the controlling of the electrical power being output, wherein the defined range includes a range of internal temperatures of the battery at which the battery operates without causing premature damage; and
    controlling, by the automated control system and based on the received information, the electrical power being output by the battery, including:
        obtaining, by the automated control system and at one or more times, sensor information identifying current values for one or more attributes of the battery at the one or more times, and information about one or more electrical loads to be satisfied at the one or more times;
        generating, by the automated control system and based at least in part on the obtained sensor information, one or more estimates of the internal state of the battery for the one or more times, including one or more estimates of the internal temperature of the battery for the one or more times;
        determining, by the automated control system, and based at least in part on the model and on the one or more estimates of the internal state of the battery and on the one or more electrical loads, one or more amounts of electrical power for the battery to supply at the one or more times to satisfy at least some of the one or more electrical loads while maintaining the internal temperature of the battery in the defined range during the one or more times; and
        implementing, by the automated control system and for each of the one or more determined amounts of electrical power, one or more settings of the DC-to-DC amplifier to cause electrical power being output to satisfy the determined amount of electrical power.

2. The computer-implemented method of claim 1 wherein the one or more times include a first time and a later second time,
    wherein the one or more electrical loads include a first electrical load at the first time and a second electrical load at the second time,
    wherein the determining of the one or more amounts of electrical power for the battery to supply at the one or more times includes determining to supply a first amount of electrical power at the first time that is less than the first electrical load and determining to supply a second amount of electrical power at the second time that satisfies the second electrical load, and
    wherein the implementing of the one or more settings of the DC-to-DC amplifier includes implementing at least one first setting of the DC-to-DC amplifier at the first time to cause the first amount of electrical power to be supplied at the first time, and implementing at least one second setting of the DC-to-DC amplifier at the second time to cause the second amount of electrical power to be supplied at the second time.

3. The computer-implemented method of claim 1 wherein the DC-to-DC amplifier is a field-effect transistor (FET) amplifier, and wherein the implementing of the one or more settings of the DC-to-DC amplifier includes determining an amount of current to supply and applying a voltage to a gate of the FET amplifier to produce the determined amount of current.

4. The computer-implemented method of claim 1 wherein the DC-to-DC amplifier is part of at least one of a buck converter or a boost converter, and wherein the implementing of the one or more settings of the DC-to-DC amplifier includes determining an amount of voltage to supply, and modifying the at least one of the buck converter or the boost converter to produce the determined amount of voltage.

5. The computer-implemented method of claim 1 wherein the obtained sensor information identifies current values for electrical current, voltage and one or more temperatures associated with the battery, and wherein the generating of the one or more estimates of the internal state of the battery includes using a defined battery temperature model to generate the one or more estimates of the internal temperature of the battery based at least in part on the current values for the electrical current, voltage and one or more temperatures.

6. The computer-implemented method of claim 1 wherein the obtained sensor information identifies a current value for at least one of electrical current, voltage or a temperature associated with the battery, and wherein the generating of the one or more estimates of the internal state of the battery includes further estimating an internal chemical reaction state for the battery.

7. The computer-implemented method of claim 1 wherein the obtained sensor information identifies a current value for at least one of electrical current or voltage.

8. The computer-implemented method of claim 1 wherein the model further includes one or more rules that specify restrictions involving manipulating the DC-to-DC amplifier connected to the battery to maintain the internal state of the battery in the defined range during controlling of electrical power being supplied to the battery for charging, and wherein the method further comprises controlling, by the automated control system, the electrical power being supplied to the battery for charging, including:
- obtaining, by the automated control system and at one or more additional times, additional sensor information identifying current values for one or more attributes of the battery at the one or more additional times, and information about one or more electrical supply amounts to be provided to the battery at the one or more additional times;
- generating, by the automated control system and based at least in part on the obtained additional sensor information, one or more additional estimates of the internal state of the battery for the one or more additional times;
- determining, by the automated control system, and based at least in part on the model and on the one or more additional estimates of the internal state of the battery and on the one or more electrical supply amounts, one or more additional amounts of electrical power for the battery to receive at the one or more additional times to accept at least some of the one or more electrical supply amounts while maintaining the internal state of the battery in the defined range during the one or more additional times; and
- implementing, by the automated control system and for each of the one or more determined additional amounts of electrical power, one or more settings of the DC-to-DC amplifier to cause electrical power being supplied to the battery to satisfy the determined additional amount of electrical power.

9. The computer-implemented method of claim 1 wherein the model included in the received information is configured for a battery type of the battery, and wherein the method further comprises adapting the model to information specific to the battery by, during an initial training period before the controlling of the electrical power being output, monitoring changes in values of the one or more attributes of the battery and changes in electrical loads being supplied by the battery, and modifying the model to correspond to the monitored changes in values and the monitored changes in electrical loads.

10. The computer-implemented method of claim 1 wherein the controlling of the electrical power being output further includes adapting the model included in the received information to additional information specific to the battery by monitoring changes over time in values of the one or more attributes of the battery that are based at least in part on increasing impedance of the battery, and modifying the model to correspond to the monitored changes, and wherein at least one amount of electrical power for the battery to supply that is determined and is caused to be output by the implementing is based at least in part on the modified model.

11. The computer-implemented method of claim 1 wherein the automated controller system includes a battery controller component connectively coupled to the battery and further includes a control action determination component that is executing remotely from the battery on at least one of the one or more computing systems and that communicates with the battery controller component over one or more computer networks, wherein the control action determination component performs at least the determining of the one or more amounts of electrical power and further performs sending instructions over the one or more computer networks to the battery controller component about the determined one or more amounts of electrical power, wherein the battery controller component performs at least the implementing of the one or more settings of the DC-to-DC amplifier based at least in part on the sent instructions, and wherein the method further comprises controlling, by the battery controller component and at an additional time without receiving any instructions over the one or more computer networks from the control action determination component, the electrical power being output by the battery, including:
- obtaining, by the battery controller component and at the additional time, additional sensor information identifying current values for the one or more attributes of the battery at the additional time;
- generating, by the battery controller component and based at least in part on the obtained additional sensor information, an additional estimate of the internal state of the battery for the additional time;
- determining, by the battery controller component, and based at least in part on the additional estimate of the internal state of the battery, an additional amount of electrical power for the battery to supply at the additional time to maintain the internal state of the battery in the defined range for the additional time; and
- implementing, by the battery controller component, one or more settings of the DC-to-DC amplifier to cause electrical power being output to satisfy the determined additional amount of electrical power.

12. The computer-implemented method of claim 1 further comprising, controlling, by the automated control system and at an additional time without a current electrical load, the electrical power being output by the battery, including:
- obtaining, by the automated control system and at the additional time, additional sensor information identifying current values for the one or more attributes of the battery at the additional time;
- generating, by the automated control system and based at least in part on the obtained additional sensor information, an additional estimate of the internal state of the battery for the additional time;
- determining, by the automated control system, and based at least in part on the model and on the additional estimate of the internal state of the battery, an additional amount of electrical power for the battery to supply at the additional time to maintain the internal state of the battery in the defined range for the additional time; and
- implementing, by the automated control system, one or more settings of the DC-to-DC amplifier to cause electrical power being output to satisfy the determined additional amount of electrical power.

13. A non-transitory computer-readable medium having stored contents that cause one or more devices implementing at least part of an automated control system to perform automated operations including at least:
- receiving, by the automated control system, information for use in controlling electrical power from a battery that supplies electrical direct current (DC), wherein the received information includes a model of the battery that specifies restrictions involving manipulating a DC-to-DC amplifier connected to the battery to achieve one or more defined goals including maintaining an internal temperature of the battery in a defined range during the controlling of the electrical power from the battery, wherein the defined range includes internal temperatures of the battery at which the battery operates to reduce premature damage; and controlling, by the automated control system and based on the received information, the electrical power from the battery, including:
  obtaining, by the automated control system, sensor information identifying values for one or more attributes of the battery at multiple times, and information about electrical loads to be satisfied at the multiple times;
  generating, by the automated control system and based at least in part on the obtained sensor information, estimates of the internal temperature of the battery for the multiple times;
  determining, by the automated control system for one or more of the multiple times, one or more amounts of electrical power for the battery to supply at the one or more times to satisfy at least some of the electrical loads while maintaining the internal temperature of the battery in the defined range, wherein the determining is based at least in part on at least one previous amount of electrical power supplied by the battery in order to control a rate of change in amount of electrical power that the battery supplies, and wherein the determining is further based at least in part on the model and on the estimates of the internal temperature of the battery and on the electrical loads; and
  implementing, by the automated control system and for each of the one or more determined amounts of electrical power, one or more settings of the DC-to-DC amplifier to cause electrical power being output to satisfy the determined amount of electrical power.

14. The non-transitory computer-readable medium of claim 13 wherein the model of the battery includes one or more rules that limit changing an amount of electrical power being output from the battery to be less than a defined threshold limit for the rate of change, wherein the stored contents include software instructions that, when executed, further cause at least one of the one or more devices to identify the at least one previous amount of electrical power supplied by the battery and to determine a target rate of change that maintains the internal temperature of the battery in the defined range and that is within the defined threshold limit, and wherein the determining of the one or more amounts of electrical power for the battery to supply at the one or more times is further performed to satisfy the determined target rate of change and based at least in part on the one or more rules.

15. The non-transitory computer-readable medium of claim 13 wherein the determining of the one or more amounts of electrical power for the battery to supply at the one or more times further includes identifying at least one previous electrical load, determining one or more amounts of change in electrical load from the at least one previous electrical load to the electrical loads to be satisfied at the multiple times, and selecting at least one of the determined one or more amounts of electrical power based at least in part on the determined one or more amounts of change in electrical load.

16. The non-transitory computer-readable medium of claim 13 wherein the determining of the one or more amounts of electrical power for the battery to supply at the one or more times further includes identifying at least one previous estimate of an internal state of the battery that is based at least in part on an internal impedance of the battery, determining one or more amounts of change in estimated internal impedance of the battery from the at least one previous estimate to subsequent estimates of the internal state of the battery for the multiple times, and selecting at least one of the determined one or more amounts of electrical power based at least in part on the determined one or more amounts of change in the estimated internal impedance of the battery.

17. The non-transitory computer-readable medium of claim 13 wherein the determining of the one or more amounts of electrical power for the battery to supply at the one or more times further includes identifying at least one previous estimate of an internal state of the battery that is based at least in part on the internal temperature of the battery, determining one or more amounts of change in estimated internal temperature of the battery from the at least one previous estimate to the estimates of the internal temperature of the battery for the multiple times, and selecting at least one of the determined one or more amounts of electrical power based at least in part on the determined one or more amounts of change in the estimated internal temperature of the battery.

18. A system comprising:
  one or more hardware processors of one or more devices; and
  one or more memories storing instructions that, when executed by at least one of the one or more hardware processors, cause the at least one hardware processor to implement an automated control system that controls electrical power supplied from or to a battery, by:
    receiving a model of the battery having specified restrictions for manipulating an actuator that controls direct current (DC) characteristics of the electrical power supplied from or to the battery;
    obtaining sensor information identifying values for one or more attributes of the battery at an indicated time, and additional information about at least one of an electrical load to be satisfied at the indicated time or an electrical supply amount available to be provided to the battery at the indicated time;
    generating, based at least in part on the obtained sensor information, one or more estimates for the indicated time of an internal state of the battery that is not directly observable;
    determining, as part of maintaining the internal state of the battery in a defined range for the indicated time, and based at least in part on the model and on the one or more estimates of the internal state of the battery, an amount of electrical power for the battery to supply at the indicated time to satisfy at least some of the electrical load, or an amount of electrical power for the battery to receive at the indicated time by accepting at least some of the electrical supply amount; and
    implementing one or more settings of the actuator to cause electrical power being output for the indicated time to satisfy the determined amount of electrical power for the battery to supply, or to cause electrical power being supplied to the battery for the indicated time to satisfy the determined amount of electrical power for the battery to receive.

19. The system of claim 18 wherein the actuator is a DC-to-DC amplifier, and wherein the automated control system controls electrical power supplied from the battery by determining the amount of electrical power for the battery to supply at the indicated time to satisfy at least some of the electrical load and by implementing one or more settings of the DC-to-DC amplifier to cause electrical power being output for the indicated time to satisfy the determined amount of electrical power for the battery to supply.

20. The system of claim 18 wherein the received model of the battery includes multiple rules that specify restrictions involving manipulating the actuator in a manner to achieve one or more defined goals including maintaining the internal state of the battery in the defined range during controlling of the electrical power supplied from or to the battery, wherein the multiple rules include one or more rules to not charge the battery if the battery has a current charge that exceeds a first defined threshold, and one or more rules to not discharge the battery if the battery has a current charge that is below a second defined threshold, and one or more rules to not charge or discharge the battery if doing so would result in an estimated internal temperature of the battery being outside a defined range.

21. The computer-implemented method of claim 8 wherein the battery is part of a system having a solar power generator, and wherein the obtained information about the one or more electrical supply amounts to be provided to the battery includes an amount of electrical supply available from the solar power generator.

22. The computer-implemented method of claim 1 wherein the battery is part of a system having one or more electrically powered devices, and wherein the obtained information about the one or more electrical loads includes an amount of electrical demand from the one or more electrically powered devices.

23. The computer-implemented method of claim 1 wherein the battery is connected to an electrical grid, and wherein the obtained information about the one or more electrical loads includes requests from an operator of the electrical grid for electrical power to be supplied from the battery.

24. The computer-implemented method of claim 2 wherein the determining to supply the first amount of electrical power at the first time that is less than the first electrical load includes determining that supplying a larger amount of electrical power at the first time to satisfy the first electrical load will cause the internal state of the battery to exceed the defined range.

25. The computer-implemented method of claim 1 wherein the determining of the one or more amounts of electrical power for the battery to supply at the one or more times includes:
  determining a first amount of electrical power at a first time that satisfies a first electrical load at the first time and that the battery is capable of supplying;
  determining, based at least in part on one of the one or more estimates of the internal state of the battery that is for the first time, that the internal state of the battery exceeds the defined range; and
  determining, based at least in part on the determining that the internal state of the battery exceeds the defined range, a second amount of electrical power that is less than the first amount and is not sufficient to satisfy the first electrical load,
and wherein the implementing of the one or more settings of the DC-to-DC amplifier includes implementing at least one first setting of the DC-to-DC amplifier at the first time to cause the second amount of electrical power to be supplied at the first time.

26. The computer-implemented method of claim 1 wherein the determining of the one or more amounts of electrical power for the battery to supply at the one or more times further includes retrieving information about at least one previous amount of electrical power that the battery supplied, and selecting the determined one or more amounts of electrical power to further control a rate of change in amount of electrical power that the battery supplies, as part of maintaining the internal state of the battery in the defined range during the one or more times.

27. The computer-implemented method of claim 1 further comprising identifying at least one previous electrical load, determining one or more amounts of change in electrical load from the at least one previous electrical load to the one or more electrical loads, and further performing the selecting of the determined one or more amounts of electrical power based at least in part on the determined one or more amounts of change in electrical load.

28. The computer-implemented method of claim 1 further comprising identifying at least one previous estimate of the internal state of the battery that is based at least in part on an internal impedance of the battery, determining one or more amounts of change in estimated internal impedance of the battery from the at least one previous estimate to the one or more estimates, and further performing the selecting of the determined one or more amounts of electrical power based at least in part on the determined one or more amounts of change in the estimated internal impedance of the battery.

29. The computer-implemented method of claim 1 further comprising identifying at least one previous estimate of the internal state of the battery that is based at least in part on the internal temperature of the battery, determining one or more amounts of change in estimated internal temperature of the battery from the at least one previous estimate to the one or more estimates, and further performing the selecting of the determined one or more amounts of electrical power based at least in part on the determined one or more amounts of change in the estimated internal temperature of the battery.

* * * * *